US012684467B2

(12) United States Patent
Xu et al.

(10) Patent No.: US 12,684,467 B2
(45) Date of Patent: Jul. 14, 2026

(54) METHOD FOR USING CELLULAR COMMUNICATION FUNCTION, AND RELATED APPARATUS AND SYSTEM

(71) Applicant: HONOR DEVICE CO., LTD., Shenzhen (CN)

(72) Inventors: Zixiang Xu, Shenzhen (CN); Hao Song, Shenzhen (CN); Yanzhao He, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 373 days.

(21) Appl. No.: 18/037,169

(22) PCT Filed: Jul. 5, 2022

(86) PCT No.: PCT/CN2022/103837
§ 371 (c)(1),
(2) Date: May 16, 2023

(87) PCT Pub. No.: WO2023/000969
PCT Pub. Date: Jan. 26, 2023

(65) Prior Publication Data
US 2023/0422154 A1     Dec. 28, 2023

(30) Foreign Application Priority Data

Jul. 21, 2021     (CN) ......................... 202110834442.6

(51) Int. Cl.
H04W 8/22          (2009.01)
H04W 8/20          (2009.01)
(Continued)

(52) U.S. Cl.
CPC ........... H04W 48/16 (2013.01); H04W 8/205 (2013.01); H04W 88/04 (2013.01)

(58) Field of Classification Search
CPC ..... H04W 48/16; H04W 8/205; H04W 88/04; H04W 8/22
See application file for complete search history.

(56) References Cited

U.S. PATENT DOCUMENTS 10,057,928 B2      8/2018  Masputra et al.
2015/0065084 A1*   3/2015  Sheikh Naziruddin ......................
                                                    H04W 4/24
                                                    455/406
(Continued)

FOREIGN PATENT DOCUMENTS

CN         101009588 A      8/2007
CN         106657637 A      5/2017
(Continued)

OTHER PUBLICATIONS

Intel, Altice Labs, "3GPP TSG-SA WG1 Meeting #74", S1-161174, Venice, Italy, May 9-13, 2016, 28 pages.

*Primary Examiner* — Said M Elnoubi
(74) *Attorney, Agent, or Firm* — WOMBLE BOND DICKINSON (US) LLP

(57)          ABSTRACT

This application relates to the field of cellular communication technologies, and discloses a method for using cellular communication, and a related apparatus and system, whose objective is to share all cellular communication functions of a second device with a first device for use. The distributed cellular communication module of the first device forwards a received cellular communication service request to the second device, and then receives response data corresponding to the cellular communication service request and returned by the distributed cellular communication module of the second device, where the response data corresponding to the cellular communication service request is obtained by performing processing by a Modem of the second device, and then the first device uses the Modem of the second (Continued)

First device | Second device

S401. Enable a cellular communication capability sharing function

S402. Query a device enabling the cellular communication capability sharing function in a network S403. Select the second device from all queried devices enabling the cellular communication capability sharing function S404. Send a socket connection request S405. Establish a connection to the first device in response to the socket connection request S406. Send a cellular communication capability sharing request S407. Create a proxy object of a request interface S408. Create a proxy object of a response interface and a proxy object of a notification interface S409. Send cellular communication capability sharing success information S410. Forward a cellular communication service request to the second device

TO FIG. 4B          TO FIG. 4B device to process all cellular communication service requests of the first device, to have all cellular communication capabilities of the second device.

17 Claims, 30 Drawing Sheets

(51) Int. Cl.
  *H04W 48/16*        (2009.01)
  *H04W 88/04*        (2009.01)

(56)                  References Cited

U.S. PATENT DOCUMENTS

| | | | |
|---|---|---|---|
| 2017/0150307 A1 | 5/2017 | Himmelreich et al. | |
| 2017/0324769 A1 | 11/2017 | Sadeh et al. | |
| 2021/0037390 A1 | 2/2021 | Tofighbakhsh et al. | |

FOREIGN PATENT DOCUMENTS

| | | | |
|---|---|---|---|
| CN | 108494639 A | 9/2018 |
| CN | 109413145 A | 3/2019 |
| CN | 110839219 A | 2/2020 |
| CN | 113630910 A | 11/2021 |
| EP | 2415244 B1 | 12/2014 |
| WO | 2020218858 A1 | 10/2020 |

* cited by examiner (a)                  (b)

First device

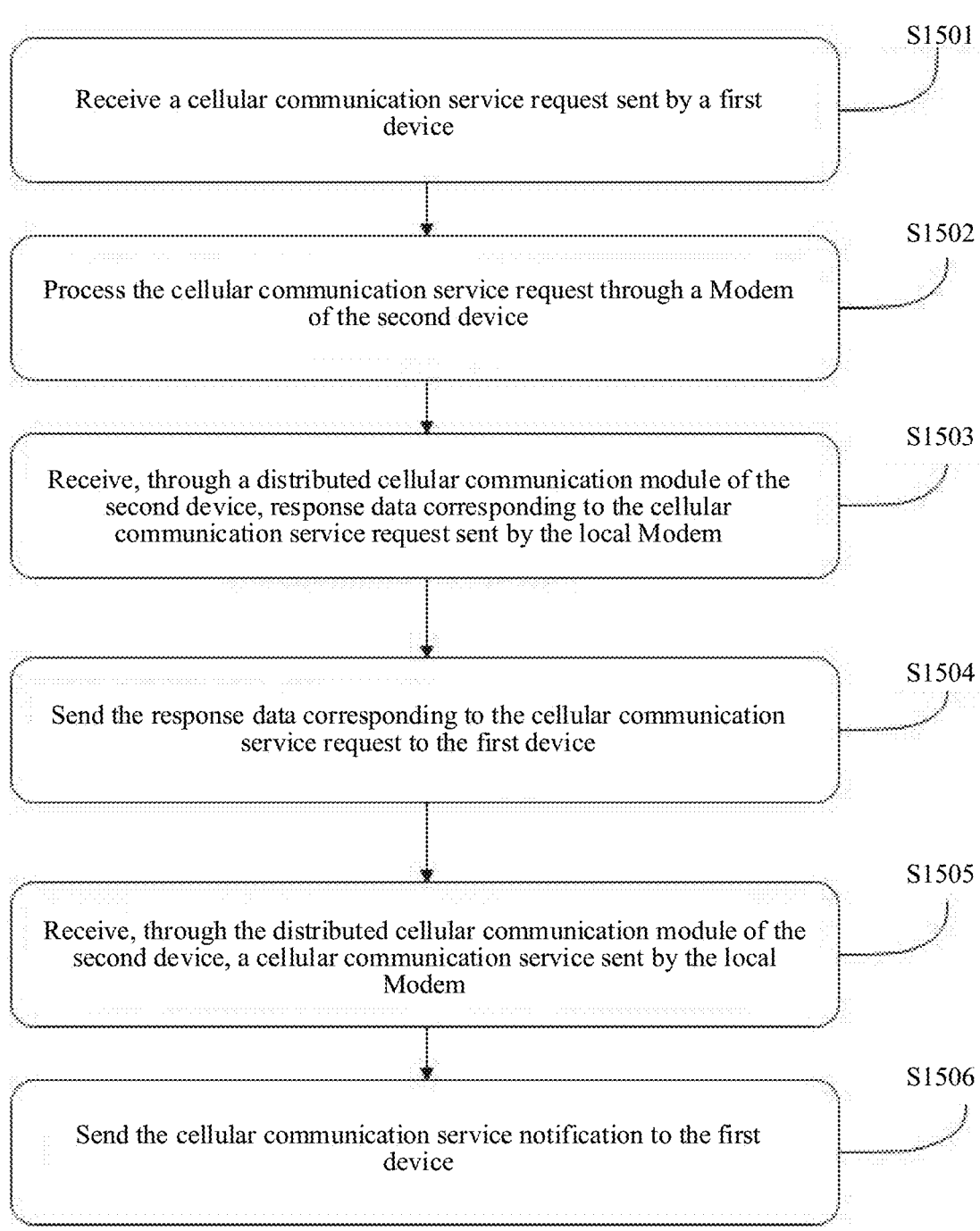

Receive a cellular communication service request sent by a first device ⎯ S1501

Process the cellular communication service request through a Modem of the second device ⎯ S1502

Receive, through a distributed cellular communication module of the second device, response data corresponding to the cellular communication service request sent by the local Modem ⎯ S1503

Send the response data corresponding to the cellular communication service request to the first device ⎯ S1504

Receive, through the distributed cellular communication module of the second device, a cellular communication service sent by the local Modem ⎯ S1505

Send the cellular communication service notification to the first device ⎯ S1506

FIG. 15

METHOD FOR USING CELLULAR COMMUNICATION FUNCTION, AND RELATED APPARATUS AND SYSTEM

CROSS-REFERENCE TO RELATED APPLICATIONS

This application is a national stage of International Application No. PCT/CN2022/103837, filed on Jul. 5, 2022, which claims priority to Chinese Patent Application No. 202110834442.6, filed on Jul. 21, 2021. The disclosures of both of the aforementioned applications are hereby incorporated by reference in their entireties.

TECHNICAL FIELD

This application relates to the field of cellular communication technologies, and in particular, to a method for using a cellular communication function, and a related apparatus and system.

BACKGROUND

Cellular communication is connecting a terminal and a network device through a radio channel in a cellular wireless networking manner and then implementing communication between users during movement, is mainly characterized by mobility of the terminal, and has functions of inter-cell handover and automatic roaming cross a local network. A typical device having a cellular communication capability is a mobile phone, and the device having the cellular communication capability can implement functions such as making or answering a call, receiving or sending an SMS message, and one-click login of an application.

In some scenarios, a first device needs to perform communication using a cellular communication capability of a second device. Therefore, a particular application is configured on each of the first device and the second device. Through the particular application configured on the first device and the second device, the first device may receive data from the second device through the particular application, to implement a limited communication function.

SUMMARY

This application provides a method for using a cellular communication function, and a related apparatus and system, whose objective is to share all cellular communication functions of a second device with a first device for use.

To achieve the foregoing objective, this application provides the following technical solutions:

According to a first aspect, this application provides a method for using a cellular communication function, where the method is applied to a distributed cellular communication module of a first device, and the distributed cellular communication module of the first device is run in a system service or arranged in an application framework layer or a system library of the first device; and the method for using a cellular communication function specifically includes the following steps: receiving a cellular communication service request, and then forwarding the received cellular communication service request to a distributed cellular communication module of a second device, where the distributed cellular communication module of the second device is run in a system service or arranged in an application framework layer or a system library of the second device; then receiving response data corresponding to the cellular communication service request and returned by the distributed cellular communication module of the second device, where the response data corresponding to the cellular communication service request is obtained by sending the cellular communication service request to a modem Modem of the second device by the distributed cellular communication module of the second device and processing the cellular communication service request by the Modem of the second device; and finally sending the response data corresponding to the cellular communication service request to an application corresponding to the cellular communication service request.

In the method for using a cellular communication function provided in this application, each cellular communication service request of the first device can be forwarded through the distributed cellular communication module of the first device to the Modem of the second device for processing, and then the distributed cellular communication module of the second device further sends the response data corresponding to the cellular communication service request to the first device in a manner of sending the response data corresponding to the cellular communication service request to the distributed cellular communication module of the first device. Therefore, the first device can use all cellular communication capabilities of the second device, that is, can use all cellular communication functions. Because of being arranged in the application framework layer or the system library, the distributed cellular communication module of the first device can undertake and process all cellular communication service requests in an application layer. Even if the second device does not have the same application as that of the first device, the cellular communication service request of the first device can still be forwarded to the distributed cellular communication module of the second device for processing.

In a possible implementation, a configuration of using the Modem of the second device may be further executed for the first device in advance, and a process of the configuration specifically includes: establishing a connection to the distributed cellular communication module of the second device, and then creating a proxy object of a request interface, and sending the cellular communication capability sharing request to the distributed cellular communication module of the second device, where the proxy object of the request interface is used for forwarding the received cellular communication service request to the distributed cellular communication module of the second device.

In this embodiment of this application, by creating the proxy object of the request interface, an additional access manner for the request interface can be provided, then the cellular communication service request is received through the proxy object of the request interface, and then the cellular communication service request is forwarded to the distributed cellular communication module of the second device. An order of creating the proxy object of the request interface and sending the cellular communication capability sharing request to the distributed cellular communication module of the second device does not affect implementation of this embodiment of this application.

In another possible implementation, a configuration of using the Modem of the second device is executed for the first device in advance, and a process of the configuration may be: preconfiguring an operation function of the distributed cellular communication module of the first device, where the operation function of the distributed cellular communication module of the first device is a function of forwarding the received cellular communication service request to a function configuration of the distributed cellular communication module of the second device; and establishing a connection to the distributed cellular communication module of the second device, and then sending a cellular communication capability sharing request to the distributed cellular communication module of the second device.

In another possible implementation, after the creating a proxy object of a request interface, the method may further include: triggering a local telephony manager to send a subscriber identity module state query request; then sending the subscriber identity module state query request sent by the local telephony manager to the distributed cellular communication module of the second device; then receiving a subscriber identity module state query result returned by the distributed cellular communication module of the second device, where the subscriber identity module state query result is obtained by sending the subscriber identity module state query request to the Modem of the second device by the distributed cellular communication module of the second device and processing the subscriber identity module state query request by the Modem of the second device; and finally sending the subscriber identity module state query result to an application corresponding to the subscriber identity module state.

In this embodiment of this application, an application in the first device may perform corresponding working according to the subscriber identity module state query result, and similarly another module in the first device may also perform corresponding working according to the subscriber identity module state query result.

In a possible implementation, before the establishing a connection to the second device, the method further includes: querying a device enabling a cellular communication capability sharing function in a network; and then selecting the second device from all queried devices enabling the cellular communication capability sharing function.

In another possible implementation, the establishing a connection to the second device may be: sending a socket connection request to the distributed cellular communication module of the second device; and establishing a connection to the distributed cellular communication module of the second device through a distributed bus in a case that the distributed cellular communication module of the second device successfully responds to the socket connection request; or establishing a persistent connection channel through a communication service cloud, where the persistent connection channel is used for connecting the distributed cellular communication module of the first device and the distributed cellular communication module of the second device.

In another possible implementation, after the creating a proxy object of a request interface, the method may be further: disabling the proxy object of the request interface in response to that the second device disables a cellular communication capability sharing function; or sending a sharing ending request to the distributed cellular communication module of the second device and disabling the proxy object of the request interface.

That is, the proxy object of the request interface may be disabled after the second device disables the cellular communication capability sharing function, or the proxy object of the request interface may be actively disabled; and in a manner of sending the sharing ending request to the distributed cellular communication module of the second device, the second device is instructed to end sharing the cellular communication capability with the first device.

In another possible implementation, before the forwarding the received cellular communication service request to a distributed cellular communication module of a second device, the method may be further: recognizing whether the received cellular communication service request needs to be forwarded to the second device; and sending, in a case that the received cellular communication service request does not need to be forwarded to the second device, the cellular communication service request to a local Modem of the first device for processing, then receiving the response data corresponding to the cellular communication service request and sent by the local Modem, and sending the response data corresponding to the cellular communication service request to the application corresponding to the cellular communication service request; or forwarding the cellular communication service request to the distributed cellular communication module of the second device in a case of recognizing that the cellular communication service request needs to be forwarded to the second device.

In this embodiment of this application, by recognizing whether the received cellular communication service request needs to be forwarded to the second device, the distributed cellular communication module of the first device not only may use the local Modem to process the cellular communication service request, but also may use the Modem of the second device to process the cellular communication service request.

In another possible implementation, the method may further include: receiving a cellular communication service notification returned by the distributed cellular communication module of the second device; and then sending the cellular communication service to an application corresponding to the cellular communication service notification.

In another possible implementation, the forwarding the received cellular communication service request to a distributed cellular communication module of a second device may be: performing packet assembly and serialization processing on the received cellular communication service request; and then forwarding the processed cellular communication service request to the distributed cellular communication module of the second device, where before the sending the response data corresponding to the cellular communication service request to the application corresponding to the cellular communication service request, the method may further include: performing packet disassembly and deserialization processing on the response data corresponding to the cellular communication service request; and then sending the processed response data corresponding to the cellular communication service request to an application corresponding to the cellular communication service request.

According to a second aspect, this application provides a method for using a cellular communication function, where the method is applied to a distributed cellular communication module of a second device, and the distributed cellular communication module of the second device is run in a system service or arranged in an application framework layer or a system library of the second device; and the method for using a cellular communication function may include: receiving a cellular communication service request sent by a distributed cellular communication module of a first device, and then sending the cellular communication service request to a local Modem of the second device for processing, where the distributed cellular communication module of the first device is run in a system service or arranged in an application framework layer or a system library of the first device; receiving the response data corresponding to the cellular communication service request and sent by the local Modem; and sending the response data corresponding to the cellular communication service request to the distributed cellular communication module of the first device. the response data corresponding to the cellular communication service request is obtained by processing the cellular communication service request by the local Modem.

In the method for using a cellular communication function provided in this application, the distributed cellular communication module of the second device can receive the cellular communication service request sent by the distributed cellular communication module of the first device, and then send the cellular communication service request to the local Modem of the second device for processing; and then may send the response data corresponding to the cellular communication service request to the distributed cellular communication module of the first device, thereby sending the response data corresponding to the cellular communication service request to the first device. Therefore, the first device can use all cellular communication capabilities of the second device, that is, can use all cellular communication functions.

In a possible implementation, a configuration of providing the local Modem for the first device is executed for the second device in advance, and a process of the configuration includes: enabling a cellular communication capability sharing function, then establishing a connection to the distributed cellular communication module of the first device, and receiving a cellular communication capability sharing request sent by the distributed cellular communication module of the first device; and creating a proxy object of a response interface and a proxy object of a notification interface in response to the cellular communication capability sharing request, and sending cellular communication capability sharing success information to the distributed cellular communication module of the first device, where the proxy object of the response interface is used for forwarding the response data corresponding to the cellular communication service request to the distributed cellular communication module of the first device, and the proxy object of the notification interface is used for forwarding a cellular communication service notification reported by the local Modem to the distributed cellular communication module of the first device.

In another possible implementation, a configuration of providing the local Modem for the first device is executed for the second device in advance, and a process of the configuration may be: preconfiguring an operation function of the distributed cellular communication module of the second device, where the operation function of the distributed cellular communication module of the second device is: an operation function of forwarding the response data corresponding to the cellular communication service request to the distributed cellular communication module of the first device, and an operation function of forwarding a cellular communication service notification reported by the local Modem to the distributed cellular communication module of the first device; and then establishing a connection to the distributed cellular communication module of the second device, and sending a cellular communication capability sharing request to the distributed cellular communication module of the second device.

In another possible implementation, after the receiving a cellular communication capability sharing request sent by the distributed cellular communication module of the first device, the method may further include: receiving a subscriber identity module state query request sent by the distributed cellular communication module of the first device, and then sending the subscriber identity module state query request to the local Modem for processing; and receiving a subscriber identity module state query result sent by the local Modem, and sending the subscriber identity module state query result to the distributed cellular communication module of the first device. the subscriber identity module state query result is obtained by processing the subscriber identity module state query request by the local Modem.

In another possible implementation, the establishing a connection to the distributed cellular communication module of the first device includes: receiving a socket connection request sent by the distributed cellular communication module of the first device; and establishing a connection to the distributed cellular communication module of the first device in response to the socket connection request; or establishing a persistent connection channel through a communication service cloud, where the persistent connection channel is used for connecting the distributed cellular communication module of the first device and the distributed cellular communication module of the second device.

In another possible implementation, after the creating a proxy object of a response interface and a proxy object of a notification interface, the method further includes: disabling the proxy object of the response interface and the proxy object of the notification interface in response to a sharing ending request sent by the distributed cellular communication module of the first device; or disabling the cellular communication capability sharing function, and disabling the proxy object of the response interface and the proxy object of the notification interface.

In another possible implementation, before the sending the response data corresponding to the cellular communication service request to the distributed cellular communication module of the first device, the method may further include: recognizing whether the response data corresponding to the cellular communication service request needs to be forwarded to the first device; and sending the response data corresponding to the cellular communication service request to an application corresponding to the cellular communication service request in a case of recognizing that the response data corresponding to the cellular communication service request does not need to be forwarded to the first device; or sending the response data corresponding to the cellular communication service request to the distributed cellular communication module of the first device in a case of recognizing that the response data corresponding to the cellular communication service request needs to be forwarded to the first device.

In this embodiment of this application, by recognizing whether the response data corresponding to the cellular communication service request needs to be forwarded to the first device, not only the local cellular communication service request may be processed, but also the cellular communication service request of the first device may be processed.

In another possible implementation, the method further includes: receiving a cellular communication service notification sent by the local Modem; and then sending the cellular communication service notification to the distributed cellular communication module of the first device.

In another possible implementation, after the receiving a cellular communication service request sent by a distributed cellular communication module of a first device, the method further includes: performing packet disassembly and deserialization processing on the received cellular communication service request; and then sending the processed cellular communication service request to the local Modem for processing; and before the sending the response data corresponding to the cellular communication service request to the distributed cellular communication module of the first device, the method may further include: performing packet assembly and serialization processing on the response data corresponding to the cellular communication service request; and then sending the processed response data corresponding to the cellular communication service request to the distributed cellular communication module of the first device.

According to a third aspect, this application provides a system for using a cellular communication function, including: a first device and a second device. The first device includes a distributed cellular communication module of the first device; and the distributed cellular communication module of the first device is configured to perform the method for using a cellular communication function according to any item of the first aspect. The second device includes a distributed cellular communication module of the second device; and the distributed cellular communication module of the second device is configured to perform the method for using a cellular communication function according to any item of the second aspect.

According to a fourth aspect, this application provides an electronic device, including: one or more processors, a memory, a display, a wireless communication module, and a mobile communication module. The memory, the display, the wireless communication module, and the mobile communication module are coupled to the one or more processors, the memory is configured to store computer program code, the computer program code includes computer instructions, and when the one or more processors execute the computer instructions, the electronic device performs the method for using a cellular communication function according to any item of the first aspect or the method for using a cellular communication function according to any item of the second aspect.

According to a fifth aspect, this application provides an apparatus for using a cellular communication function, including: a processing unit, a storage unit, a display unit, a transceiver unit, where the storage unit is configured to store one or more programs. The processing unit is configured to execute the one or more programs. The one or more programs include instructions, and the instructions are used for performing the method for using a cellular communication function according to any item of the first aspect or the method for using a cellular communication function according to any item of the second aspect.

It should be understood that descriptions of technical features, technical solutions, beneficial effects or similar languages in this application do not imply that all features and advantages can be achieved in any single embodiment. On the contrary, it may be understood that descriptions of features or beneficial effects mean that a particular technical feature, technical solution, or beneficial effect is included in at least one embodiment. Therefore, descriptions of the technical features, technical solutions, or beneficial effects in this specification do not necessarily refer to a same embodiment. Further, the technical features, technical solutions, and beneficial effects described in the embodiments may be combined in any suitable manner. A person skilled in the art understands that the embodiments can be implemented without one or more particular technical features, technical solutions, or beneficial effects of a particular embodiment. In other embodiments, additional technical features and beneficial effects may be further identified in a particular embodiment that does not embody all embodiments.

BRIEF DESCRIPTION OF DRAWINGS

FIG. 3a-1 and FIG. 3a-2 are a system architecture diagram 1 of a system for using a cellular communication function according to an embodiment of this application;

FIG. 10a-1 and FIG. 10a-2 are a system architecture diagram 2 of a system for using a cellular communication function according to an embodiment of this application;

FIG. 10b-1 and FIG. 10b-2 are a system architecture diagram 3 of a system for using a cellular communication function according to an embodiment of this application;

FIG. 15 is a flowchart 3 of a method for using a cellular communication capability according to an embodiment of this application;

DESCRIPTION OF EMBODIMENTS

Figure 1A:
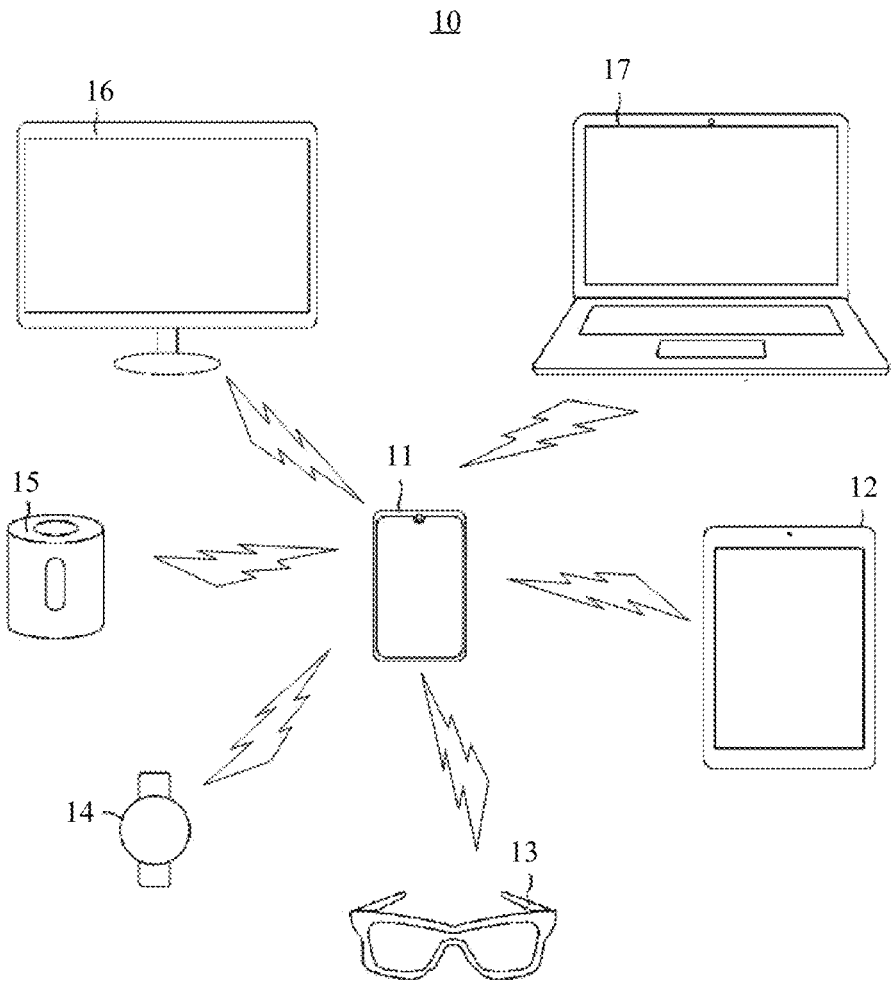
FIG. 1a is an application scenario 1 of a method for using a cellular communication function according to an embodiment of this application.

In the specification, claims, and accompanying drawings of this application, the terms "first", "second", "third", and so on are intended to distinguish between different objects but do not indicate a particular order.

In this embodiment of this application, the term "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the term "exemplary" or "example" or the like is intended to present a related concept in a specific manner.

For a clear and concise description of the following embodiments, brief introductions of a solution for using a cellular communication function are presented first:

A cellular communication capability is provided by a modem (Modem), the Modem is run on a baseband chip plus coprocessor, and through the Modem, a device is supported in implementing a series of cellular communication functions such as receiving or sending an SMS message, a 5G-related function, making a call, and answering a call. Exemplarily, when using a device having a cellular communication capability, a user may implement a series of cellular communication functions by triggering a local application.

In some scenarios, a first device needs to perform communication using a cellular communication capability of a second device. Therefore, after the same particular application is configured on the first device and the second device, through the particular application configured on the first device and the second device, the first device may use the cellular communication capability of the second device to complete a type of communication, that is, transfer a cellular communication function. For example, in a scenario in which the first device intends to use a SIM card of the second device to make a call, a telephony application having a call transferring function is configured on each of the first device and the second device, and when the SIM card of the second device receives the incoming call, a control stream and a data stream of the incoming call are transferred onto the telephony application configured on the first device through the telephony application configured on the second device, and a user of the first device may receive the incoming call through the telephony application.

In the foregoing implementation solution of installing the particular application to complete use of the cellular communication function, the following problems exist:

1. Because data of cellular communication is transmitted through an application, and transfer of the cellular communication function can be completed only if a same particular application is installed in each electronic device, use scenarios are limited.

2. If cross-device use of a cellular communication function needs to be implemented, an independent application needs to be developed alone for the function, and a cellular communication function at which the application is targeted can be used only if the application is installed in all of a plurality of devices. In other words, if no application developed specially for a cellular communication function is installed in a device, cellular communication functions of other devices cannot be used.

3. A particular application configured on an electronic device can be used for transferring only some cellular communication functions, function transfer cannot be implemented for the cellular communication functions by configuring the particular application, and there is a problem that the device cannot directly obtain a complete cellular communication capability. For example, in a SIM card state, many applications need to use SIM card state data, and these applications originally obtain the SIM card state data from an application framework layer. If it is intended to transfer a function of obtaining the SIM card state data by configuring a particular application, it is necessary to modify all applications using the SIM card state data, different applications belong to different vendors, it is difficult to implement uniform modification, and modification workload is excessively large. Therefore, function transfer cannot be implemented by configuring the particular application.

Based on the problems existing in the foregoing technical solution, this application provides a method for using a cellular communication function, and a related apparatus and system, to share a cellular communication function between a plurality of devices by arranging distributed cellular communication modules.

To clearly describe the following embodiments of a process of using a cellular communication function proposed in this application, brief introductions of a technology related to the embodiments of this application are first presented:

A proxy mode is a design mode, and is used for providing an additional access manner for a target object by creating a proxy object of the target object. The target object is an interface, for example, a hardware abstraction layer interface definition language (HAL interface definition language, HIDL) interface or an Android interface definition language (Android Interface Definition Language, AIDL) interface. By accessing the target object through the proxy object, functions of the original target object may be extended by providing an additional functional operation through the proxy object without modifying the original target object. In brief, the proxy mode is setting a proxy object as an intermediate proxy, to control access to the original target object, so as to enhance functions of the original target object and simplify the access process.

In a solution in which an electronic device having a cellular communication capability uses a local cellular communication function, an application in an application layer of the electronic device having the cellular communication capability triggers a cellular communication service request, the cellular communication service request is delivered from the local application layer to a local application framework layer, then the local application framework layer invokes an HIDL interface on a local system library, then the cellular communication service request is sent to a local Modem for processing through the local HIDL interface, the local Modem obtains response data corresponding to the cellular communication service request after the processing and then reports the response data corresponding to the cellular service request to the local application framework layer through the HIDL interface of the local system library, and then the application framework layer sends the response data to an application corresponding to the response data. The local Modem further actively reports the cellular communication service to the application framework layer through the local HIDL interface, and then the application framework layer continues to report the cellular communication service to an application corresponding to the cellular communication service. Exemplarily, all services or capabilities related to cellular communication may be referred to as cellular communication services. For example, calls, SMS messages, SIM card change, and call transferring may be all referred to as cellular communication services.

Invoking directions of the HIDL interface mentioned in the solution in which an electronic device having a cellular communication capability uses a local cellular communication function may be divided into three types: The first type of invoking direction is an invoking direction in which a cellular communication service request on an application side on which the application layer and the application framework layer are located is actively delivered to a Modem side, the second type of invoking direction is a direction in which response data corresponding to a cellular communication service request initiated on an application side is reported on a Modem side to the application side, and the third type of invoking direction is a direction in which a cellular communication service notification is actively reported on a Modem side to an application side.

It should be noted that, in addition to the HIDL interface, the foregoing solution for a cellular communication function is similarly further applicable to other interfaces such as the AIDL interface, which is specifically determined according to an interface type to which a system for executing the solution is applicable, and interface types in the cellular communication solution are not limited in this application.

A use scenario of a method for using a cellular communication function provided in the embodiments of this application is introduced below.

The method for using a cellular communication function provided in the embodiments of this application may be used in a scenario shown in FIG. 1a. A second device may be a mobile phone 11 in FIG. 1a. First devices may be a tablet computer 12, smart glasses 13, a watch 14, a speaker 15, a smart screen 16, and a notebook computer 17 in FIG. 1a. As shown in FIG. 1a, the mobile phone 11 may establish a connection to each of the tablet computer 12, the smart glasses 13, the watch 14, the speaker 15, the smart screen 16, and the notebook computer 17, to provide a cellular communication capability of the mobile phone 11 to the tablet computer 12, the smart glasses 13, the watch 14, the speaker 15, the smart screen 16, and the notebook computer 17. In some other embodiments, the mobile phone 11 may further provide the cellular communication capability of the mobile phone 11 to a device such as a media player (for example, MP3 or MP4), an ultra-mobile personal computer (ultra-mobile personal computer, UMPC), a personal digital assistant (personal digital assistant, PDA), a wireless headset, a smart band, a wireless in-vehicle device, an augmented reality (augmented reality, AR)/virtual reality (virtual reality, VR) device, or a television.

In a system 10, after establishing connections to other intelligent devices in FIG. 1a, the mobile phone 11 provides its own cellular communication capability to the other intelligent devices, so that the other intelligent devices having no cellular communication capability such as the tablet computer 12, the smart glasses 13, the watch 14, the speaker 15, the smart screen 16, and the notebook computer 17 may use the cellular communication capability of the mobile phone 11, to implement all cellular communication functions. For example, the tablet computer 12 may obtain a state of a cellular communication network in the mobile phone 11, and then the tablet computer 12 may automatically select, according to the state of the cellular communication network, to use a wireless network or the cellular communication network for Internet accessing. In another example, the smart screen 16 may use a SIM card in the mobile phone 11 to make a call and answer a call.

Figure 1B:
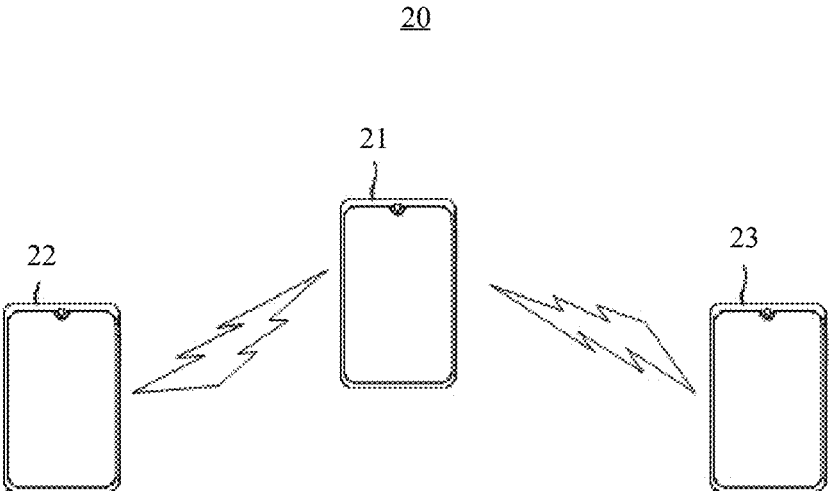
FIG. 1b is an application scenario 2 of a method for using a cellular communication function according to an embodiment of this application.

The method for using a cellular communication function provided in the embodiments of this application may be further applicable to a scenario shown in FIG. 1b. A first device may be a mobile phone 21 in a system 20, and second devices may be a mobile phone 22 and a mobile phone 23. The mobile phone 21 establishes a connection to each of a plurality of mobile phones such as the mobile phone 22 and the mobile phone 23, each of the mobile phone 22 and the mobile phone 23 provides a cellular communication capability to the mobile phone 21, and the mobile phone 21 may use the cellular communication capabilities of the mobile phone 22 and the mobile phone 23. For example, the mobile phone 21 may use any SIM card in the mobile phone 22 and the mobile phone 23 to make a call and answer a call, and may further select to use a cellular communication network of either of the mobile phone 22 and the mobile phone 23 for Internet accessing.

In some embodiments, the first device may alternatively be an electronic device such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a smartwatch, and the second device is an electronic device having a cellular communication capability such as a mobile phone or a smart call watch. Specific forms of the foregoing electronic devices are not specially limited in this application. It should be noted that, in this embodiment of this application, each first device refers to a user of the cellular communication capability of the second device, and each second device refers to a provider of the cellular communication capability.

Figure 2:
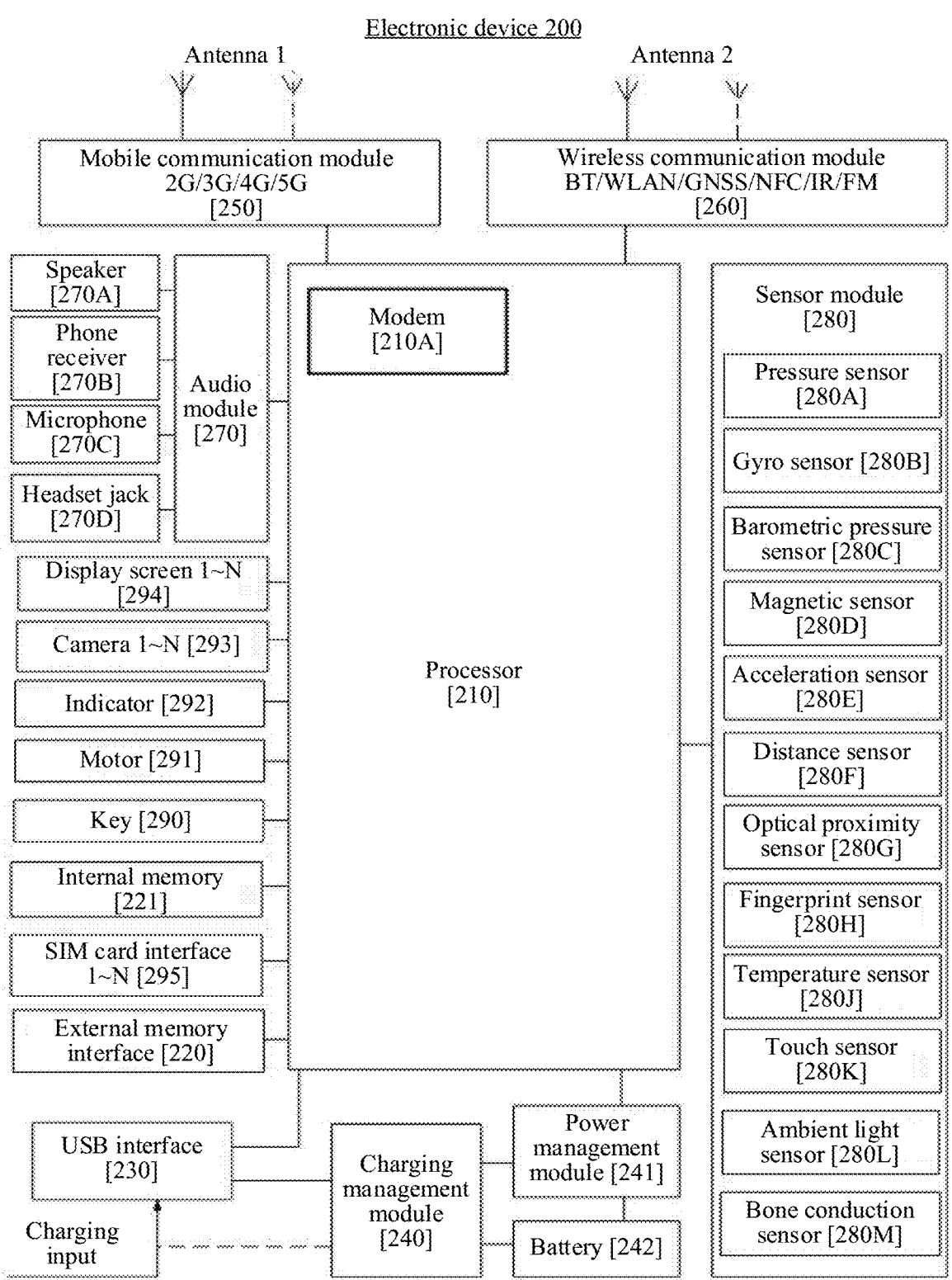
FIG. 2 is an exemplary compositional diagram 1 of an electronic device according to an embodiment of this application.

In this embodiment of this application, the structure of each of the first device and the second device may be like that shown in FIG. 2. The first device and the second device are collectively referred to as an electronic device 200 in FIG. 2 and introduced. The electronic device 200 may include a processor 210, an external memory interface 220, an internal memory 221, a universal serial bus (universal serial bus, USB) interface 230, a charging management module 240, a power management unit 241, a battery 242, an antenna 1, an antenna 2, a mobile communication module 250, a wireless communication module 260, an audio module 270, a speaker 270A, a phone receiver 270B, a microphone 270C, a headset jack 270D, a sensor module 280, a key 290, a motor 291, an indicator 292, a camera 293, a display screen 294, a subscriber identification module (subscriber identification module, SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the schematic structure in this embodiment constitutes no specific limitation on the electronic device 200. In some other embodiments, the electronic device 200 may include more or fewer components than those shown in the figure, or some components may be combined, or some components may be split, or a different component deployment may be used. The components in the portrait may be implemented by hardware, software, or a combination of software and hardware.

The processor 210 may include one or more processing units. For example, the processor 210 may include an application processor (application processor, AP), a Modem, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In another example, in this embodiment of this application, the processor 210 may perform any method for using a cellular communication function according to the embodiments of this application.

The controller may be a nerve center and a command center of the electronic device 200. The controller may generate an operating control signal according to an instruction operation code and a sequence signal, to complete control of fetching and executing an instruction.

A memory may be further arranged in the processor 210, to store instructions and data. In some embodiments, the memory in the processor 210 is a cache. The memory may store instructions or data recently used or cyclically used by the processor 210. If the processor 210 needs to use the instruction or the data again, the processor may directly invoke the instruction or the data from the memory, which avoids repeated access and reduces a waiting time of the processor 210, thereby improving system efficiency.

In some embodiments, the processor 210 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM)

interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (serial clock line, SCL). In some embodiments, the processor 210 may include a plurality of groups of I2C buses. The processor 210 may be coupled to the touch sensor 280K, a charger, a flash, the camera 293, and the like by using different I2C bus interfaces respectively. For example, the processor 210 may be coupled to the touch sensor 280K by using the I2C interface, so that the processor 210 communicates with the touch sensor 280K by using the I2C bus interface, to implement a touch function of the electronic device 200.

The I2S interface may be used for audio communication. In some embodiments, the processor 210 may include a plurality of groups of I2S buses. The processor 210 may be coupled to the audio module 270 through the I2S bus to implement communication between the processor 210 and the audio module 270. In some embodiments, the audio module 270 may transfer an audio signal to the wireless communication module 260 by using the I2S interface, to implement a function of answering a call by using a Bluetooth headset.

The PCM interface may also be used for audio communication, and samples, quantizes, and encodes an analog signal. In some embodiments, the audio module 270 may be coupled to the wireless communication module 260 by using the PCM bus interface. In some embodiments, the audio module 270 may alternatively transfer an audio signal to the wireless communication module 260 by using the PCM interface, to implement the function of answering a call by using a Bluetooth headset. Both the I2S interface and the PCM interface may be used for audio communication.

The UART interface is a universal serial data bus and is used for asynchronous communication. The bus may be a two-way communication bus. The bus converts to-be-transmitted data between serial communication and parallel communication. In some embodiments, the UART interface is usually configured to connect the processor 210 to the wireless communication module 260. For example, the processor 210 communicates with a Bluetooth module in the wireless communication module 260 by using the UART interface, to implement a Bluetooth function. In some embodiments, the audio module 270 may transfer an audio signal to the wireless communication module 260 by using the UART interface, to implement a function of playing music by using a Bluetooth headset.

The MIPI interface may be configured to connect the processor 210 to a peripheral device such as the display screen 294 or the camera 293. The MIPI includes a camera serial interface (camera serial interface, CSI), a display serial interface (display serial interface, DSI), and the like. In some embodiments, the processor 210 communicates with the camera 293 by using the CSI interface, to implement a photographing function of the electronic device 200. The processor 210 communicates with the display screen 294 by using the DSI interface, to implement a display function of the electronic device 200.

The GPIO interface may be configured by using software. The GPIO interface may be configured as a control signal, or may be configured as a data signal. In some embodiments, the GPIO interface may be configured to connect the processor 210 to the camera 293, the display screen 294, the wireless communication module 260, the audio module 270, the sensor module 280, and the like. The GPIO interface may alternatively be configured as an I2C interface, an I2S interface, a UART interface, a MIPI interface, or the like.

The USB interface 230 is an interface that complies with the USB standard specification, and may be specifically a Mini USB interface, a Micro USB interface, a USB Type C interface, and the like. The USB interface 230 may be configured to be connected to the charger to charge the electronic device 200, or may be used for data transmission between the electronic device 200 and the peripheral device, or may be configured to be connected to a headset, to play audio by using the headset. The interface may alternatively be configured to be connected to another electronic device such as an AR device.

It may be understood that a schematic interface connection relationship between the modules in this embodiment is merely an example for description, and constitutes no limitation on the structure of the electronic device 200. In some other embodiments of this application, the electronic device 200 may also adopt an interface connection manner different from that in the foregoing embodiment, or adopt a combination of a plurality of interface connection manners.

The charging management module 240 is configured to receive a charging input from a charger. The charger can be a wireless charger or a wired charger. In some embodiments of wired charging, the charging management module 240 may receive a charging input from the wired charger through the USB interface 230. In some embodiments of wireless charging, the charging management module 240 may receive a wireless charging input through a wireless charging coil of the electronic device 200. The charging management module 240 may supply power to the electronic device by using the power management module 241 while charging the battery 242.

The power management module 241 is configured to connect to the battery 242, the charging management module 240, and the processor 210. The power management module 241 receives an input from the battery 242 and/or the charging management module 240, to supply power to the processor 210, the internal memory 221, the display screen 294, the camera 293, the wireless communication module 260, and the like. The power management module 241 may be further configured to monitor parameters such as a battery capacity, a battery cycle count, and a battery state of health (electric leakage and impedance). In some other embodiments, the power management module 241 may be alternatively arranged in the processor 210. In some other embodiments, the power management module 241 and the charging management module 240 may also be arranged in a same component.

A wireless communication function of the electronic device 200 may be implemented by using the antenna 1, the antenna 2, the mobile communication module 250, the wireless communication module 260, the Modem 210A, the baseband processor, and the like.

The antenna 1 and the antenna 2 are configured to transmit and receive electromagnetic wave signals. Each antenna in the electronic device 200 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 250 may provide a solution to wireless communication such as 2G/3G/4G/5G applied to the electronic device 200. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering and amplification on the received electromagnetic wave, and transmit a processed electromagnetic wave to the Modem for demodulation. The mobile communication module 250 may further amplify a signal modulated by the Modem, and convert the signal into an electromagnetic wave for radiation through the antenna 1. In some embodiments, at least some function modules of the mobile communication module 250 may be arranged in the processor 210. In some embodiments, at least some functional modules of the mobile communication module 250 and at least some modules of the processor 210 may be arranged in the same device.

The Modem 210A may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The application processor outputs a sound signal through an audio device (which is not limited to the speaker 270A, the phone receiver 270B, and the like), or displays an image or a video through the display screen 294. In some embodiments, the Modem 210A may be an independent device. In some other embodiments, the Modem 210A may be independent of the processor 210, and the modem processor and the mobile communication module 250 or another function module may be arranged in a same component. For example, in some embodiments of this application, when being the first device shown in FIG. 1a or FIG. 1b, the electronic device 200 may not have the Modem 210A, and when being the second device shown in FIG. 1a or FIG. 1b, the electronic device 200 needs to have the Modem 210A, so as to provide the cellular communication capability to the first device. For example, in this embodiment of this application, when the electronic device 200 is the second device shown in FIG. 1a or FIG. 1b, the Modem 210A may be a Modem in a second device in any method for using a cellular communication function mentioned in the following embodiments of this application.

The wireless communication module 260 may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 200. The wireless communication module 260 may be one or more components into which at least one communication processing unit is integrated. The wireless communication module 260 receives an electromagnetic wave through the antenna 2, performs frequency modulation and filtering processing on the electromagnetic wave signal, and sends the processed signal to the processor 210. The wireless communication module 260 may further receive a to-be-sent signal from the processor 210, perform frequency modulation and amplification on the to-be-sent signal, and convert the to-be-sent signal into an electromagnetic wave for radiation through the antenna 2.

In some embodiments, in the electronic device 200, the antenna 1 is coupled to the mobile communication module 250, and the antenna 2 is coupled to the wireless communication module 260, so that the electronic device 200 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), and a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 200 implements a display function by using the GPU, the display screen 294, the application processor, and the like. The GPU is a microprocessor for image processing, and is connected to the display 294 and the application processor. The GPU is configured to perform mathematical and geometric calculation, and is configured to render an image. The processor 210 may include one or more GPUs, and execute program instructions to generate or change display information.

The display screen 294 is configured to display an image, a video, and the like. The display screen 294 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device 200 may include one or N display screens 294, and N is a positive integer greater than 1.

A series of graphical user interfaces (graphical user interface, GUI) may be displayed on the display screen 294 of the electronic device 200, and these GUIs are main screens of the electronic device 200. Generally, the size of the display screen 294 of the electronic device 200 is fixed, and only a limited number of controls can be displayed in the display screen 294 of the electronic device 200. A control is a GUI element, is a software component included in an application, and controls all data processed by the application and an interaction with these data, and a user may interact with the control through a direct manipulation (direct manipulation), to read or edit related information of the application. Generally, the controls may include visual interface elements such as icons, buttons, menus, tabs, text boxes, dialog boxes, status bars, navigation bars, and Widgets.

The electronic device 200 can implement a photographing function by using the ISP, the camera 293, the video codec, the GPU, the display screen 294, the application processor, and the like.

The ISP is configured to process data fed back by the camera 293. For example, during photographing, a shutter is opened, light is transferred to a camera photosensitive element by using a lens, an optical signal is converted into an electrical signal, and the camera photosensitive element transfers the electrical signal to the ISP for processing, to convert the electrical signal into an image visible to a naked eye. The ISP may further optimize an algorithm for noise, brightness, and complexion. The ISP may further optimize parameters such as exposure and a color temperature of a photographing scene. In some embodiments, the ISP may be arranged in the camera 293.

The camera 293 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in an RGB format, a YUV format, or the like. In some embodiments, the electronic device 200 may include one or N cameras 293, and N is a positive integer greater than 1.

The digital signal processor is configured to process a digital signal, and in addition to a digital image signal, the digital signal processor may further process another digital signal. For example, when the electronic device 200 performs frequency selection, the digital signal processor is configured to perform Fourier transform and the like on frequency energy.

The video codec is configured to compress or decompress a digital video. The electronic device 200 may support one or more video codecs. In this way, the electronic device 200 may play or record videos in a plurality of encoding formats, such as moving picture experts group (moving picture experts group, MPEG) 1, MPEG 2, MPEG 3, and MPEG 4.

An NPU is a neural network (neural-network, NN) computing processor. By using the structure of a biological neural network, for example, a transmission mode between neurons of a human brain, the NPU can process input information quickly and learn by itself continuously. The NPU may be used to implement an application such as intelligent cognition of the electronic device 200, for example, image recognition, facial recognition, voice recognition, and text understanding.

The external memory interface 220 may be configured to connect to an external storage card such as a micro SD card, to expand a storage capability of the electronic device 200. The external storage card communicates with the processor 210 by using the external memory interface 220, so as to implement a data storage function. For example, a file such as a music or a video is stored in the external storage card.

The internal memory 221 may be configured to store computer executable program code, where the executable program code includes an instruction. The processor 210 runs the instruction stored in the internal memory 221, to implement various functional applications and data processing of the electronic device 200. For example, in this embodiment, the processor 210 may use a cellular communication function by executing instructions stored in the internal memory 221. The internal memory 221 may include a program storage area and a data storage area. The program storage area may store an operating system, an application required by at least one function (for example, a sound playback function and an image display function), and the like. The data storage region may store data (such as audio data and an address book) and the like created when the electronic device 200 is used. In addition, the internal memory 221 may include a high-speed random access memory, or may include a non-volatile memory such as at least one magnetic disk memory, a flash memory, or a universal flash storage (universal flash storage, UFS). The processor 210 runs the instruction stored in the internal memory 221, and/or the instruction stored in the memory arranged in the processor, to perform various function applications and data processing of the electronic device 200.

The electronic device 200 may implement an audio function by using the audio module 270, the speaker 270A, the phone receiver 270B, the microphone 270C, the headset jack 270D, the application processor, and the like, such as music playback, recording, and the like.

The audio module 270 is configured to convert digital audio information into an analog audio signal output, and is further configured to convert an analog audio input into a digital audio signal. The audio module 270 may further be configured to encode and decode audio signals. In some embodiments, the audio module 270 may be arranged in the processor 210, or some functional modules of the audio module 270 are arranged in the processor 210.

The speaker 270A, also referred to as a "horn", is configured to convert an audio electrical signal into a sound signal. Music can be listened to or a hands-free call can be answered by using the speaker 270A in the electronic device 200.

The phone receiver 270B, also referred to as a "receiver", is configured to convert an audio electrical signal into a sound signal. When the electronic device 200 is configured to answer a call or receive voice information, the phone receiver 270B may be put close to a human ear to receive a voice.

The microphone 270C, also referred to as a "microphone" or a "microphone", is configured to convert a sound signal into an electrical signal. When making a call or sending voice information, a user may make a sound near the microphone 270C through the mouth of the user, to input a sound signal into the microphone 270C. At least one microphone 270C may be arranged in the electronic device 200. In some other embodiments, two microphones 270C may be arranged in the electronic device 200, to collect a sound signal and also implement a noise reduction function. In some other embodiments, three, four, or more microphones 270C may be alternatively arranged in the electronic device 200, to collect a sound signal, implement noise reduction, recognize a sound source, implement a directional recording function, and the like.

The headset jack 270D is configured to connect to a wired headset. The headset jack 270D may be a USB interface 230, or may be a 3.5 mm open mobile terminal platform (open mobile terminal platform, OMTP) standard interface, or cellular telecommunications industry association of the USA (cellular telecommunications industry association of the USA, CTIA) standard interface.

The pressure sensor 280A is configured to sense a pressure signal, and can convert the pressure signal into an electrical signal. In some embodiments, the pressure sensor 280A may be arranged in the display screen 294. There are many types of pressure sensors 280A, for example, a resistive pressure sensor, an inductive pressure sensor, and a capacitive pressure sensor. The capacitive pressure sensor may include at least two parallel plates made of a conductive material. When a force is applied to the pressure sensor 280A, capacitance between electrodes changes. The electronic device 200 determines pressure strength based on a change in the capacitance. When a touch operation is performed on the display screen 294, the electronic device 200 detects strength of the touch operation by using the pressure sensor 280A. The electronic device 200 may also calculate a touch position based on a detection signal of the pressure sensor 280A. In some embodiments, touch operations that are performed on a same touch position but have different touch operation intensity may correspond to different operation instructions.

The gyroscope sensor 280B may be configured to determine a motion posture of the electronic device 200. In some embodiments, angular velocities of the electronic device 200 around three axes (that is, an x axis, a y axis, and a z axis) may be determined through the gyroscope sensor 280B. The gyroscope sensor 280B may be used for image stabilization in photography. Exemplarily, when the shutter is pressed, the gyro sensor 280B detects an angle at which the electronic device 200 jitters, and calculates, based on the angle, a distance for which a lens module needs to compensate, and allows the lens to cancel the jitter of the electronic device 200 through reverse motion, thereby implementing image stabilization. The gyro sensor 280B may also be used for navigation and a motion sensing game scene.

The barometric pressure sensor 280C is configured to measure barometric pressure. In some embodiments, the electronic device 200 calculates an altitude by using a barometric pressure value measured by the barometric pressure sensor 280C, to assist in positioning and navigation.

The magnetic sensor 280D includes a Hall effect sensor. The electronic device 200 may detect opening and closing of a flip cover or a leather case by using the magnetic sensor 280D. In some embodiments, when the electronic device 200 is a clamshell phone, the electronic device 200 may detect opening and closing of a flip cover based on the magnetic sensor 280D. Further, a feature such as automatic unlocking of the flip cover is set based on a detected opening or closing state of the leather case or a detected opening or closing state of the flip cover.

The acceleration sensor 280E may detect magnitudes of acceleration of the electronic device 200 in various directions (generally on three axes). When the electronic device 200 is stationary, a magnitude and a direction of gravity may be detected. The acceleration sensor may be further configured to recognize a posture of the electronic device, and is applied to an application such as switching between landscape orientation and portrait orientation or a pedometer.

The distance sensor 280F is configured to measure a distance. The electronic device 200 may measure a distance by infrared light or laser. In some embodiments, in a photographing scene, the electronic device 200 may measure a distance by using the distance sensor 280F, to implement quick focusing.

The optical proximity sensor 280G may include, for example, a light-emitting diode (LED) and an optical detector such as a photodiode. The light-emitting diode may be an infrared light emitting diode. The electronic device 200 emits infrared light by using the light emitting diode. The electronic device 200 detects infrared reflected light from a nearby object by using the photodiode. When sufficient reflected light is detected, it may be determined that there is an object near the electronic device 200. When detecting insufficient reflected light, the electronic device 200 may determine that there is no object near the electronic device 200. The electronic device 200 may detect, by using the optical proximity sensor 280G, that a user holds the electronic device 200 close to an ear for a call, so as to implement automatic screen-off to save power. The optical proximity sensor 280G may also be used in a smart cover mode or a pocket mode to automatically unlock or lock the screen.

The ambient light sensor 280L is configured to sense luminance of ambient light. The electronic device 200 may adaptively adjust a luminance of the display screen 294 according to the perceived ambient light brightness. The ambient light sensor 280L may be further configured to automatically adjust white balance during photo taking. The ambient light sensor 280L may also cooperate with the optical proximity sensor 280G to detect whether the electronic device 200 is in a pocket to prevent a false touch.

The fingerprint sensor 280H is configured to collect a fingerprint. The electronic device 200 may use a feature of the collected fingerprint to implement fingerprint-based unlocking, application lock access, fingerprint-based photographing, fingerprint-based call answering, and the like.

The temperature sensor 280J is configured to measure a temperature. In some embodiments, the electronic device 200 executes a temperature processing policy by using the temperature detected by the temperature sensor 280J. For example, when the temperature reported by the temperature sensor 280J exceeds a threshold, the electronic device 200 reduces performance of a processor near the temperature sensor 280J, to reduce power consumption and implement heat protection. In some other embodiments, when the temperature is lower than another threshold, the electronic device 200 heats the battery 242, to avoid an abnormal shutdown of the electronic device 200 caused by a low temperature. In some other embodiments, when the temperature is lower than still another threshold, the electronic device 200 boosts an output voltage of the battery 242 to avoid abnormal shutdown caused by a low temperature.

The touch sensor 280K is also referred to as a "touch device". The touch sensor 280K may be arranged on the display screen 294. The touch sensor 280K and the display screen 294 form a touchscreen. The touch sensor 280K is configured to detect a touch operation performed on or near the touch sensor 280K. The touch sensor may transmit the detected touch operation to the application processor, to determine a touch event type. Visual output related to the touch operation may be provided by using the display screen 294. In some other embodiments, the touch sensor 280K may be alternatively arranged on a surface of the electronic device 200, and is located on a position different from that of the display screen 294.

The bone conduction sensor 280M may obtain a vibration signal. In some embodiments, the bone conduction sensor 280M may obtain a vibration signal of a vibration bone of a human vocal-cord part. The bone conduction sensor 280M may alternatively contact a human pulse, and receive a blood pressure beating signal. In some embodiments, the bone conduction sensor 280M may be alternatively arranged in a headset, to form a bone conduction headset. The audio module 270 may parse out a voice signal based on the vibration signal of the vibration bone of the vocal-cord part that is obtained by the bone conduction sensor 280M, to implement a voice function. The application processor may parse heart rate information based on the blood pressure beating signal obtained by the bone conduction sensor 280M, to implement a heart rate detection function.

The key 290 includes a power key, a volume key, and the like. The key 290 may be a mechanical key, or may be a touch-type key. The electronic device 200 may receive a key input, and generate a key signal input related to user setting and function control of the electronic device 200.

The motor 291 may generate a vibration prompt. The motor 291 may be configured to provide a vibration prompt for an incoming call, and may be further configured to provide a touch vibration feedback. For example, touch operations applied to different applications (for example, photographing, audio playback, or the like) may correspond to different vibration feedback effects. For touch operations performed on different regions of the display screen 294, the motor 291 may also correspond to different vibration feedback effects. Different application scenarios (for example, a time prompt, information receiving, an alarm clock, and a game) may also correspond to different vibration feedback effects. Customization of a touch vibration feedback effect may also be supported.

The indicator 292 may be an indicator light, and may be configured to indicate a charging state or a battery change, or may be further configured to indicate a message, a missed call, a notification, or the like.

The SIM card interface 295 is configured to connect to a SIM card. The SIM card may be inserted into the SIM card interface 295 or unplugged from the SIM card interface 295, to come into contact with or be separated from the electronic device 200. The electronic device 200 may support one or N SIM card interfaces, and N is a positive integer greater than 1. The SIM card interface 295 may support a Nano SIM card, a Micro SIM card, a SIM card, and the like. A plurality of cards can be inserted into the same SIM card interface 295 together. Types of the plurality of cards may be the same or different. The SIM card interface 295 may also be compatible with different types of SIM cards. The SIM card interface 295 may also be compatible with an external storage card. The electronic device 200 interacts with the network by the SIM card to implement functions such as call and data communication. In some embodiments, the electronic device 200 uses an eSIM, that is, an embedded SIM card. The eSIM card may be embedded in the electronic device 200 and cannot be separated from the electronic device 200.

In addition, an operating system runs on the foregoing components, for example, a Harmony operating system, an iOS operating system, an Android operating system, a Windows operating system, and the like. An application may be installed and run on the operating system.

Figures 1, 3A:
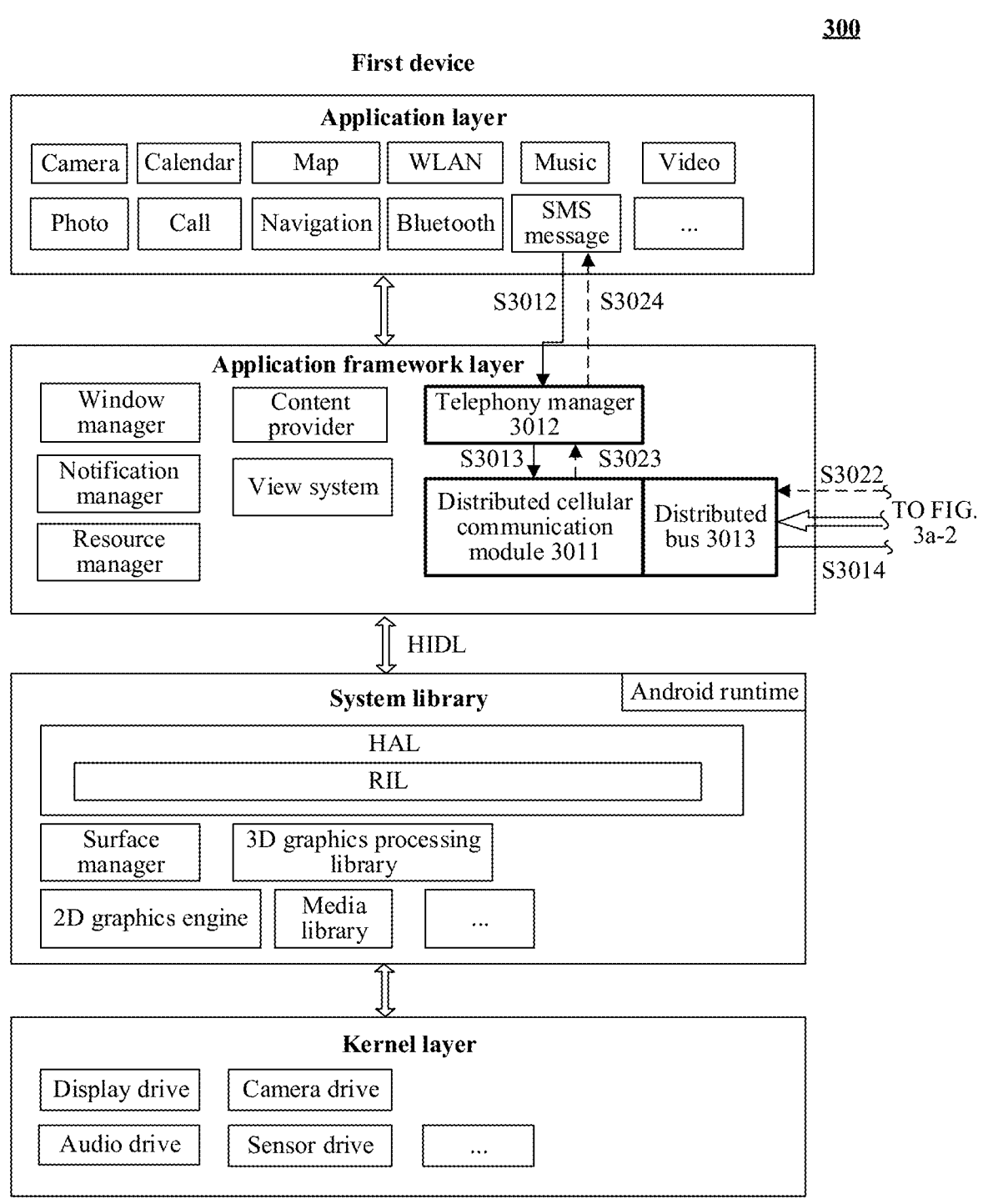
Figures 2, 3A:
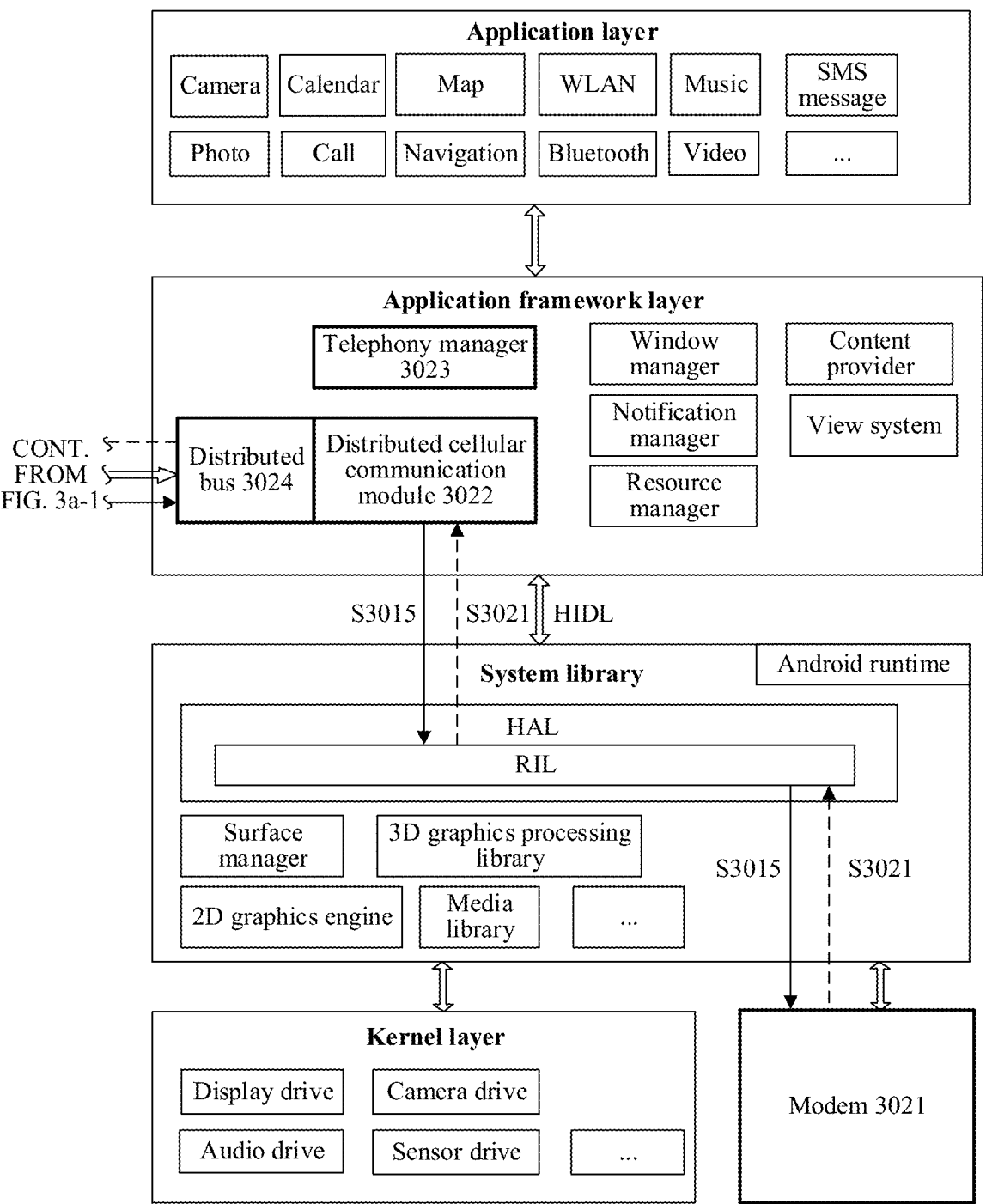

Referring to FIG. 3a-1 and FIG. 3a-2, in some embodiments, in a layered architecture of a first device in a system 300 for using a cellular communication function, software is divided into several layers, and each layer has a clear role and task. The layers communicate with each other by using a software interface. In some embodiments, the Android system is divided into four layers that are respectively an application layer, an application framework layer, an Android runtime (Android runtime) and system library, and a kernel layer from top to bottom.

The application layer may include a series of application packages. As shown in FIG. 3a-1 and FIG. 3a-2, the application packages may include applications such as camera, photos, calendar, phone, maps, navigation, WLAN, Bluetooth, music, videos, and SMS messages.

The application framework layer provides an application programming interface (application programming interface, API) and a programming framework for applications in the application layer. The application framework layer includes some predefined functions. As shown in FIG. 3a-1 and FIG. 3a-2, the application framework layer may include a window manager, a content provider, a view system, a distributed cellular communication module 3011, a telephony manager 3012, a distributed bus 3013, a resource manager, a notification manager, and the like.

The window manager is configured to manage a window program. The window manager may obtain a size of a display screen, determine whether there is a status bar, lock the screen, capture the screen, and the like.

The content provider is configured to store and acquire data, and make the data accessible to an application. The data may include a video, an image, audio, calls made and answered, a browsing history and bookmarks, an address book, and like.

The view system includes a visual control such as a control for text display or a control for picture display. The view system may be configured to construct an application. The display interface may include one or more views. For example, a display interface including an SMS message notification icon may include a text display view and an image display view.

The phone manager 3012 is configured to provide a cellular communication function of the first device, for example, management of a call status (including answering, declining, or the like). For details of functions of the telephony manager 3012 in this embodiment of this application, reference may be made to the foregoing description of the telephony manager 3012 in the system 100 for using a cellular communication function.

The distributed cellular communication module 3011 is configured to forward a cellular communication service request of the telephony manager 3012 to a distributed cellular communication module 3022 of a second device. For details of functions of the distributed cellular communication module 3011 of the first device in this embodiment of this application, reference may be made to the following description of the distributed cellular communication module 3011 of the first device in the system 300 for using a cellular communication function.

The distributed bus 3013 is configured to establish a connection channel between the distributed cellular communication module 3011 of the first device and the distributed cellular communication module 3022 of the second device, to connect the distributed cellular communication module 3011 of the first device and the distributed cellular communication module 3022 of the second device. In some embodiments, the distributed bus 3013 may be responsible for device discovery, self-connection, authentication management and the like under a same account in a near field, a local area network, or a far field; may be further responsible for scheduling management, quality-of-service experience evaluation and the like of different channels, and is transparent to the application layer; may be further responsible for maintaining channels and providing a low-power standby mechanism; and may be further responsible for forwarding/responding, encrypted encapsulation and the like of control plane signaling (for example, the cellular communication service request and response data corresponding to the cellular communication service request mentioned in this embodiment of this application).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, such as a surface manager (surface manager), a media library (media libraries), a three-dimensional graphics processing library (for example, OpenGL ES), and a 2D graphics engine (for example, SGL), an HAL, and an RIL module on an HAL. An HIDL interface is further provided on the RIL module.

The surface manager is configured to manage a display subsystem and provide fusion of 2D and 3D layers for a plurality of applications.

The media library supports playback and recording in a plurality of common audio and video formats, a static image file, and the like. The media library may support a plurality of audio and video coding formats, such as: MPEG 4, H.264, H.265, H.266, VP9, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawings.

The kernel layer is a layer between hardware and software. The kernel layer includes at least a display drive, a camera drive, an audio drive, and a sensor drive.

Still referring to FIG. 3a-1 and FIG. 3a-2, in a layered architecture of the second device, software is also divided into several layers, and each layer has a clear role and task. The layers communicate with each other by using a software interface. In some embodiments, the Android system is divided into four layers that are respectively an application layer, an application framework layer, an Android runtime (Android runtime) and system library, a kernel layer, and a Modem 3021 from top to bottom.

The application layer may include a series of application packages. As shown in FIG. 3a-1 and FIG. 3a-2, the application packages may include applications such as camera, photos, calendar, phone, maps, navigation, WLAN, Bluetooth, music, videos, and SMS messages.

The application framework layer provides an application programming interface (application programming interface, API) and a programming framework for applications in the application layer. The application framework layer includes some predefined functions. As shown in FIG. 3*a*-1 and FIG. 3*a*-2, the application framework layer may include a window manager, a content provider, a view system, a distributed cellular communication module 3022, a telephony manager 3023, a distributed bus 3024, a resource manager, a notification manager, and the like.

The window manager is configured to manage a window program. The window manager may obtain a size of a display screen, determine whether there is a status bar, lock the screen, capture the screen, and the like.

The content provider is configured to store and acquire data, and make the data accessible to an application. The data may include a video, an image, audio, calls made and answered, a browsing history and bookmarks, an address book, and like.

The view system includes a visual control such as a control for text display or a control for picture display. The view system may be configured to construct an application. The display interface may include one or more views.

In some embodiments, the phone manager 3023 may be configured to provide a cellular communication function of the second device, for example, management of a call status (including answering, declining, or the like). A local cellular communication service request received by the telephony manager 3023 may be sent to the distributed cellular communication module 3022 of the second device, and the distributed cellular communication module 3022 continues to send the local cellular communication service request to the Modem 3021 for processing.

The distributed cellular communication module 3022 is configured to send the cellular communication service request sent by the first device to the Modem 3021 for processing, and send the response data corresponding to the cellular communication service request to the first device. Specifically, for details of functions of the distributed cellular communication module 3022 of the second device in this embodiment of this application, reference may be made to the following description of the distributed cellular communication module 3022 of the second device in the system 300 for using a cellular communication function.

The principle and execution process of the distributed bus 3024 of the second device are consistent with those of the distributed bus 3013 of the first device, reference may be made, and details are not described herein again.

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, such as a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of common audio and video formats, a static image file, and the like. The media library may support a plurality of audio and video coding formats, such as: MPEG 4, H.264, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawings.

The kernel layer is a layer between hardware and software. The kernel layer includes at least a display drive, a camera drive, an audio drive, and a sensor drive.

The Modem 3021 is configured to process the received cellular communication service request, obtain the response data corresponding to the cellular communication service request, and then send the response data corresponding to the cellular communication service request to the distributed cellular communication module 3022.

It should be noted that, although this embodiment of this application is described by using an Android system as an example, the basic principle is also applicable to an electronic device based on an operating system such as Harmony, iOS, or Windows.

Still referring to FIG. 3*a*-1 and FIG. 3*a*-2, based on the foregoing related technology, an embodiment of this application propose a system for using a cellular communication function. The system for using a cellular communication function includes: a first device and a second device. A distributed cellular communication module 3011 and a telephony manager 3012 are arranged in an application framework layer of the first device, a distributed cellular communication module 3022 and a telephony manager 3023 are also arranged in an application framework layer of the second device, and a Modem 3021 is further arranged in the second device. A connection is established between the distributed cellular communication module 3011 of the first device and the distributed cellular communication module 3022 of the second device through a distributed bus 3013 of the first device and a distributed bus 3024 of the second device.

Figure 3B:
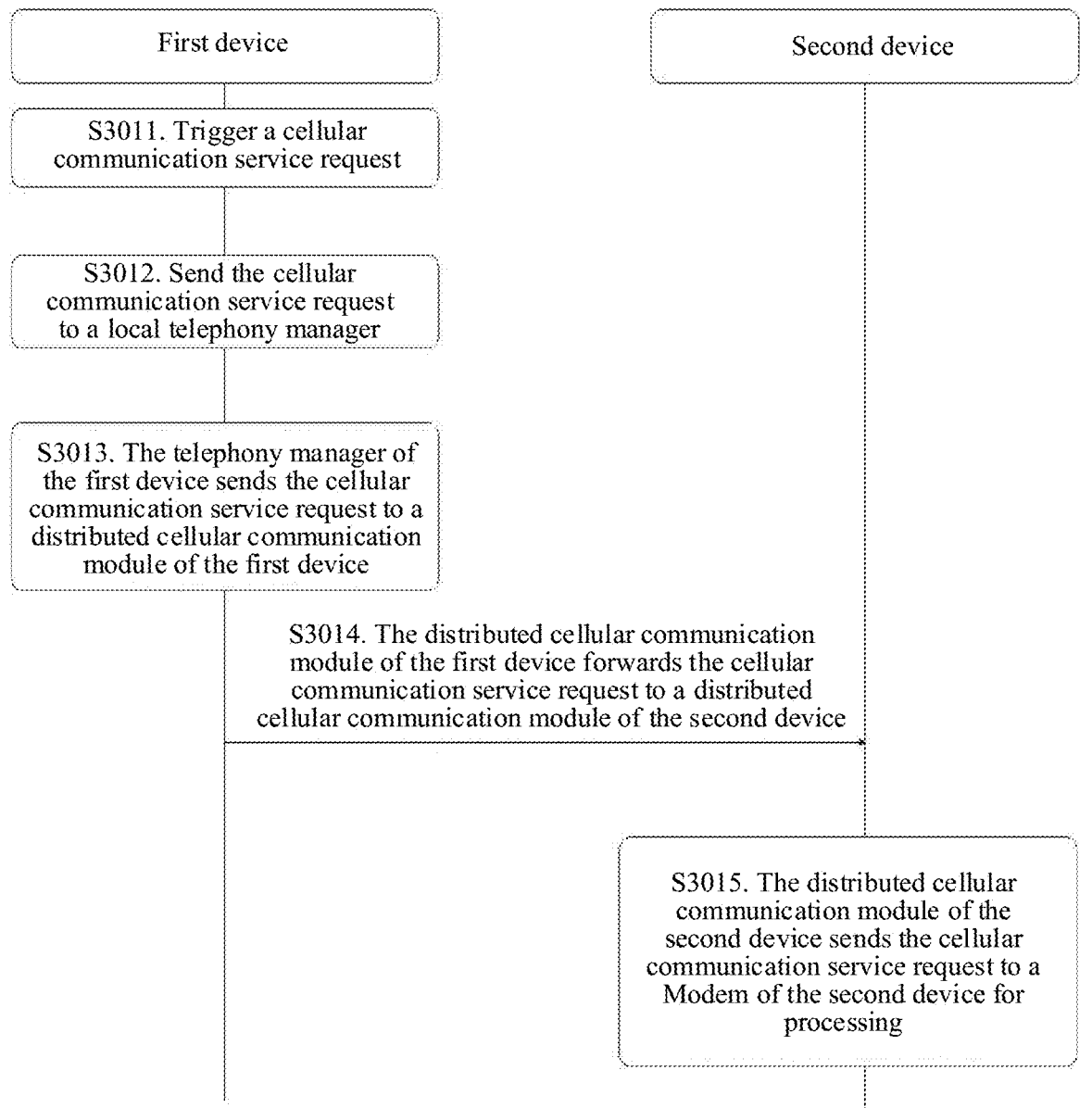
FIG. 3b is a processing flowchart of a cellular communication service request in FIG. 3a-1 and FIG. 3a-2 according to an embodiment of this application.

In some embodiments, when the second device shares its own cellular communication capability (that is, shares the Modem of the second device) with the first device, as shown in FIG. 3b, a process of processing a cellular communication service request in the system in FIG. 3a-1 and FIG. 3a-2 may be: The first device performs step S3011, to trigger a cellular communication service request. Then, the first device performs step S3012, to send the cellular communication service request to a local telephony manager. In step S3013, the telephony manager of the first device sends the cellular communication service request to a local distributed cellular communication module. In step S3014, the distributed cellular communication module of the first device forwards the cellular communication service request to a distributed cellular communication module of the second device. The second device performs step S3015, the distributed cellular communication module of the second device sends the cellular communication service request to a local Modem of the second device for processing, and the Modem of the second device obtains response data corresponding to the cellular communication service request.

For example, a process of transmitting the cellular communication service request in the system 300 may be shown by a solid-line path shown in FIG. 3a-1 and FIG. 3a-2: An SMS message application in an application layer of the first device performs step S3011 to trigger the cellular communication service request, where the cellular communication service request may be an SMS message sending request. The first device performs step S3012, to send the cellular communication service request triggered by the application layer trigger to a local telephony manager 3012. In step S3013, the telephony manager 3012 of the first device sends the cellular communication request to the distributed cellular communication module 3011 of the first device. In step S3014, the distributed cellular communication module 3011 of the first device forwards the cellular communication service request received by the telephony manager 3012 of the first device to the distributed cellular communication module 3022 of the second device. In step S3015, the distributed cellular communication module 3022 of the second device sends the cellular communication service request to the local Modem 3021 for processing. In some embodiments, the distributed cellular communication module 3022 of the second device invokes a hardware abstraction layer interface definition language (HAL interface definition language, HIDL) interface through a radio interface layer (Radio Layer Interface, RIL) module on a hardware abstraction layer (Hardware Abstraction Layer, HAL) of a system library, to transmit the cellular communication service request to the local Modem 3021 for processing. After processing the cellular communication service request, the Modem 3021 obtains the response data corresponding to the cellular communication service request.

In some other embodiments, the cellular communication service request of the first device may alternatively not be sent to the distributed cellular communication module 3011 through the telephony manager 3012. For example, an IP multimedia subsystem (IP Multimedia Subsystem, IMS) may directly invoke the distributed cellular communication module 3011 on the application layer, that is, the cellular communication service request is sent directly from the application layer to the distributed cellular communication module 3011. An upper-layer application (that is, the application layer and the application framework layer) invokes the distributed cellular communication module in many manners. This is not limited in this embodiment of this application.

Figure 3C:
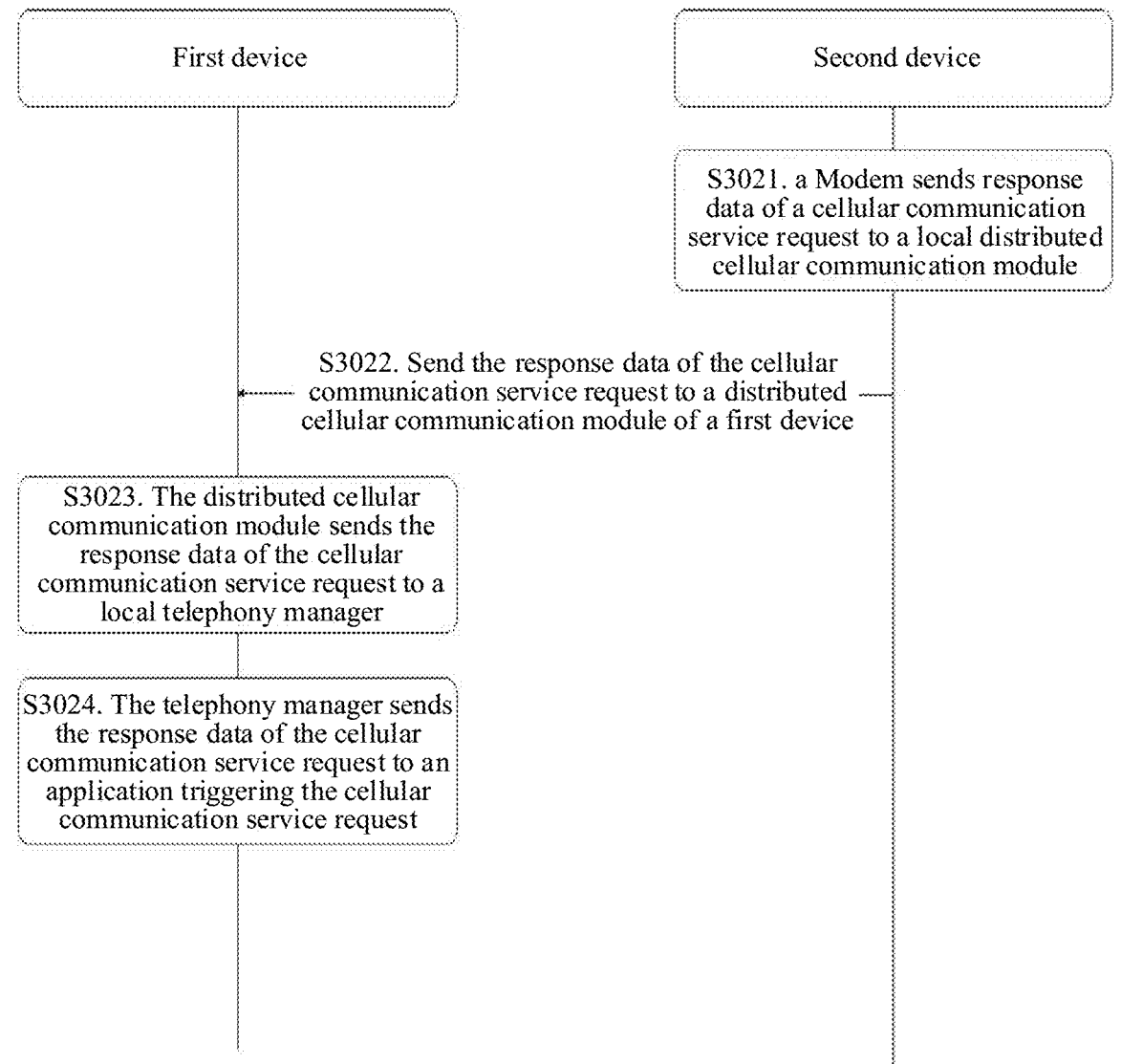
FIG. 3c is a processing flowchart of response data corresponding to the cellular communication service request in FIG. 3a-1 and FIG. 3a-2 according to an embodiment of this application.

In some embodiments, as shown in FIG. 3c, a process of processing response data corresponding to a cellular communication service request in the system in FIG. 3a-1 and FIG. 3a-2 may be: In step S3021, a Modem of a second device sends response data corresponding to a cellular communication service request to a local distributed cellular communication module. In step S3022, a distributed cellular communication module of the second device sends the response data corresponding to the cellular communication service request to a distributed cellular communication module of a first device. In step S3023, the distributed cellular communication module of the first device sends the response data corresponding to the cellular communication service request to a local telephony manager. In step S3024, the telephony manager of the first device sends the response data corresponding to the cellular communication service request to an application triggering the cellular communication service request.

For example, a path of transmitting response data corresponding to a cellular communication service request may be shown by a dashed-line path in FIG. 3a-1 and FIG. 3a-2: In step S3021, a Modem 3021 of a second device transmits response data corresponding to a cellular communication service request to a distributed cellular communication module 3022. In some embodiments, when performing step S3021, the Modem 3021 of the second device invokes an HIDL interface through an RIL module in a system library, to transmit the response data corresponding to the cellular communication service request to the distributed cellular communication module 3022. In step S3022, the distributed cellular communication module 3022 transmits the response data corresponding to the cellular communication service request to the distributed cellular communication module 3011 of the first device. In step S3023, the distributed cellular communication module 3011 of the first device sends the response data corresponding to the cellular communication service request to a telephony manager 3012. In step S3024, the telephony manager 3012 transmits the response data corresponding to the cellular communication service request to an SMS message application.

It should be noted that, a communicative connection is established between the distributed bus 3013 of the first device and the distributed bus 3024 of the second device in many forms, and the communicative connection may be established in a wired form, or the communicative connection may be established in a wireless form. For example, in FIG. 1a, when the first device is the tablet computer 12 and the second device is the mobile phone 11, a wireless connection may be established in a Bluetooth manner or a communicative connection may be established by connecting to same wireless Wi-Fi between the mobile phone 11 and the tablet computer 12. A difference between manners of establishing a communicative connection between the first device and the second device does not affect implementation of this embodiment of this application.

It should be further noted that each of the distributed cellular communication module 3011 of the first device and the distributed cellular communication module 3022 of the second device is run in a system service. Specifically, when each of the distributed cellular communication module 3011 of the first device and the distributed cellular communication module 3022 of the second device implements a self-supported service, the service is configured as a system service. It can be known according to the related technology of the system service that, the system service is usually automatically started during startup, and includes a special process identifier (Process Identifier, PID) and a user identifier (User Identifier, UID). Compared with an ordinary service, the system service has a larger system access permission. Therefore, applications or other modules in the system can all access the distributed cellular communication module 3011 of the first device and the distributed cellular communication module 3022 of the second device, and then each cellular communication service request of the first device can be forwarded to the distributed cellular communication module 3022 of the second device through the distributed cellular communication module 3011 of the first device.

Usually, each service arranged in the framework layer or the system library is a system service, but a system service may also be similarly arranged in another position in the system, such as the application layer. Therefore, the distributed cellular communication module 3011 of the first device may be further arranged in the system library or the application layer of the first device in addition to the application framework layer of the first device shown in FIG. 3*a*-1 and FIG. 3*a*-2, as long as the distributed cellular communication module 3011 of the first device is configured as a system service in advance. Similarly, the distributed cellular communication module 3022 of the second device may be further arranged in the system library or the application layer of the second device in addition to the application framework layer of the second device shown in FIG. 3*a*-1 and FIG. 3*a*-2, as long as the distributed cellular communication module 3022 of the second device is configured as a system service in advance.

Each of the distributed cellular communication module 3011 of the first device and the distributed cellular communication module 3022 of the second device is run in a system service. Therefore, each cellular communication service request of the first device can be forwarded through the distributed cellular communication module 3011 of the first device to the Modem 3021 of the second device for processing, and the distributed cellular communication module 3022 of the second device can transmit the response data corresponding to the cellular communication service request to the first device by sending the response data corresponding to the cellular communication service request to the distributed cellular communication module 3011 of the first device. Therefore, the first device can use all cellular communication capabilities of the second device, that is, can use all cellular communication functions. Moreover, the distributed cellular communication module 3011 of the first device is arranged in the application framework layer, that is, a service provided by the distributed cellular communication module 3011 of the first device is a system service, and can undertake and process all cellular communication service requests in the application layer, which does not need to be like the case in the foregoing solution for using a cellular communication function, that a cellular communication function can be shared only if the same application is installed in devices. In this embodiment of this application, even if the second device does not have the same application as that of the first device, the cellular communication service request of the first device can still be forwarded to the distributed cellular communication module 3022 of the second device for processing.

Based on the system for using a cellular communication function shown in FIG. 3*a*-1 and FIG. 3*a*-2, a process of using a cellular communication function between the first device and the second device is introduced specifically below through the following embodiments.

Figure 4A:
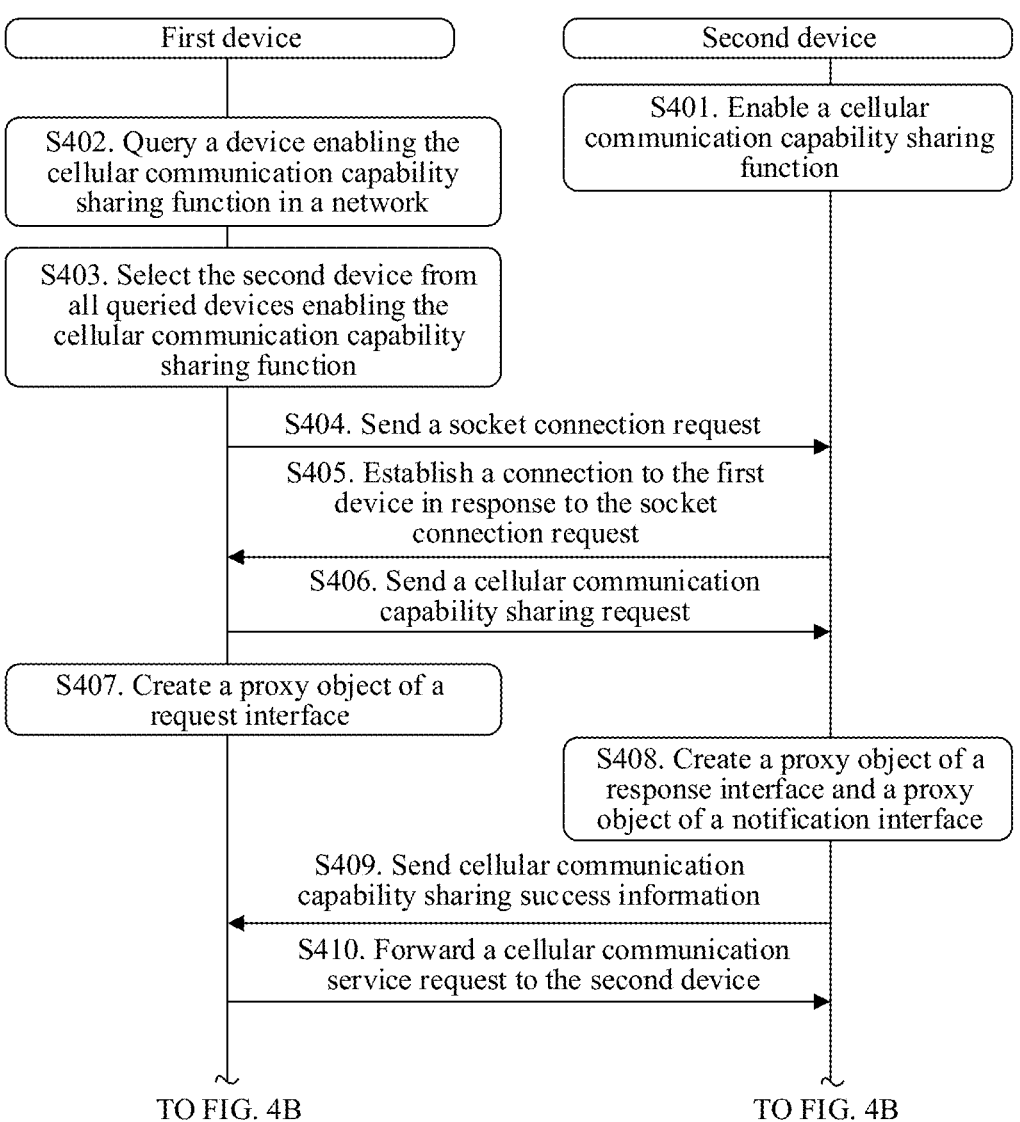
FIG. 4A and FIG. 4B are a flowchart 1 of a method for using a cellular communication function according to an embodiment of this application.
Figure 4B:
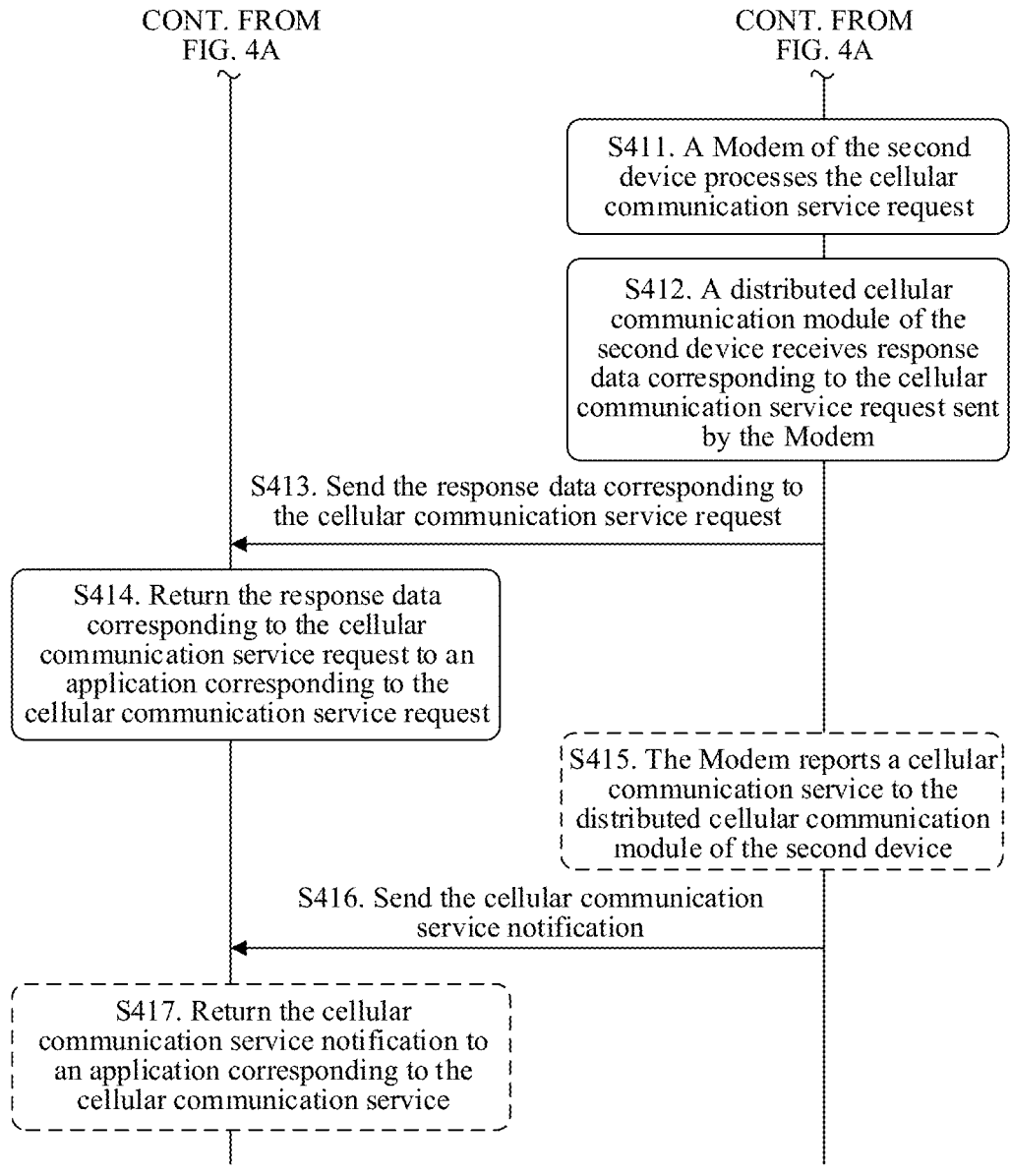

Referring to FIG. 4A and FIG. 4B, an example in which each of a first device and a second device is an electronic device with an Android operating system is used, where the first device is a cellular communication capability demander (or user), the second device is a cellular communication capability provider, and the method for using a cellular communication function may specifically include the following steps:

S401. The second device enables a cellular communication capability sharing function.

The cellular communication capability sharing function refers to a function of sharing a local Modem with another device. Because the Modem can provide a cellular communication capability, that the local Modem is shared with the another device means that a cellular communication capability is shared with the another device. The second device in this embodiment of this application refers to an electronic device having a cellular communication capability.

In some embodiments, the second device enables the cellular communication capability sharing function in response to an operation of a user. In some other embodiments, the second device may enable the cellular communication capability sharing function through a distributed cellular communication module of the second device. Like the distributed cellular communication module 3022 shown in FIG. 3*a*-1 and FIG. 3*a*-2, the distributed cellular communication module of the second device may be arranged in an application framework layer of the second device. In some other embodiments, step S401 may be performed by one or more modules in the second device collaboratively, and the modules performing step S401 may be located in different framework layers in the second device.

In some embodiments, when the distributed cellular communication module of the second device enables the cellular communication capability sharing function, the second device is in a state of being discoverable to another device, and when discovering the second device, the another device may know that the current cellular communication capability sharing function of the second device is enabled and can be shared with the another device. However, the second device is caused to be in a state of being discoverable to another device in many manners. For example, the second device enabling Bluetooth may be discovered by another device enabling a Bluetooth function, the second device accessing a local area network may be discovered by another device within the local area network, the second device accessing a near field network (for example, a wireless network) may be discovered by another device within the near field network, and the second device logging in to an account may be discovered by another device under the account.

Figure 5:
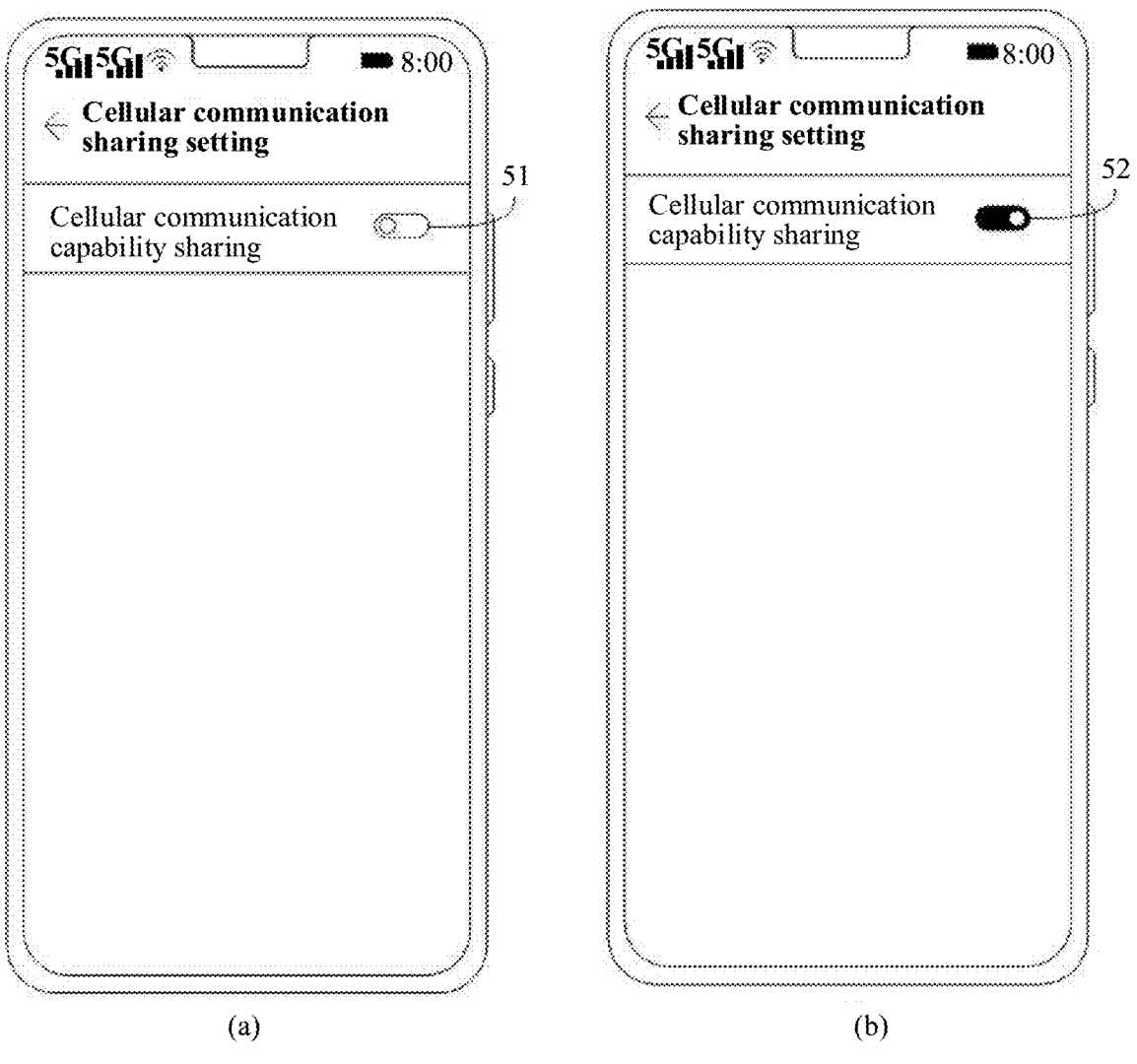
FIG. 5 is a schematic diagram of an interface used for enabling a cellular communication capability sharing function according to an embodiment of this application.

In some embodiments, a startup operation of the second device triggers the distributed cellular communication module of the second device to enable the cellular communication capability sharing function, or the cellular communication capability sharing function is enabled by default after the second device is started up, or the user clicks a switch key of enabling the cellular communication capability on an interface of the second device. For example, as shown in FIG. 5, a switch key having a cellular communication capability is arranged on a cellular communication sharing setting interface. When a user operates the switch key as a switch key 51 shown in (a) in FIG. 5, a cellular communication capability sharing function is disabled. When the user operates the switch key as a switch key 52 shown in (b) in FIG. 5, the cellular communication capability sharing function is enabled. An operation instruction of the user for the switch key of enabling the cellular communication capability is conveyed to a distributed cellular communication module of a second device in an application framework layer through an application layer, to trigger the distributed cellular communication module of the second device to enable the cellular communication capability sharing function.

It can be known from the foregoing content that, the second device performs step S401 in many manners, including but not limited to the content proposed in this embodiment of this application.

In a few cases, step S401 may alternatively not be performed, and the second device enables the cellular communication capability sharing function by default, or when a particular condition is detected, the cellular communication capability sharing function is automatically enabled. For example, the particular condition may be that a near device with the same brand is detected, or a server notification is enabled.

S402. The first device queries a device enabling the cellular communication capability sharing function in a network.

Figure 6:
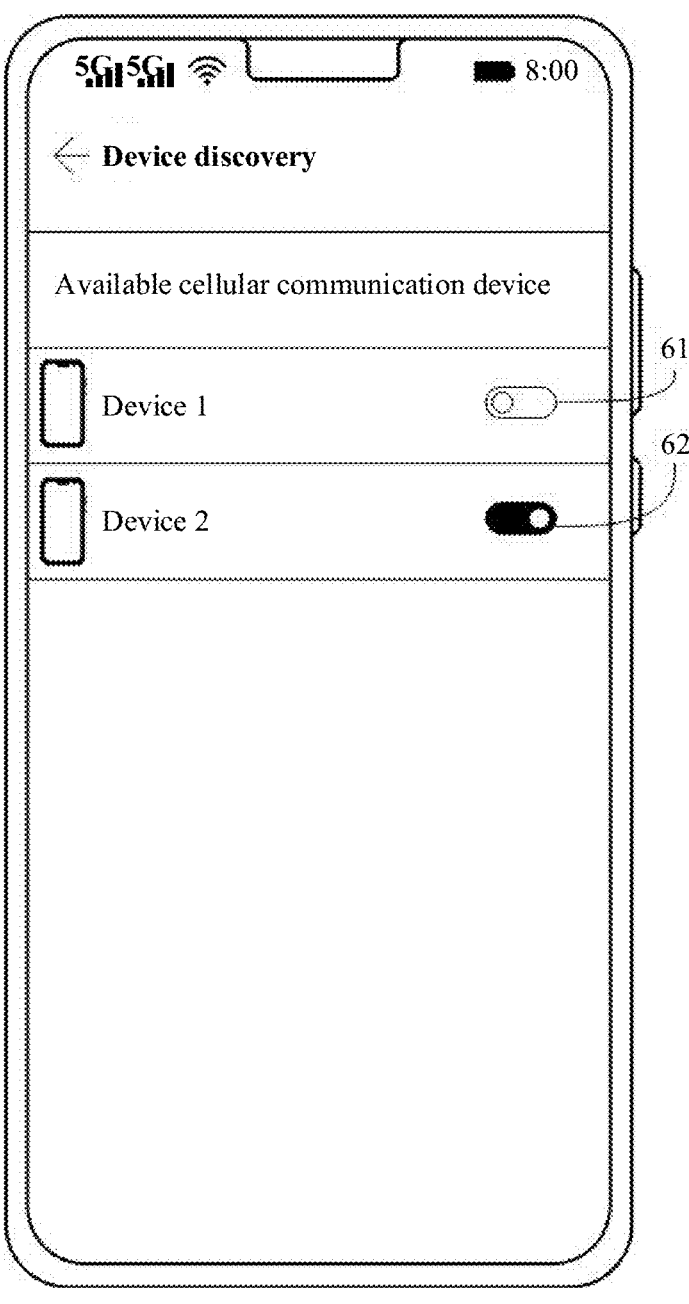
FIG. 6 is a schematic diagram of an interface of a device used for selecting to enable a cellular communication capability sharing function according to an embodiment of this application.

The first device has a device discovery function, and the device enabling the cellular communication capability sharing function in the network can be discovered by the first device. In some embodiments, after the first device queries the device enabling the cellular communication capability sharing function in the network, the device may be further presented on an interface of the first device, for the user to select. For example, as shown in FIG. 6, an available cellular communication device (that is, a device enabling a cellular communication capability sharing function in a network) is presented on a device discovery interface, and each of a device 1 and a device 2 is a device enabling the cellular communication capability sharing function in the network. As shown by a key switch 61, it indicates that the user does not use a cellular communication capability of the device 1. As shown by a key switch 62, it indicates that the user uses a cellular communication capability of the device 2.

In some embodiments, the user may simultaneously select to connect to the device 1 and the device 2. In this case, the user may simultaneously use cellular communication capabilities of at least two devices. For example, if the device 1 is equipped with a China Telecom card, and the device 2 is equipped with a China Mobile card, the user may simultaneously use the cellular communication capabilities of the device 1 and the device 2, that is, simultaneously use the China Telecom card and the China Mobile card on a device shown in FIG. 6.

In some embodiments, the first device may perform step S402 through the distributed cellular communication module of the first device. As shown in FIG. 3a-1 and FIG. 3a-2, the distributed cellular communication module of the first device may be arranged in the application framework layer of the first device. The distributed cellular communication module of the first device can query, through a Bluetooth discovery function of the first device, a device enabling Bluetooth and enabling the cellular communication capability sharing function, may further query a device being within a local area network where the first device is located and enabling the cellular communication capability sharing function, may further query a device being within a near field network where the first device is located and enabling the cellular communication capability sharing function, and may further query another device under a login account of the first device.

In some embodiments, the distributed cellular communication module of the first device may discover, through a distributed bus in the first device, a device enabling the cellular communication capability sharing function in a near field network, a local area network, or a far field network, and then query the device enabling the cellular communication capability sharing function in the network. For example, the distributed cellular communication module of the first device may discover, through a distributed bus, a device enabling the cellular communication capability sharing function under the same account in a far field network.

In some embodiments, step S402 may be performed by triggering of the user. Specifically, the user performs, through a display interface of the first device, an operation of querying a device enabling the cellular communication capability sharing function in a network, the distributed cellular communication module of the first device performs step S402 in response to the operation of the user, or step S402 may be performed by automatic triggering and when the first device is started up. Step S402 is performed by triggering in many manners, including but not limited to the content proposed in this embodiment of this application.

In this embodiment of this application, the second device performs step S401. Therefore, when the first device performs step S402, it can be queried that the second device is a device enabling the cellular communication capability sharing function, and it is known that the cellular communication capability of the second device can be shared, that is, the Modem of the second device is allowed to be shared with the first device.

S403. The first device selects the second device from all queried devices enabling the cellular communication capability sharing function.

In this embodiment of this application, the second device refers to a device with a cellular communication capability that the first device needs to use, that is, the first device selects to use the cellular communication capability of the second device.

The first device queries, through step S402, one or more devices enabling the cellular communication capability sharing function. The first device may select, from all queried devices enabling the cellular communication capability sharing function, a device with a cellular communication capability that the first device intends to use as the second device.

In some embodiments, one device may be selected from all queried devices enabling the cellular communication capability sharing function as the second device, that is, the first device selects to use a cellular communication function of only the one device. In some other embodiments, a plurality of devices may be selected from all queried devices enabling the cellular communication capability sharing function as second devices, that is, the first device may select to use their respective cellular communication functions of the plurality of devices.

In some embodiments, step S403 may be performed through the distributed cellular communication module of the first device, or may be performed through a plurality of modules in the first device collaboratively.

In some embodiments, the second device may be automatically selected by the distributed cellular communication module of the first device according to a preconfigured selection rule. The selection rule may be selecting a device randomly or arbitrarily, may be preferentially selecting a nearest device, or may be preferentially selecting a device with a strongest signal, or another rule. The selection rule is set in many manners, including but not limited to the content proposed in this embodiment of this application.

In some other embodiments, the first device may select, in response to a selection operation of the user, the second device from all queried devices enabling the cellular communication capability sharing function. For example, after performing step S402, the distributed cellular communication module of the first device sends all queried devices enabling the cellular communication capability sharing function back to the application layer, all the devices are displayed on the display interface of the first device, and the user then selects, in a click manner, the second device from all the devices displayed on the display interface. For example, as shown in FIG. 6, the user selects the device 2 from a list of available cellular communication devices as the second device. Then, the first device performs step S403 in response to the selection operation of the user, that is, selects the second device designated by the selection operation of the user from all queried devices enabling the cellular communication capability sharing function. The first device selects the second device in many manners, including but not limited to the content proposed in this embodiment of this application.

It should be noted that, steps S401 to S403 are optional steps. In some embodiments, the second device is preset, and when discovering the second device, the first device may directly establish a connection, that is, directly perform step S404. For example, when each of the second device and the first device is in a startup state, step S404 is directly performed by default, and step S401 to step S403 may not be performed.

S404. The first device sends a socket (socket) connection request to the second device.

If a socket connection between the first device and the second device needs to be established, at least one pair of sockets are required, where one socket is run in the first device (that is, a user of the cellular communication capability), and the other is run in the second device (that is, a provider of the cellular communication capability).

In some embodiments, the distributed cellular communication module of the first device makes a socket connection request to the distributed cellular communication module of the second device by using the socket of the first device. The socket of the second device to be connected is described in the socket connection request, indicating an address of the socket of the second device and a port number, and the socket of the first device is also described in the socket connection request.

When the first device creates the Socket connection request, a used protocol such as the Transmission Control Protocol (Transmission Control Protocol, TCP) or the User Datagram Protocol (User Datagram Protocol, UDP) may be designated.

S405. The second device establishes a connection to the first device in response to the socket connection request.

After the second device establishes the connection to the first device in response to the socket connection request, communication between the first device and the second device may be implemented.

In some embodiments, after receiving the socket connection request sent by the first device, the distributed cellular communication module of the second device responds to the socket connection request, then performs some operations of authenticating the connection request, and establishes a connection to the distributed cellular communication module of the first device after the authentication succeeds. In some embodiments, a connection may be established between the distributed cellular communication module of the second device and the distributed cellular communication module of the first device through distributed buses. After the connection is established between the distributed cellular communication module of the first device and the distributed cellular communication module of the first device through the distributed buses, the distributed communication buses may maintain a connection channel non-interrupted. The distributed buses may be further in a low-power standby mechanism when the first device and the second device are in a connected state, is in a working state only when the distributed buses need to do sending work, and is in a low-power standby state at other moments. Exemplarily, a connection between the distributed cellular communication module of the first device and the distributed cellular communication module of the second device may be established through the distributed bus 3013 and the distributed bus 3024 shown in FIG. 3*a*-1 and FIG. 3*a*-2.

In some embodiments, step S404 to step S405 may be understood as a process of establishing a connection between the distributed cellular communication module of the first device and the distributed cellular communication module of the second device. In addition to the socket manner, the connection may be further established in a manner such as a hardware connection manner, a wireless network connection manner, or another network connection protocol manner, that is, the connection is established between the distributed cellular communication module of the first device and the distributed cellular communication module of the second device in many manners, including but not limited to the content proposed in this embodiment of this application.

S406. The first device sends a cellular communication capability sharing request to the second device.

After establishing the connection to the second device, the first device automatically triggers sending the cellular communication capability sharing request to the second device. The cellular communication capability sharing request is used for requesting the second device to share the cellular communication capability of the second device, or may be understood as requesting to grant permission to use the Modem of the second device to the first device.

In some embodiments, the cellular communication capability sharing request may be generated by triggering of the distributed cellular communication module of the first device, and is sent to the distributed cellular communication module of the second device. In some other embodiments, the cellular communication capability sharing request may alternatively be sent to the second device under collaboration of one or more modules in the first device.

In some embodiments, the cellular communication capability sharing request may carry a unique identifier of the first device (for example, an address and a port number of the first device) and a unique identifier of the second device (for example, an address and a port number of the second device).

In some embodiments, if the distributed cellular communication module of the first device is connected to the distributed cellular communication module of the second device through the distributed buses in step S405, the first device also sends the communication capability sharing request through the distributed buses when performing step S406. In some embodiments, the distributed bus may perform encrypted encapsulation on sent data (for example, the cellular communication capability sharing request), so as to ensure data security during sending.

S407. The first device creates a proxy object of a request interface.

The proxy object of the request interface is used for forwarding the cellular communication service request received by the first device locally to the distributed cellular communication module of the second device.

The cellular communication service request is a request used for requesting to perform an application-related cellular communication service function, for example, an SMS message sending request triggered by an SMS message application, a call making request triggered by a telephony application, or a call answering request. The response data corresponding to the cellular communication service request is processing result data obtained after the Modem processes the cellular communication service request. For example, if the cellular communication service request is an SMS message sending request, the response data corresponding to the cellular communication service request may describe whether an SMS message is sent successfully, a specific reason why an SMS message is sent unsuccessfully, or the like.

In some embodiments, the distributed cellular communication module of the first device executes the created proxy object of the request interface. The request interface may be created inside the distributed cellular communication module of the first device. A service implemented by the distributed cellular communication module of the first device is preconfigured as a system service, that is, the distributed cellular communication module of the first device is run in the system service.

Specifically, the process of performing step S407 may be: creating a proxy object of a request interface based on such a design mode as a proxy mode. The creating a proxy object of a request interface may be creating a proxy object facing the first type of HIDL interface in the aforementioned solution in which an electronic device having the cellular communication capability uses a local cellular communication function. The created proxy object of the request interface has functions of the aforementioned first type of HIDL interface, and extends other functions. By extending additional functional operations in the proxy object of the request interface, the proxy object of the request interface can forward the cellular communication service request received by the local telephony manager of the first device to the distributed cellular communication module of the second device. It should be noted that, for specific principle introduction related to the proxy mode, reference may be made to the related part of the aforementioned proxy mode, and details are not described herein again. For detailed introduction related to the solution in which an electronic device having the cellular communication capability uses a local cellular communication function, reference may be made to the related part of the aforementioned solution in which an electronic device having the cellular communication capability uses a local cellular communication function, and details are not described herein again.

In some other embodiments, the first device may create a proxy object of a request interface facing a Radio Interface, and switch the Radio Interface to a remote access mode. When the first device has a cellular communication capability, that is, the first device has a Modem, a cellular communication request may be processed without the local Modem by switching the Radio Interface to the remote access mode, and instead the cellular communication request is processed by a Modem of a remote device (that is, the second device). In some embodiments, the proxy object of the request interface created by the first device may be asynchronously invoked and processed.

In some embodiments, in addition to performing step S407, it is further necessary to modify the telephony manager in the application framework layer of the first device, so that after receiving the cellular communication service request, the telephony manager does not invoke the original HIDL interface, but invokes the proxy object of the request interface created in step S407.

In some embodiments, step S407 may be performed by triggering of step S405 or step S406, that is, after a connection is established between the first device and the second device, step S407 is performed by triggering, or after the distributed cellular communication module of the first device sends the cellular communication capability sharing request, step S407 is performed by automatic triggering. In some other embodiments, step S407 may alternatively be performed by triggering of step S409, that is, after receiving cellular communication capability sharing success information to ensure that the second device successfully responds to the cellular communication capability sharing request, step S407 is performed by triggering.

In the aforementioned solution for using a cellular communication function, the request of the first device needs to be forwarded, through the same particular application configured in the first device and the second device, from the application layer to a device with a cellular communication capability (that is, the second device), and then the second device with the cellular communication capability processes the request in the application layer by using the local Modem, to transfer the cellular communication function supported by the particular application. Therefore, the cellular communication function can be transferred only if the same particular application is installed in the devices, and one particular application supports transfer of only one cellular communication function, and some basic cellular communication functions cannot even be transferred by configuring a particular application.

However, in this embodiment of this application, because a distributed cellular communication module is added to the first device, and the distributed cellular communication module of the first device creates the proxy object of the request interface, the cellular communication service request received by the telephony manager of the first device is not sent to the Modem through the HIDL interface, instead the cellular communication service request is forwarded to the distributed cellular communication module of the second device through the proxy object of the request interface the proxy object of the request interface, and then the distributed cellular communication module of the second device can send the cellular communication service request to the local Modem for processing, to help the first device use the cellular communication capability. The Modem may be the modem 3021 in FIG. 3a-1 and FIG. 3a-2. As shown in FIG. 3a-1 and FIG. 3a-2, the distributed cellular communication module of the first device establishes the connect between the first device and the second device in the application framework layer by creating the proxy object of the request interface, and then may perform step S3014 in FIG. 3a-1 and FIG. 3a-2, that is, forward the cellular communication service request to the second device. Further, the second device may perform step S3015, to send the cellular communication service request to the modem 3021. In another example, the Modem may alternatively be a Modem in the mobile phone 11 in FIG. 1a. As shown in FIG. 1a, when the first device is the smart screen 16 and the second device is the mobile phone 11, the smart screen 16 forwards the cellular communication service request to the mobile phone 11 by creating the proxy object of the request interface the proxy object of the request interface, and then the mobile phone 11 can send the cellular communication service request to the Modem of the mobile phone 11 for processing, to help the smart screen 16 use the cellular communication capability of the mobile phone 11.

Therefore, it can be learned that in this embodiment of this application, the cellular communication service request of the first device does not need to pass through the application layer of the second device, and therefore does not depend on the same particular application needing to be installed in the second device and the first device. Moreover, because each cellular communication service request of the first device can be forwarded through the distributed cellular communication module of the first device to the Modem of the second device for processing after the first device creates the proxy object of the request interface, the first device can use all cellular communication capabilities of the second device, which is not like a case in the existing technology that the first device can use only a cellular communication function supported and transferred by an application installed in devices.

It should be noted that, the type and specific form of the interface created by the first device in step S407 are not limited, and in addition to the proxy object of the request interface, the first device may also create a proxy object of another type of interface, for example, may create a proxy object of an AIDL interface.

S408. The second device creates a proxy object of a response interface and a proxy object of a notification interface in response to the cellular communication capability sharing request.

The proxy object of the response interface is configured to forward the response data corresponding to the cellular communication service request to the distributed cellular communication module of the first device. The proxy object of the notification interface is configured to forward a cellular communication service notification reported by the local Modem to the distributed cellular communication module of the first device. In some embodiments, when detecting a cellular communication service, for example, detecting an SMS message notification, the Modem notifies the distributed cellular communication module of the second device through the proxy object of the notification interface, and the proxy object of the notification interface sends the cellular communication service notification to the distributed cellular communication module of the first device. For details of the format, quantity and content of the cellular communication service notification, reference may be made to regulations of an operating system such as Android or IOS. This is not limited in this embodiment of this application. For the specific manner in which the Modem reports the cellular communication service notification, reference may also be made to regulations of an operating system such as Android or IOS. This is not limited in this embodiment of this application.

The response data corresponding to the cellular communication service request is data used for responding to the cellular communication service request, and corresponds to the cellular communication service request. In some embodiments, the cellular communication service notification may be, for example, an SMS message received by the SIM card of the second device, a call coming into the SIM card of the second device. The response data corresponding to the cellular communication service request and the cellular communication service may both come from the Modem, and be reported and sent by the Modem.

In some embodiments, the distributed cellular communication module of the second device executes the proxy object of the response interface and the proxy object of the notification interface that are created. The proxy object of the response interface and the proxy object of the notification interface may be created inside the distributed cellular communication module of the second device. A service implemented by the distributed cellular communication module of the second device is preconfigured as a system service, that is, the distributed cellular communication module of the second device is run in the system service.

Specifically, the process of performing step S408 may be: creating the proxy object of the response interface and the proxy object of the notification interface based on such a design mode as a proxy mode. The proxy object of the response interface is a proxy object of the second type of HIDL interface in the aforementioned solution in which an electronic device having the cellular communication capability uses a local cellular communication function. The created proxy object of the response interface has functions of the aforementioned second type of HIDL interface, and extends other functions. By extending additional functional operations in the proxy object of the response interface, the proxy object of the response interface can forward the response data corresponding to the cellular communication service request to the distributed cellular communication module of the first device. The proxy object of the notification interface is a proxy object of the third type of HIDL interface in the aforementioned solution in which an electronic device having the cellular communication capability uses a local cellular communication function. The created proxy object of the notification interface has functions of the aforementioned third type of HIDL interface, and extends other functions. By extending additional functional operations in the proxy object of the notification interface, the proxy object of the notification interface can forward, to the distributed cellular communication module of the first device, the cellular communication service notification reported by the local Modem.

It should be noted that, for specific principle introduction related to the proxy mode, reference may be made to the related part of the aforementioned proxy mode, and details are not described herein again. For detailed introduction related to the solution in which an electronic device having the cellular communication capability uses a local cellular communication function, reference may be made to the related part of the aforementioned solution in which an electronic device having the cellular communication capability uses a local cellular communication function, and details are not described herein again.

The response data corresponding to the cellular communication service request is originally sent from the Modem to the telephony manager of the local application framework layer through the aforementioned second type of HIDL interface, but after the proxy object of the response interface is created, the response data corresponding to the cellular communication service request that the Modem needs to send is sent to the proxy object of the response interface instead of being directly returned to the local telephony manager.

The cellular communication service notification originally also needs to be actively reported from the Modem to the telephony manager of the local application framework layer through the third type of HIDL interface, but after the proxy object of the notification interface is created, the cellular communication service notification that the Modem needs to report is sent to the proxy object of the notification interface instead of being sent to the local telephony manager. Through the proxy object of the response interface and the proxy object of the notification interface, the response data corresponding to the cellular communication service request and the cellular communication service notification that are notified by the Modem may be all sent to the distributed cellular communication module of the second device, and be subsequently distributed by the distributed cellular communication module of the second device.

It can be known from the aforementioned introduction of the solution in which an electronic device having the cellular communication capability uses a local cellular communication function that, in the foregoing solution, the response data corresponding to the cellular communication service request and the cellular communication service are both sent by the local Modem to the telephony manager in the local application framework layer, and then are directly sent by the telephony manager to an application corresponding to the local cellular communication service request, that is, the response data corresponding to the cellular communication service request and the cellular communication service can be sent by only a local device having the cellular communication capability. However, in this embodiment of this application, to enable the first device to have the cellular communication capability of the second device, that is, to receive the response data corresponding to the cellular communication service request and the cellular communication service, a distributed cellular communication module is added to the second device, and then the distributed cellular communication module of the second device creates the proxy object of the response interface and the proxy object of the notification interface, so that the response data corresponding to the cellular communication service request and the cellular communication service notification that are obtained by processing of the Modem of the second device are not sent from the Modem to the telephony manager, but sent by the Modem to the distributed cellular communication module of the second device, and the distributed cellular communication module of the second device receives the response data corresponding to the cellular communication service request through the created proxy object of the response interface and receives the cellular communication service through the proxy object of the notification interface, and then sends the cellular communication service notification and the response data corresponding to the cellular communication service request that are received to the distributed cellular communication module of the first device.

Therefore, after the first device forwards the cellular communication service request to the second device, the distributed cellular communication module of the second device can cause, through the created proxy object of the response interface, the first device to receive the response data corresponding to the cellular communication service request, and can cause the first device to successfully use the cellular communication capability of the second device. In addition, the second device can further actively report the cellular communication service notification to the first device through the proxy object of the notification interface.

Figure 7A:
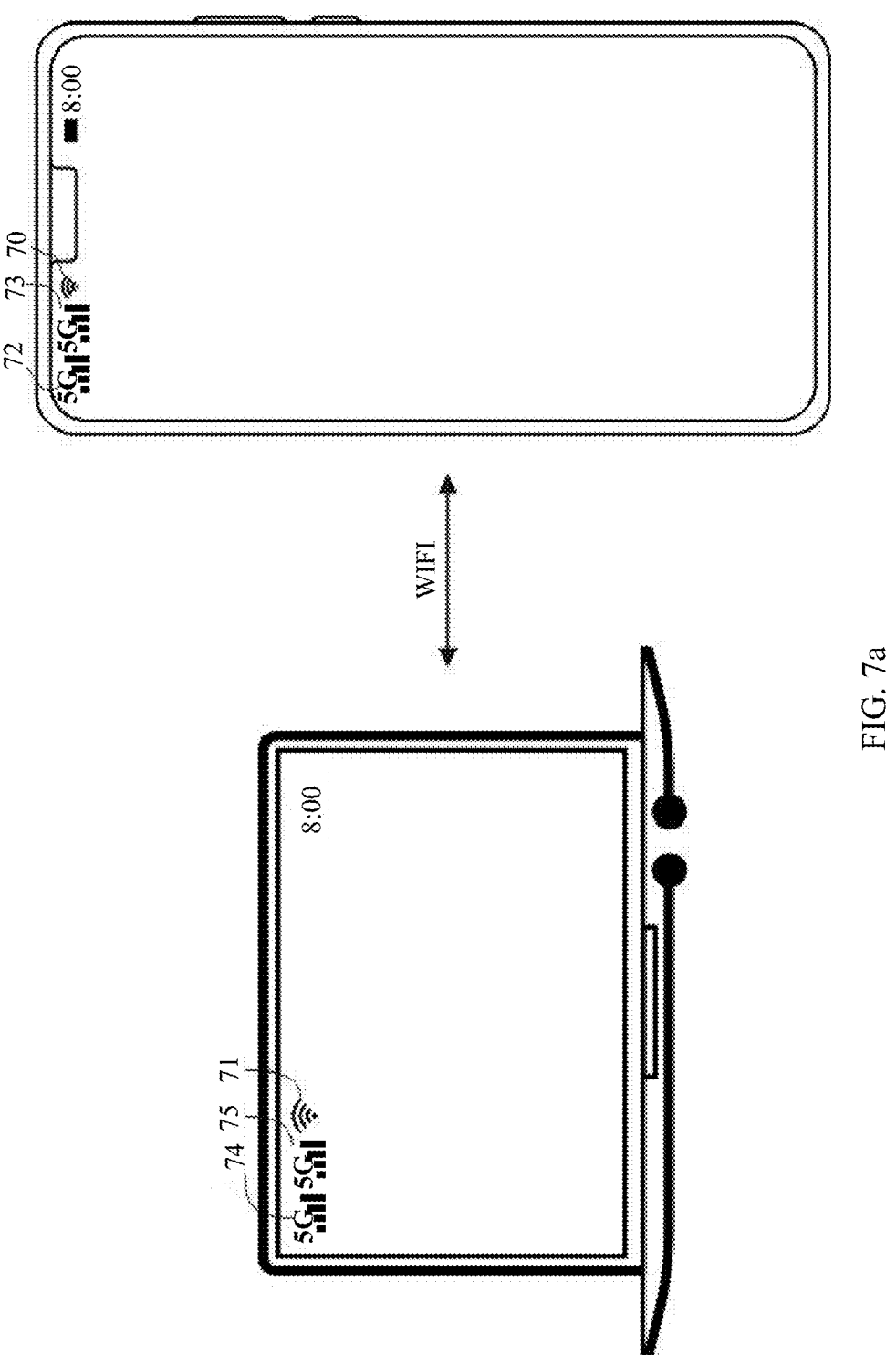
FIG. 7a is a schematic diagram of a scenario of a device completing a cellular communication capability sharing configuration according to an embodiment of this application.

It can be known through the foregoing description that, the creating the proxy object of the response interface and the proxy object of the notification interface that is performed in step S408 may be understood as preparation work that the second device needs to do when the second device uses the Modem of the second device (that is, uses the cellular communication capability of the second device) for the first device. Through step S401 to step S408, the first device has had a capability of using the Modem of the second device, and may use all cellular communication functions of the second device. For example, as shown in FIG. 7a, when the first device is a notebook computer and the second device is a mobile phone, an interface presents a WIFI icon 70 after the mobile phone is connected to WIFI, and the interface presents a WIFI icon 71 after the notebook computer is connected to the WIFI. A connection is established between the mobile phone and the notebook computer by accessing the same WIFI, and then after the mobile phone and the notebook computer collaboratively perform step S401 to step S407, a 5G signal state of a SIM card 1 and a 5G signal state of a SIM card 2 on the mobile phone are both shared with the notebook computer, signal states presented on a 5G signal state icon 72 of the SIM card 1 and a 5G signal state icon 73 of the SIM card 2 on the mobile phone are consistent with signal states presented on a 5G signal state icon 74 and a 5G signal state icon 75 on the notebook computer, and the notebook computer can synchronously obtain the signal states on the mobile phone.

In some embodiments, the proxy object of the response interface and the proxy object of the notification interface may be created for only the first device, that is, the proxy object of the notification interface and the proxy object of the notification interface are forwarded to only the distributed cellular communication module of the first device, but not forwarded to distributed cellular communication modules of other devices. If another device sends a cellular communication capability sharing request, it is necessary to create, for the another device, a proxy object of a notification interface and a proxy object of a notification interface that are exclusive to the another device. In some other embodiments, the proxy object of the response interface and the proxy object of the notification interface may be created for all devices intending to use the cellular communication capability shared by the second device, that is, the proxy object of the notification interface and the proxy object of the notification interface may be forwarded to distributed cellular communication modules of all devices sending cellular communication capability sharing requests, and are not merely targeted at the first device.

In some embodiments, after the distributed cellular communication module of the second device receives a cellular communication capability sharing request and responds to the cellular communication capability sharing request, the proxy object of the response interface and the proxy object of the notification interface may be directly created for the first device, or after a series of authentication operations are performed on the cellular communication capability sharing request, the proxy object of the response interface and the proxy object of the notification interface are created if authentication succeeds. If authentication does not succeed, the proxy object of the response interface and the proxy object of the notification interface are not created.

In the existing solution, cross-device use of a cellular communication capability can be implemented only by developing an application alone, and other applications cannot use the cellular communication capability. However, in this solution, the first device creates the proxy object of the request interface, the second device creates the proxy object of the response interface and the proxy object of the notification interface, a service implemented by the distributed cellular communication module of the first device is preconfigured as a system service, and a service implemented by the distributed cellular communication module of the second device is preconfigured as a system service, so that the first device can invoke a cellular function of the second device, and the first device is equivalent to a cellular module simulated locally, thereby enabling the first device to have a complete cellular communication capability.

It should be noted that, in addition to that the first device is enabled to meet a condition of using all cellular communication capabilities of the second device through step S407 and step S408, the first device is further enabled to meet the condition of using all cellular communication capabilities of the second device in another manner, and step S407 and step S408 are only an implementation in which the condition of using all cellular communication capabilities of the second device is met between the first device and the second device.

It should be further noted that the type and form of the interface created by the second device in step S408 are not limited in this embodiment of this application, and the second device may also create a proxy object of another type of interface, for example, may create a proxy object of an AIDL interface. In some embodiments, if the second device has only the response interface, but does not have the notification interface, only the proxy object of the response interface may be created when step S408 is performed.

S409. The second device sends cellular communication capability sharing success information to the first device.

The cellular communication capability sharing success information is used for indicating that the second device has accepted the cellular communication capability sharing request sent by the first device in step S406 and is willing to share the cellular communication capability of the second device with the first device.

In some embodiments, step S408 may be performed by triggering after the second device completes creation of the proxy object of the response interface and the proxy object of the notification interface, that is, after the second device has done preparation work of sharing the cellular communication capability of the second device for the first device, or may be performed by triggering once the second device has received the cellular communication capability sharing request in step S406.

Through step S401 to step S409, the first device completes configuration work of using the Modem of the second device, the second device completes configuration work of providing the Modem of the second device for the first device, that is, preparation work to be done before the first device uses the cellular communication capability of the second device is completed through step S401 to step S309.

In some embodiments, the distributed cellular communication module of the second device sends the cellular communication capability sharing success information to the distributed cellular communication module of the first device.

It should be noted that, step S401 to step S409 are only an implementation of preparation work to be done before the first device uses the cellular communication capability of the second device. In some other embodiments, the preparation work to be done before the first device uses the cellular communication capability of the second device may alternatively be completed in other manners.

In some embodiments, the first device needs to update communication base states such as a subscriber identity module (Subscriber Identity Module, SIM) state and a network service state in the entire system, so that each part in the system does corresponding work according to the communication base states such as the SIM card state and the network service state. For example, before being triggered to generate a cellular communication service request, some applications need to know whether a SIM card is in position, and need to know a standard of a currently accessed network. Exemplarily, after step S409 is performed, the distributed cellular communication module of the first device may further send a message to the local telephony manager, to trigger a subscriber identity module state change event reporting mechanism of the local telephony manager. Then, the local telephony manager delivers a subscriber identity module state query request to the distributed cellular communication module of the first device. Then, the distributed cellular communication module of the first device sends the subscriber identity module state query request to the distributed cellular communication module of the second device, and the distributed cellular communication module of the second device sends the subscriber identity module state query request to the local Modem for processing. The Modem obtains a subscriber identity module state query result after the processing and sends the subscriber identity module state query result to the distributed cellular communication module of the second device. The distributed cellular communication module of the second device further sends the subscriber identity module state query result to the distributed cellular communication module of the first device, the distributed cellular communication module of the first device then sends the subscriber identity module state query result to the local telephony manager, and the telephony manager reports the subscriber identity module state query result to each part of the system in the first device. Subsequently, when detecting that the subscriber identity module state changes, the Modem of the second device actively reports subscriber identity module state change data to the first device. For example, as shown in FIG. 7a, when the first device is a notebook computer and the second device is a mobile phone, communication base state data in the mobile phone is shared with the notebook computer, and signal states of two SIM cards in the mobile phone are presented on the notebook computer through the 5G icon 74 and the 5G icon 75. It should be noted that, for a query request for another communication base state such as the network service state, reference may also be made to the process of processing the subscriber identity module state query request, and details are not described herein again. Similarly, for a communication base state query result, reference may also be made to the process of processing the subscriber identity module state query result, and details are not described herein again. A process of reporting the communication base state query result to the first device may be consistent with the process of transmitting the response data corresponding to the cellular communication service request by the modem 3021 in FIG. 3a-1 and FIG. 3a-2, and a communication base state data query request may also be consistent with the process of transmitting the cellular communication service request in FIG. 3a-1 and FIG. 3a-2.

In some embodiments, the subscriber identity module state query request may be used for querying whether the subscriber identity module is in position, a PIN code of the user, signal strength of the subscriber identity module, and the like. The network service state query request may be used for querying whether to enable roaming, a network standard of an accessed network, an operator, and the like. In some other embodiments, after communication base state data such as subscriber identity module state data or network service state data changes, the Modem sends updated communication base state data such as subscriber identity module state data to the distributed cellular communication module of the second device, the distributed cellular communication module of the second device further sends the communication base state data such as the subscriber identity module state data to the distributed cellular communication module of the first device, and the distributed cellular communication module of the first device further reports updated communication base state data such as subscriber identity module state data to each part in the system through the telephony manager.

It should be noted that, the process and execution principle of actively reporting and sending the updated subscriber identity module state data are consistent with the process and execution principle of sending the cellular communication service in the following step S415 to step S417, reference may be made, and details are not described herein again.

It should be further noted that the process and execution principle of sending the subscriber identity module state query request are also consistent with the process and execution principle of sending the cellular communication service request in the following step S410 to step S411, reference may be made, and details are not described herein again. Moreover, the process and execution principle of sending subscriber identity module state data after the Modem performs processing to obtain the subscriber identity module state data are also consistent with the process and execution principle of sending the response data corresponding to the cellular communication service request in steps S412 to S414, reference may be made, and details are not described herein again.

S410. The first device forwards a cellular communication service request to the second device.

Because the first device has completed the previous configuration work of using the Modem of the second device through steps S401 to S409, that is, has created the proxy object of the request interface in advance, the first device can forward the local cellular communication service request to the second device through the proxy object of the request interface.

Figure 7B:
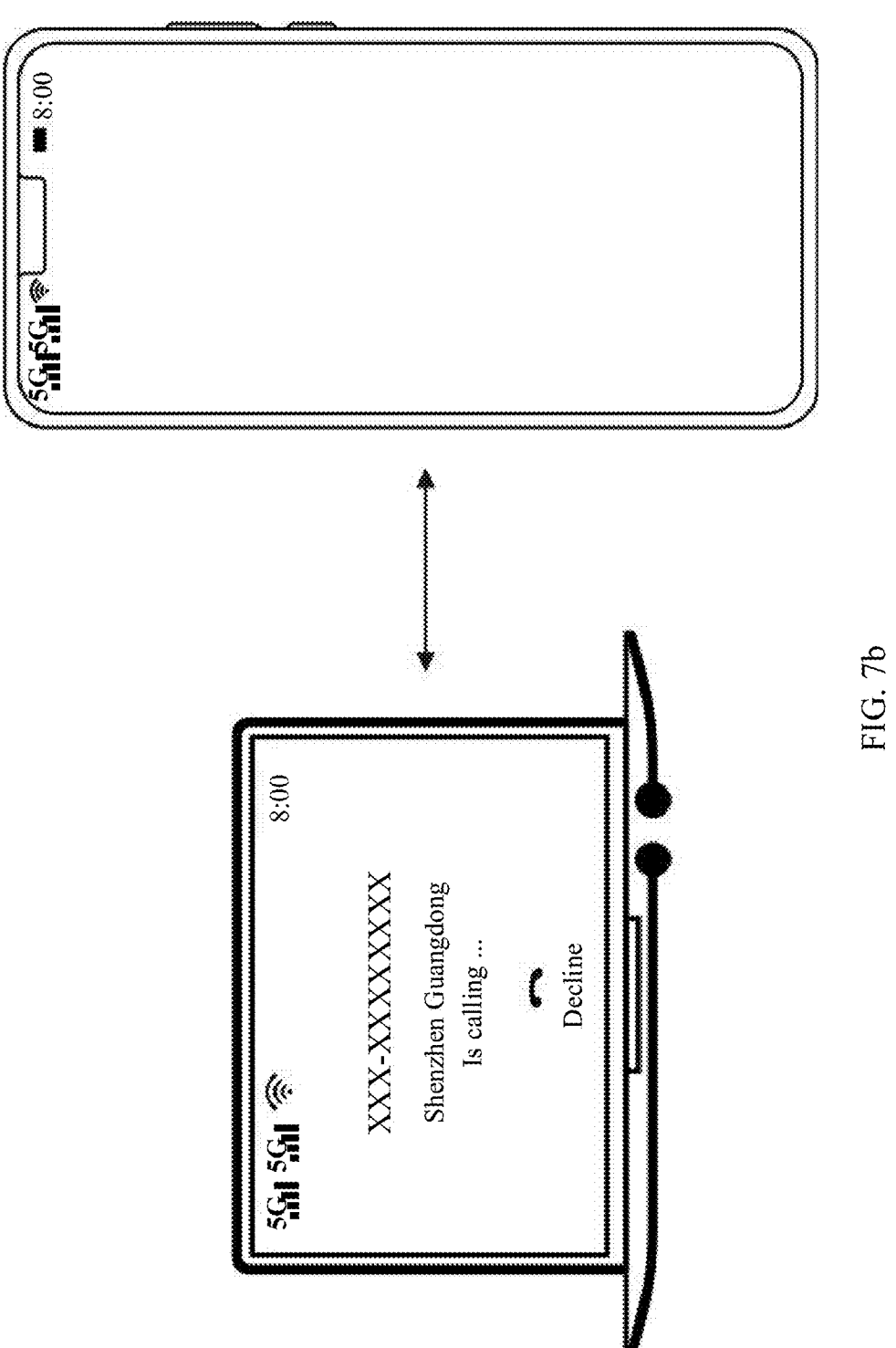
FIG. 7b is a schematic diagram of a scenario in which a notebook computer uses a cellular communication capability of a mobile phone to make a call according to an embodiment of this application.
Figure 7C:
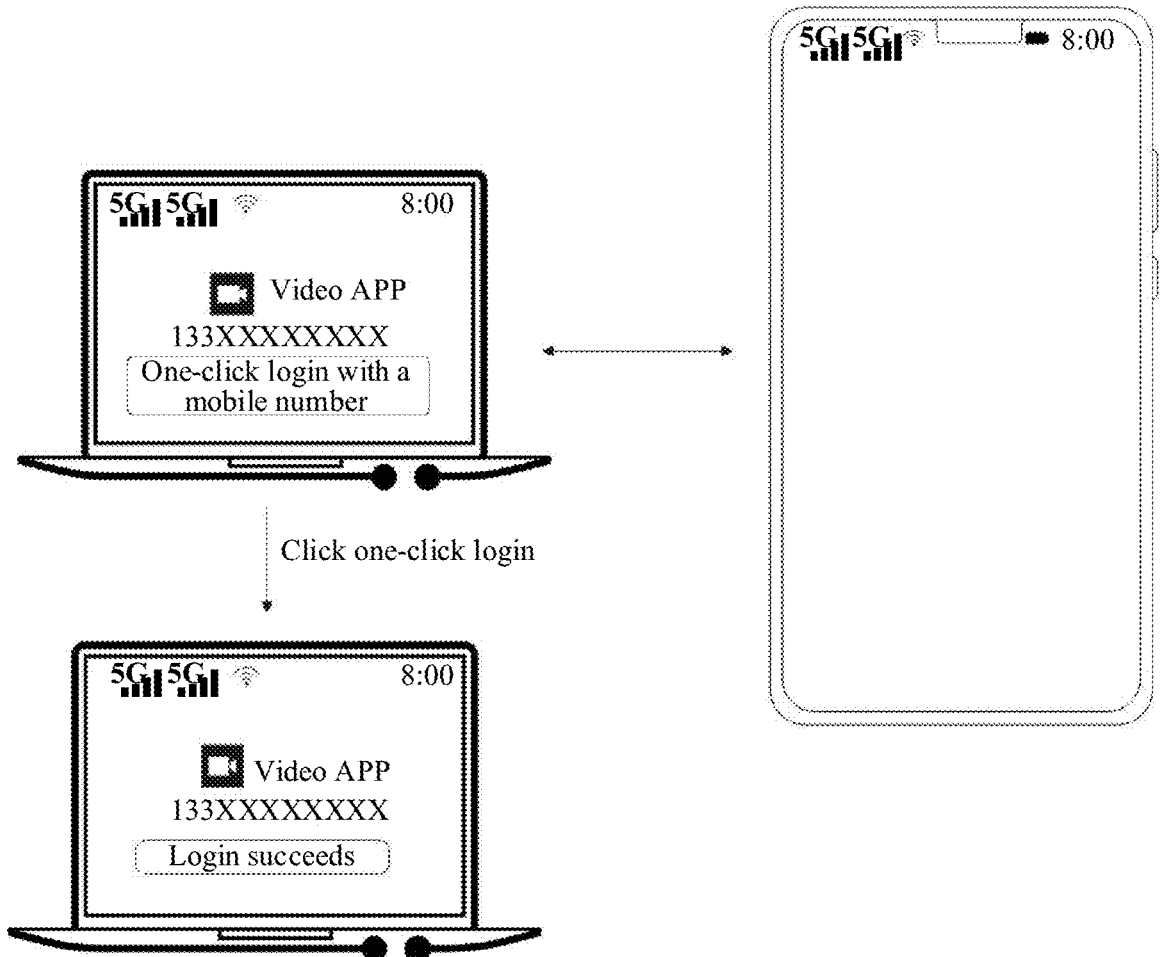
FIG. 7c is a schematic diagram of a scenario in which a notebook computer uses a cellular communication capability of a mobile phone to perform one-click login according to an embodiment of this application.

In some embodiments, the distributed cellular communication module of the first device receives the cellular communication service request sent by the local telephony manager, and then forwards the cellular communication service request to the distributed cellular communication module of the second device. For example, as shown in FIG. 7b, when the first device is a notebook computer, a number from Shenzhen Guangdong can be dialed on the notebook computer, to trigger generation of a dialing service request, the dialing service request is received by a local telephony manager of the notebook computer and then sent to a local distributed cellular communication module, and the distributed cellular communication module of the first device further forwards the dialing service request to a mobile phone (the second device) connected to the notebook computer. As shown in FIG. 7c, when the first device is a notebook computer, the notebook computer may trigger a one-click login request of a mobile number 133xxxxxxxx on a video APP, the one-click login request is sent to a local distributed cellular communication module through a local telephony manager of the notebook computer, and then the distributed cellular communication module in the notebook computer forwards the one-click login request to a mobile phone.

In some other embodiments, after a local application of the first device is triggered to generate a cellular communication service request, the cellular communication service request is sent to a local application framework layer of the first device and received by a telephony manager in the application framework layer, and then the telephony manager sends the cellular communication service request to the distributed cellular communication module of the first device.

Figure 8:
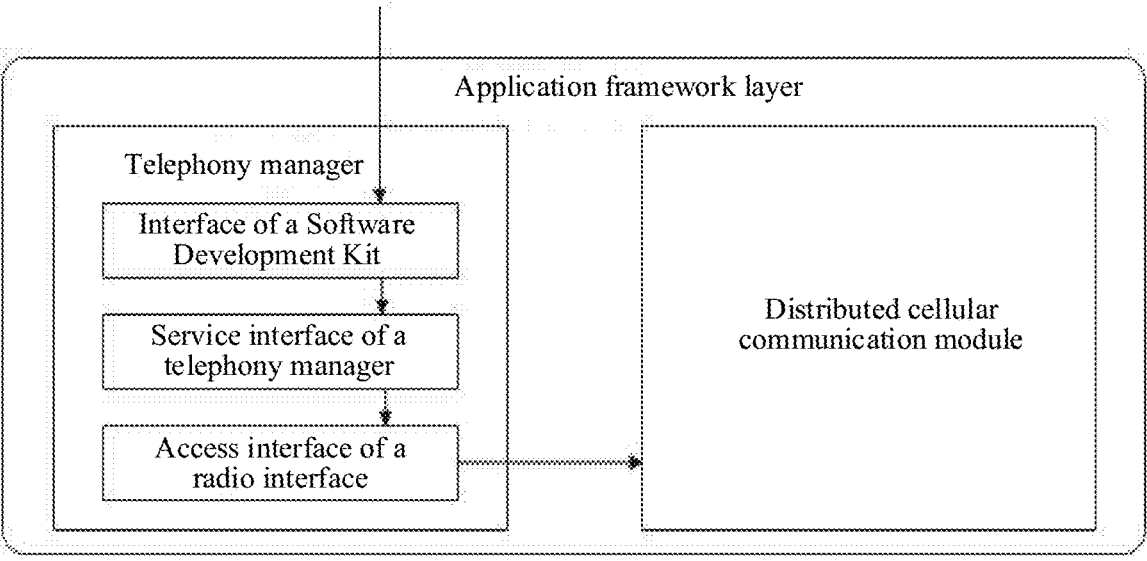
FIG. 8 is a diagram of a sending path of a cellular communication service request in an application framework layer according to an embodiment of this application.

Referring to FIG. 8, in some embodiments, a process of sending a cellular communication service request of a first device in an application framework layer is: An Android Open Source Project (Android Open Source Project, AOSP) Software Development Kit (Software Development Kit, SDK) Application Programming Interface (Application Programming Interface, API) in a telephony manager (Telephony) is invoked through the cellular communication service request, then the AOSP SDK API further invokes a Telephony Service (Telephony Service) interface of the telephony manager, then the Telephony Service invokes an access interface of a radio interface (Radio Interface), and then the access interface of the radio interface sends the cellular communication service request to a distributed cellular communication module of the first device, and the distributed cellular communication module of the first device receives the cellular communication service request of the local telephony manager. Because the distributed cellular communication module of the first device creates a proxy object of a request interface in advance, the proxy object of the request interface can receive, as proxy for the access interface of the Radio Interface, the cellular communication service request sent to the access interface of the Radio Interface.

In some other embodiments, the distributed cellular communication module of the first device may forward the cellular communication service request received by the local telephony manager to a remote message processing module in a distributed cellular communication module of the second device. The remote message processing module is specially configured to receive a non-local cellular communication service request.

In some embodiments, the distributed cellular communication module of the first device needs to perform packet assembly and serialization processing on the cellular communication service request received by the telephony manager of the first device, and then forwards the processed cellular communication service request to the distributed cellular communication module of the second device. The serialization processing refers to converting data carrying a data structure and a data type into a form of a bit stream.

It should be noted that, step S410 is only a manner in which the first device receives the cellular communication service request. In some other embodiments, the cellular communication service request is unnecessarily sent to the distributed cellular communication module of the first device through the telephony manager. For example, when the system used by the first device is an IP multimedia subsystem, the distributed cellular communication module of the first device may not receive the cellular communication service request through the telephony manager.

In the foregoing cellular communication function transfer solution, the cellular communication service request triggered by the local application of the device can be processed by only the local Modem, and if there is no Modem locally, the cellular communication service request fails. However, in this embodiment of this application, after the cellular communication service request is sent to the telephony manager of the first device, the distributed cellular communication module of the first device forwards the cellular communication service request received by the local telephony manager to the distributed cellular communication module of the second device. Therefore, the cellular communication service request in this embodiment of this application is not sent through the application layer, that is, there is not a limitation that the same application needs to be installed in the devices. Because there is not the limitation that the same application needs to be installed in the devices, and the distributed cellular communication module arranged in the application framework layer of the first device can undertake and process cellular communication service requests triggered by applications related to all cellular communication instead of supporting only some cellular communication functions, and then may use all cellular communication functions of the second device, that is, can use cellular communication capabilities of the second device.

It should be noted that, the first device forwards the cellular communication service request to the second device in many specific manners, including but not limited to the content proposed in this embodiment of this application. For the specific request type, quantity, content, and manner of the cellular communication service request, reference may be specifically made to regulations of an operating system such as Android or IOS. This is not limited in this embodiment of this application.

S411. A Modem of the second device processes the cellular communication service request.

In some embodiments, the distributed cellular communication module of the second device sends, by invoking an HIDL interface, the cellular communication service request to the local Modem for processing. The HIDL interface is located in an RIL module, and the RIL module is located in a system library. For details, reference may be made to the HIDL interface shown in FIG. 3a-1 and FIG. 3a-2. In the foregoing solution for using a cellular communication function, the HIDL interface can send only the local cellular communication service request. However, in this embodiment of this application, by adding a distributed cellular communication module arranged in the application framework layer of the second device, the cellular communication service request sent by the first device in step S410 is sent to the local Modem for processing, and then the first device is enabled to use the cellular communication capability of the second device.

Because all cellular communication service requests of the first device can be forwarded through the distributed cellular communication module of the first device to the Modem of the second device for processing, the first device can use all cellular communication capabilities of the second device, that is, can use all cellular communication functions, which is not like a case in the existing technology that the first device can use only a cellular communication function supported by the same installed application. In addition, because of being located in the application framework layer, the distributed cellular communication module of the first device can undertake and process all cellular communication service requests in an application layer. Even if the second device does not have the same application as that of the first device, the cellular communication service request of the first device can still be forwarded to the distributed cellular communication module of the second device for processing. Moreover, it is not necessary to be like the existing technology in that there is a limitation that the same application needs to be installed in the devices.

In some embodiments, after the distributed cellular communication module of the second device receives the cellular communication service request forwarded in step S410, the method further includes:

performing packet disassembly and deserialization processing on the received cellular communication service request. The deserialization processing refers to converting the cellular communication service request from a form of a bit stream into data carrying a data type and a data structure. When step S411 is subsequently performed, the cellular communication service request on which the packet disassembly and deserialization processing is performed is sent to the local Modem for processing.

It should be noted that, the Modem of the second device processes the cellular communication service request in many implementations. For example, the cellular communication service request may not be sent to the Modem for processing through the distributed cellular communication module of the second device. Implementations in which the Modem of the second device processes the cellular communication service request include but not limited to the content proposed in this embodiment of this application.

S412. A distributed cellular communication module of the second device receives response data corresponding to the cellular communication service request sent by the Modem.

After processing the cellular communication service request, the Modem obtains the response data corresponding to the cellular communication service request. In some embodiments, the second device receives, through the distributed cellular communication module, the response data corresponding to the cellular communication service request sent by the local Modem. Because the distributed cellular communication module of the second device creates the proxy object of the response interface in advance, the response data corresponding to the cellular communication service request that the Modem originally needs to send to the telephony manager is sent to the distributed cellular communication module of the second device, that is, the distributed cellular communication module of the second device receives, through the proxy object of the response interface, the response data corresponding to the cellular communication service request sent by the local Modem.

In some embodiments, the distributed cellular communication module of the second device receives, through the HIDL interface, the response data corresponding to the cellular communication service request sent by the local Modem.

It should be noted that, for details of the format and content of the response data corresponding to the cellular communication service request, reference may be made to regulations of an operating system such as Android or IOS. This is not limited in this embodiment of this application.

S413. The second device sends the response data corresponding to the cellular communication service request to the first device.

In some embodiments, the distributed cellular communication module of the second device sends the response data corresponding to the cellular communication service request to the distributed cellular communication module of the first device. The distributed cellular communication module of the second device sends, in a manner of sending the response data corresponding to the cellular communication service request to the distributed cellular communication module of the first device, the response data corresponding to the cellular communication service request to the first device, so that the first device can completely have all cellular communication capabilities, that is, can perform any cellular communication service request that the Modem can support, and can also obtain the response data corresponding to the cellular communication service request processed by the Modem. In some other embodiments, the distributed cellular communication module of the first device includes a remote message processing module, configured to receive the response data corresponding to the cellular communication service request sent by the second device.

In some embodiments, the distributed cellular communication module of the second device performs, before performing step S413, packet assembly and serialization processing on the response data corresponding to the cellular communication service request, and then sends, when performing step S413, the response data corresponding to the cellular communication service request on which the packet assembly and serialization processing is performed to the distributed cellular communication module of the first device.

It should be noted that, step S412 and step S413 are only an implementation in which the second device sends the response data corresponding to the cellular communication service request to the first device, and a difference between implementations in which the second device sends the response data corresponding to the cellular communication service request to the first device does not affect implementation of this embodiment of this application.

S414. The first device returns the response data corresponding to the cellular communication service request to an application corresponding to the cellular communication service request.

In some embodiments, a process of performing step S414 may be: the distributed cellular communication module of the first device sends the response data corresponding to the cellular communication service request to the telephony manager, and the telephony manager sends the response data corresponding to the cellular communication service request to the application corresponding to the cellular communication service request.

After the distributed cellular communication module of the first device sends the response data corresponding to the cellular communication service request to the telephony manager, the telephony manager sends the response data corresponding to the cellular communication service request to the application layer and displays the response data on the application corresponding to the cellular communication service request, and the user receives the response data corresponding to the cellular communication service request from the application corresponding to the cellular communication service request. For example, as shown in FIG. 7b, when the cellular communication service request is dialing a mobile number from Shenzhen Guangdong, after the notebook computer receives the response data (that is, data of calling) corresponding to the cellular communication service request sent by the mobile phone, the response data is presented on a telephony application interface corresponding to the notebook computer, and a call state, that is, calling of the dialed mobile number is presented on the telephony application interface. In another example, in a scenario shown in FIG. 7c, after clicking a key "one-click login with a mobile number", the user successfully logs in after passing through verification of an operator to which 133xxxxxxxx belongs by using the Modem of the mobile phone. Response data of the successful login is sent to the notebook computer through the mobile phone, and is displayed on an interface of the notebook computer.

In some embodiments, before performing step S414, the distributed cellular communication module of the first device further needs to perform packet disassembly and deserialization processing on the response data corresponding to the cellular communication service request, and then sends the response data corresponding to the cellular communication service request on which the packet disassembly and deserialization processing is performed to the telephony manager.

It should be noted that, after step S401 to step S409 are performed, each time the first device processes the cellular communication service request subsequently, it is necessary to perform only step S410 to step S414, and it is unnecessary to repeatedly perform step S401 to step S409.

Step S414 is only a manner in which the response data corresponding to the cellular communication service request is sent in the first device. In some other embodiments, the response data corresponding to the cellular communication service request may alternatively not be returned to the application corresponding to the cellular communication service request through the telephony manager. For example, when the system used by the first device is an IP multimedia subsystem, the distributed cellular communication module of the first device may not return the response data corresponding to the cellular communication service request through the telephony manager.

It should be further noted that in some other embodiments, the cellular communication service request may alternatively not be generated through triggering of an application, but generated through triggering in another manner, and then the first device may alternatively not return the response data corresponding to the cellular communication service request to the application, but return the response data to a position in the first device triggering generation of the cellular communication service request. That is, the response data corresponding to the cellular communication service request of the first device needs to be returned to only a module in the first device generating the cellular communication service request, or a module requiring the response data corresponding to the cellular communication service request, and a difference between modules in the first device that finally receive the response data corresponding to the cellular communication service request does not affect implementation of this embodiment of this application.

S415. The Modem of the second device reports a cellular communication service to the distributed cellular communication module of the second device.

In some embodiments, the local Modem detects a cellular communication service sent by another device to the second device, for example, an SMS message receiving notification or an incoming call notification, or the local Modem also obtains some cellular communication services generated in the second device, for example, a SIM card state change. In some embodiments, when the Modem of the second device detects a cellular communication service, the Modem of the second device reports the cellular communication service to the distributed cellular communication module of the second device. Exemplarily, in some embodiments, when the Modem of the second device receives a cellular communication service notification, for example, an SMS message notification, the Modem may notify the distributed cellular communication module of the second device. When the Modem detects a cellular communication service, for the specific manner in which the Modem notifies the distributed cellular communication module of the second device or the Modem reports to the distributed cellular communication module of the second device, reference may be made to regulations of an operating system such as Android or IOS. This is not limited in this embodiment of this application. In some other embodiments, an implementation in which the Modem of the second device reports the cellular communication service notification to the distributed cellular communication module of the second device may be: The Modem notifies the distributed cellular communication module of the second device that there is a cellular communication service.

In some embodiments, after detecting a cellular communication service, the local modem sends a cellular communication service notification to the distributed cellular communication module of the second device through the HIDL interface.

Figure 9A:
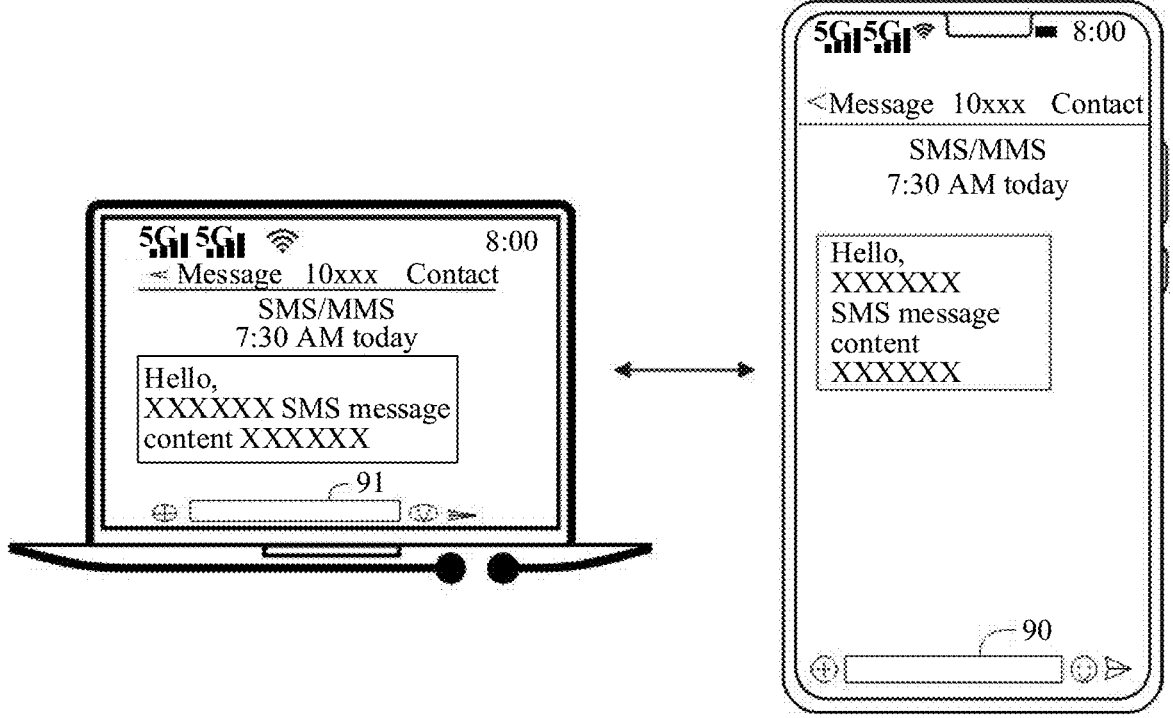
FIG. 9a is a schematic diagram of a scenario in which a notebook computer uses a cellular communication capability of a mobile phone to receive an SMS message notification according to an embodiment of this application.
Figure 9B:
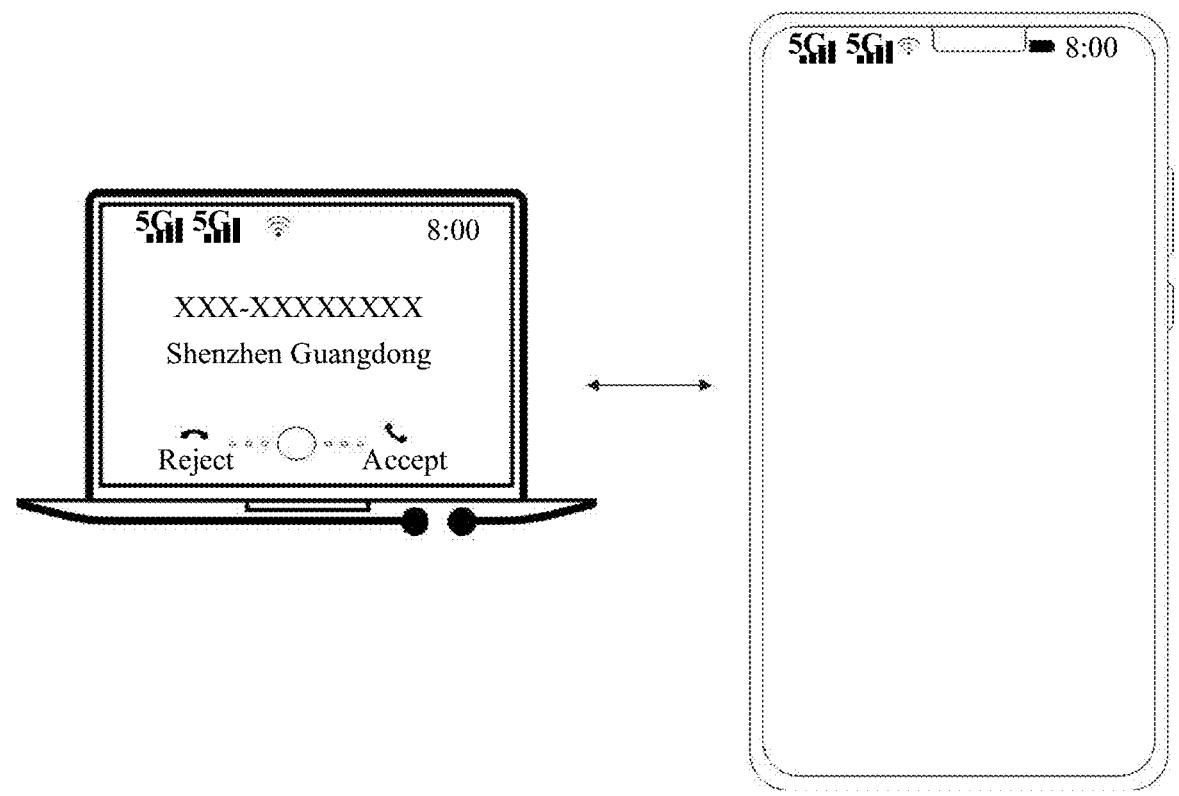
FIG. 9b is a schematic diagram of a scenario in which a notebook computer uses a cellular communication capability of a mobile phone to receive an incoming call according to an embodiment of this application.

Because the second device creates the proxy object of the notification interface, the proxy object of the notification interface created by the second device can receive the cellular communication service notification sent by the local Modem. In some embodiments, the distributed cellular communication module of the second device receives the cellular communication service notification sent by the local Modem. For example, as shown in FIG. 9*a*, when a first device is a notebook computer and a second device is a mobile phone, the mobile phone receives, at 7:30 AM today, an SMS message sent by a number 10xxx, where content of the SMS message is hello xxxxx, and after receiving the SMS message, a Modem of the mobile phone reports the SMS message to a proxy object of a notification interface created by the mobile phone. Further, as shown in FIG. 9*b*, when a first device is a notebook computer and a second device is a mobile phone, a Modem in the mobile phone needs to report an incoming call notification of a number from Shenzhen Guangdong, the incoming call notification of the number may be sent to a proxy object of a notification interface created in the mobile phone.

In some embodiments, after receiving the cellular communication service notification sent by the local Modem, the distributed cellular communication module of the second device further needs to perform packet assembly and serialization processing on the cellular communication service notification, and then step S416 is performed.

S416. The second device sends the cellular communication service notification to the first device.

Because the second device creates the proxy object of the notification interface, the cellular communication service notification can be sent to the distributed cellular communication module of the second device, and then sent by the distributed cellular communication module of the second device to the distributed cellular communication module of the first device. In some embodiments, when receiving a notification from the modem that there is a cellular communication service, the distributed cellular communication module of the second device may send the cellular communication service notification to the distributed cellular communication module of the first device. For details of the specific sending manner and the specific content of the notification, reference may be made to regulations of an operating system such as Android or IOS. This is not limited in this embodiment of this application.

In some other embodiments, the distributed cellular communication module of the first device includes a remote message processing module, configured to receive the cellular communication service notification sent by the second device.

S417. The first device returns the cellular communication service notification to an application corresponding to the cellular communication service.

In some embodiments, when receiving the cellular communication service notification, the distributed cellular communication module of the first device may provide content of the notification to the application layer. For example, assuming that an application of the first device invokes a notification interface related to an SMS message, the distributed cellular communication module may notify, when receiving an SMS message notification, the application that there is a new message, and provide a specific message of the SMS message to the application according to the existing technology. After the application of the first device receives an SMS message, the SMS message may be displayed on an interface, as shown in FIG. 9*a*. In another example, when the modem of the second device detects that a SIM card state changes, this event may be reported to the distributed cellular communication module of the second device, and then the distributed cellular communication module of the second device notifies, through a created interface such as a notification interface, a response interface or a request interface, a state change message of a SIM card to the cellular communication module of the first device, and provides specific change content.

After the cellular communication service notification is sent to an application corresponding to the cellular communication service notification, the application may present the cellular communication service notification to the user on the display interface, and the user may successfully receive the cellular communication service notification. In some embodiments, the first device may receive the cellular communication service notification through the telephony manager of the first device, and then the telephony manager returns the cellular communication service notification to the application corresponding to the cellular communication service notification. For example, as shown in FIG. 9*a*, after the telephony manager in the notebook computer receives an SMS message notification, the SMS message notification is presented on an SMS message application interface. The SMS message received by the SIM card of the mobile phone is synchronized into the notebook computer. As shown in FIG. 9*b*, after the telephony manager in the notebook computer receives a notification of an incoming call of a mobile number from Shenzhen Guangdong, the notification is presented on the application interface of the notebook computer.

In some embodiments, the distributed cellular communication module of the first device sends the cellular communication service notification to the telephony manager of the first device, and the telephony manager sends the cellular communication service notification to the application corresponding to the cellular communication service.

It should be noted that, step S415 to step S417 are all performed by triggering only when the Modem of the second device detects a cellular communication service, and it is not necessary to perform step S415 to step S417 if the Modem of the second device detects no cellular communication service.

It should be further noted that in some other embodiments, the first device may alternatively not return the cellular communication service notification to an application, but returns the cellular communication service notification to a module in the first device requiring the cellular communication service notification, and the module may not be an application. That is, a difference between modules in the first device that finally receive the cellular communication service notification does not affect implementation of this embodiment of this application.

In some embodiments, the first device may actively stop using the Modem of the second device. For example, the distributed cellular communication module of the first device may send a sharing ending request to the distributed cellular communication module of the second device, then the proxy object of the response interface is disabled, the Modem of the second device is not used again, and after the distributed cellular communication module of the second device receives the sharing ending request, the proxy object of the response interface and the proxy object of the notification interface may be disabled.

In some other embodiments, the second device may alternatively actively disable the cellular communication capability sharing function, the proxy object of the response interface and the proxy object of the notification interface are disabled, and after responding to that the second device disables the cellular communication capability sharing function, the first device also disables the proxy object of the request interface.

Figures 1, 10A:
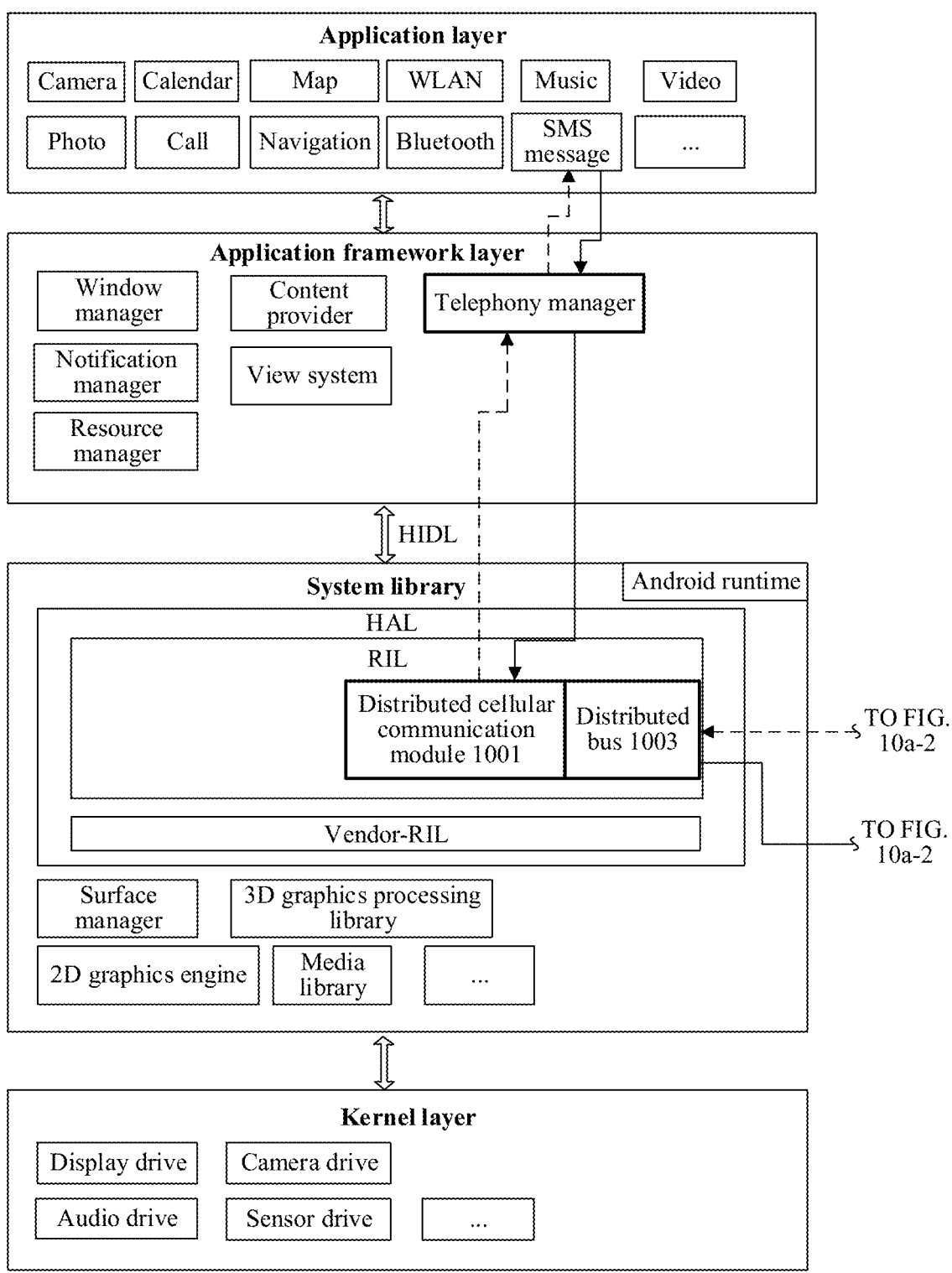
Figures 2, 10A:
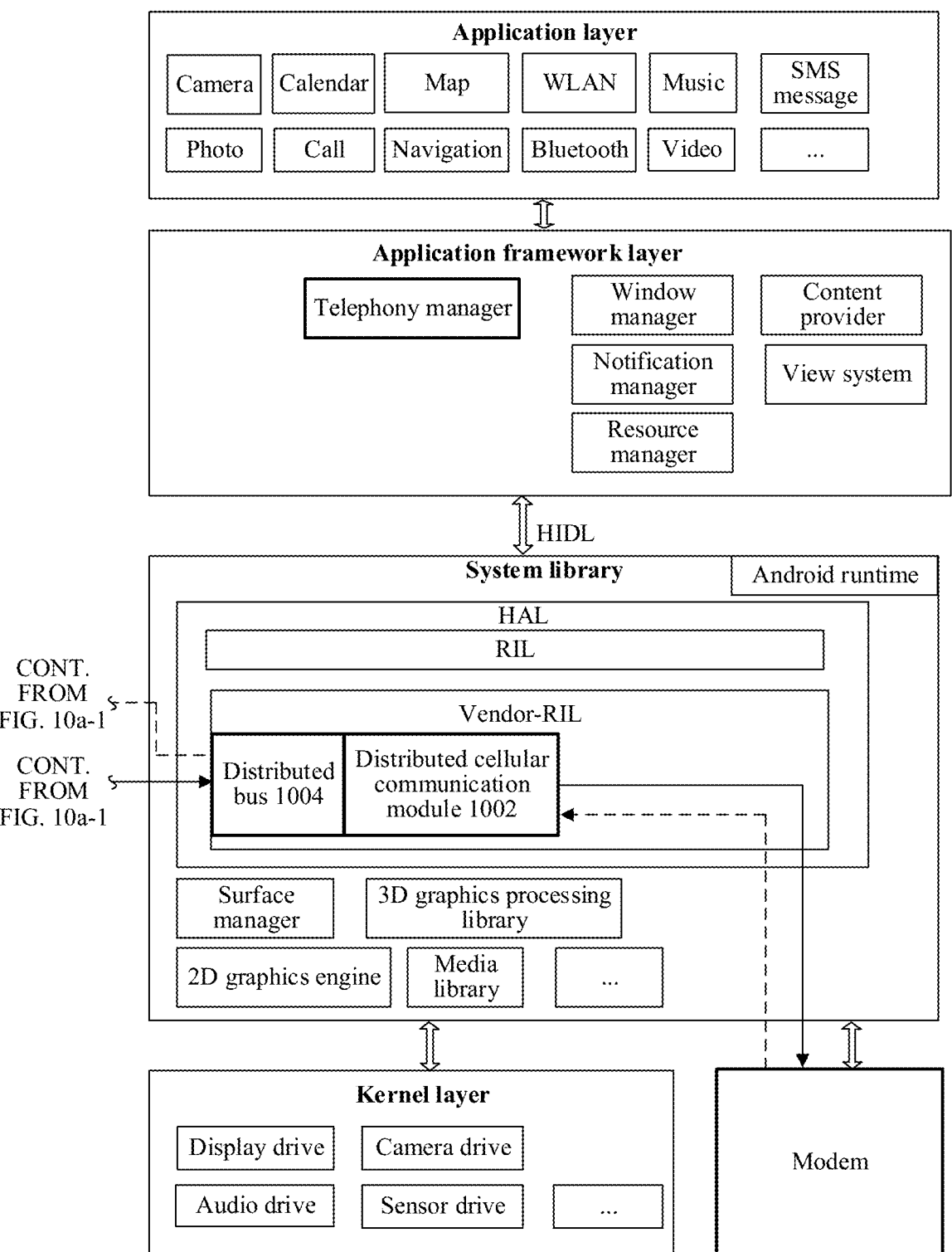

Referring to FIG. 10*a*-1 and FIG. 10*a*-2, in some embodiments, a distributed cellular communication module 1001 of a first device may alternatively be arranged in an RIL module in a system library, and a distributed cellular communication module 1002 of a second device may be arranged in a vendor-radio interface layer (Vendor-RIL) in a system library. each of the distributed cellular communication module 1001 of the first device and the distributed cellular communication module 1002 of the second device is run in a system service. Based on the first device and the second device shown in FIG. 10*a*-1 and FIG. 10*a*-2, the foregoing step S401 to step S405 are performed, and a connection is established between the distributed cellular communication module 1001 of the first device and the distributed cellular communication module 1002 of the second device. In some embodiments, through a distributed bus 1003 in the first device and a distributed bus 1004 in the second device, a connection is established between the distributed cellular communication module 1001 of the first device and the distributed cellular communication module 1002 of the second device. However, in a process of performing step S406 to step S409, it is not necessary to perform step S407 and step S408, and by preconfiguring the distributed cellular communication module 1001 of the first device, the distributed cellular communication module 1001 of the first device forwards a cellular communication service request received through an HIDL on the RIL module to the distributed cellular communication module 1002 of the second device. By presetting the distributed cellular communication module 1002 of the second device, the distributed cellular communication module 1002 of the second device forwards response data corresponding to the cellular communication service request to the distributed cellular communication module 1001 of the first device and further forwards, to the distributed cellular communication module of the first device, a cellular communication service reported by a local Modem. Then, the first device and the second device may perform step S410 to step S417. The distributed cellular communication module 1001 of the first device is arranged in the RIL of the system library of the first device and the distributed cellular communication module 1002 of the second device is arranged in the system library of the second device. Therefore, in a process of performing steps S410 to S417, as shown by an implementation path in FIG. 10*a*-1 and FIG. 10*a*-2, a cellular communication service request (for example, an SMS message sending request) of the first device is sent from an application layer of the first device to a telephony manager in an application framework layer and then from the telephony manager in the application framework layer to the distributed cellular communication module 1001 in the system library, and then sent, through the distributed bus 1003 of the first device and the distributed bus 1004 of the second device, to the distributed cellular communication module 1002 in the system library of the second device, and the distributed cellular communication module 1002 then sends the cellular communication service request to the local Modem. In addition, as shown by a dashed-line path in FIG. 10*a*-1 and FIG. 10*a*-2, the Modem further sends response data corresponding to the cellular communication service request to the distributed cellular communication module 1002, the distributed cellular communication module 1002 sends the response data corresponding to the cellular communication service request to the distributed cellular communication module 1001 of the first device through the distributed bus 1004 of the second device and the distributed bus 1003 of the first device, then the distributed cellular communication module 1001 of the first device sends the response data corresponding to the cellular communication service request to the telephony manager, and then the telephony management sends the response data to a corresponding application of the first device. A path of transmitting a cellular communication service notification is consistent with the dashed-line path shown in FIG. 10*a*-1 and FIG. 10*a*-2, and details are not described herein again. It should be noted that, the principle and execution process of the process of using a cellular communication capability between the first device and the second device in FIG. 10*a*-1 and FIG. 10*a*-2 is similar to the foregoing principle and execution process of the steps shown in FIG. 3*a*-1 and FIG. 3*a*-2, reference may be made, and details are not described herein again.

Figures 1, 10B:
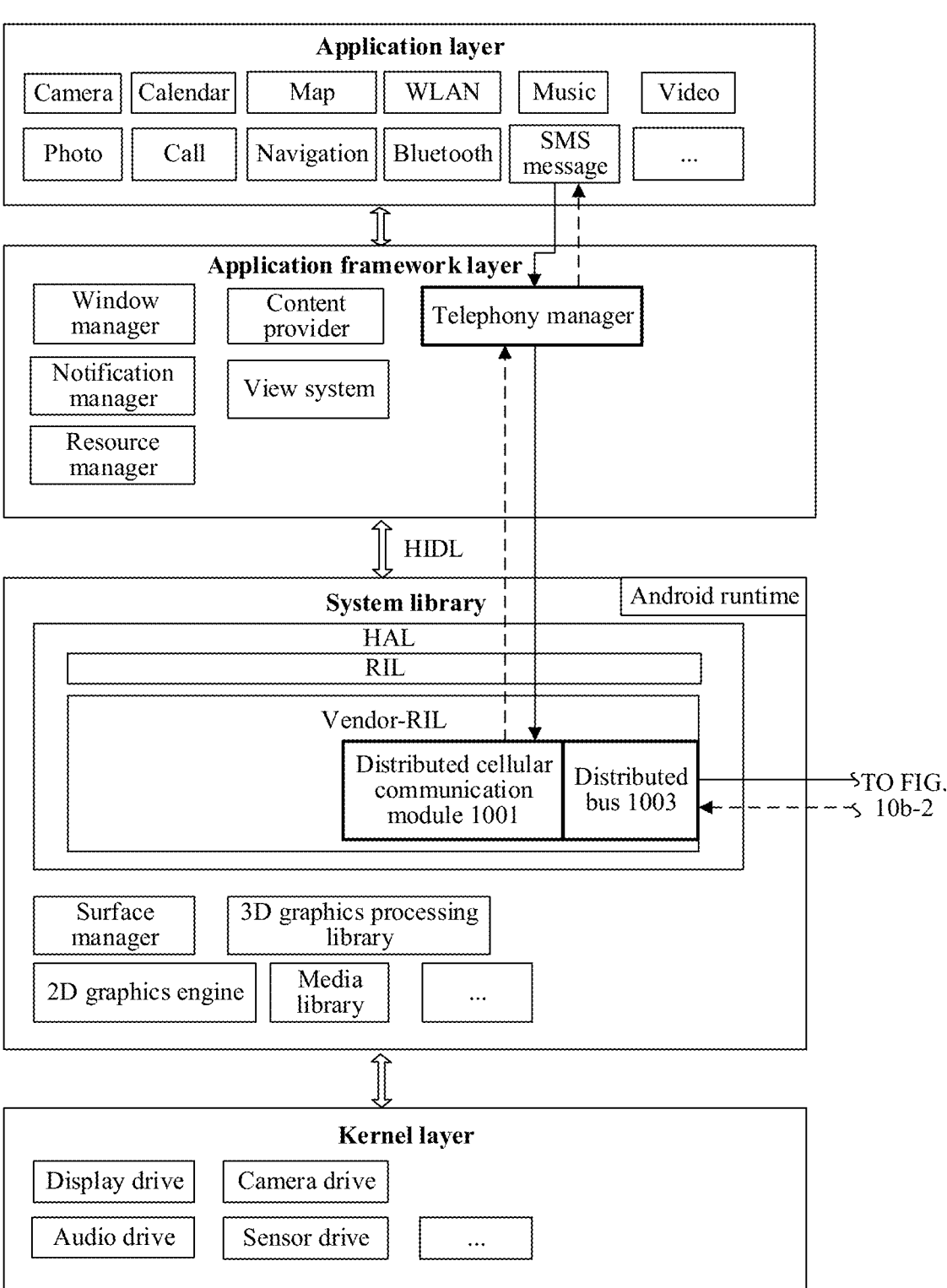
Figures 2, 10B:
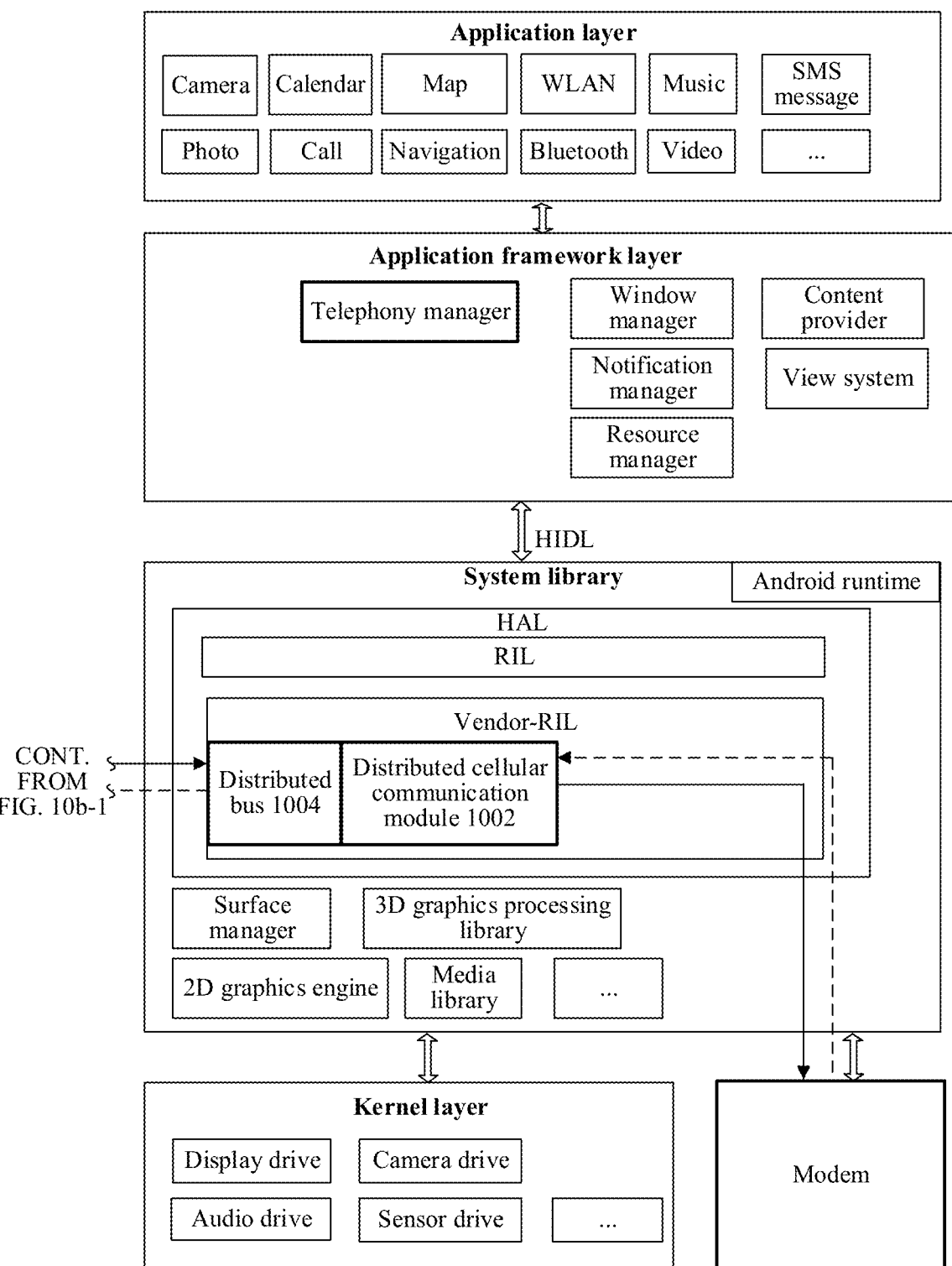

Referring to FIG. 10*b*-1 and FIG. 10*b*-2, in some other embodiments, a distributed cellular communication module 1001 of a first device may alternatively be arranged in a Vendor-RIL in a system library, and a distributed cellular communication module 1002 of a second device may be arranged in a Vendor-RIL in a system library. each of the distributed cellular communication module 1001 of the first device and the distributed cellular communication module 1002 of the second device is run in a system service. As shown by an implementation path in FIG. and FIG. 10*b*-2, a cellular communication service request (for example, an SMS message sending request) of the first device is sent from an application layer of the first device to a telephony manager in an application framework layer, then from the telephony manager in the application framework layer to the RIL module in the system library, and then from the RIL module to the distributed cellular module 501, and then sent, through the distributed bus 1003 of the first device and the distributed bus 1004 of the second device, to the distributed cellular communication module 1002 in the system library of the second device, and the distributed cellular communication module 1002 then sends the cellular communication service request to the local Modem. In addition, as shown by a dashed-line path in FIG. 10*b*-1 and FIG. 10*b*-2, the Modem further sends response data corresponding to the cellular communication service request to the distributed cellular communication module 1002, the distributed cellular communication module 1002 sends the response data corresponding to the cellular communication service request to the distributed cellular communication module 1001 of the first device through the distributed bus 1004 of the second device and the distributed bus 1003 of the first device, then the distributed cellular communication module 1001 of the first device sends the response data corresponding to the cellular communication service request to the RIL module, the RIL module continues to send the response data to the telephony manager, and then the telephony management sends the response data to a corresponding application of the first device. A path of transmitting a cellular communication service is consistent with the dashed-line path shown in FIG.

10*b*-1 and FIG. 10*b*-2, and details are not described herein again. It should be noted that, the principle and execution process of the process of using a cellular communication capability between the first device and the second device in FIG. 10*b*-1 and FIG. 10*b*-2 is similar to the foregoing principle and execution process of the steps shown in FIG. 10*a*-1 and FIG. 10*a*-2, reference may be made, and details are not described herein again.

Through step S401 to step S417, the user of the first device can successfully use all cellular communication capabilities of the Modem of the second device.

Figure 11:
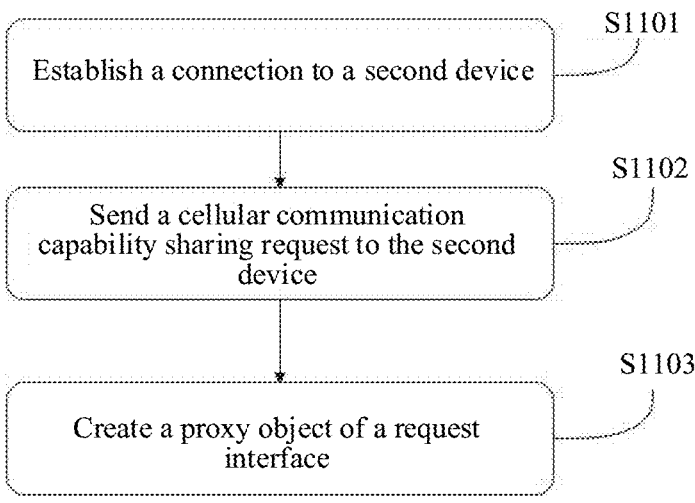
FIG. 11 is a schematic flowchart 1 of a cellular communication capability sharing configuration method according to an embodiment of this application.

Referring to FIG. 11, based on the foregoing content, an embodiment of this application further discloses a cellular communication capability sharing configuration method, applied to a first device, and specifically including the following steps:

S1101. Establish a connection to a second device.

For an execution process and a principle of step S1101, reference may be made to related content of such parts as step S401 to step S405 in FIG. 4A and FIG. 4B.

S1102. Send a cellular communication capability sharing request to the second device.

For an execution process and a principle of step S1102, reference may be made to related content of step S406 in FIG. 4A and FIG. 4B, and details are not described herein again.

S1103. Create a proxy object of a request interface. the proxy object of the request interface is used for forwarding the received cellular communication service request to the distributed cellular communication module of the second device. The proxy object of the request interface is run in a system service.

For an execution process and a principle of step S1103, reference may be made to related content of step S407 shown in FIG. 4A and FIG. 4B, and details are not described herein again.

Figure 12:
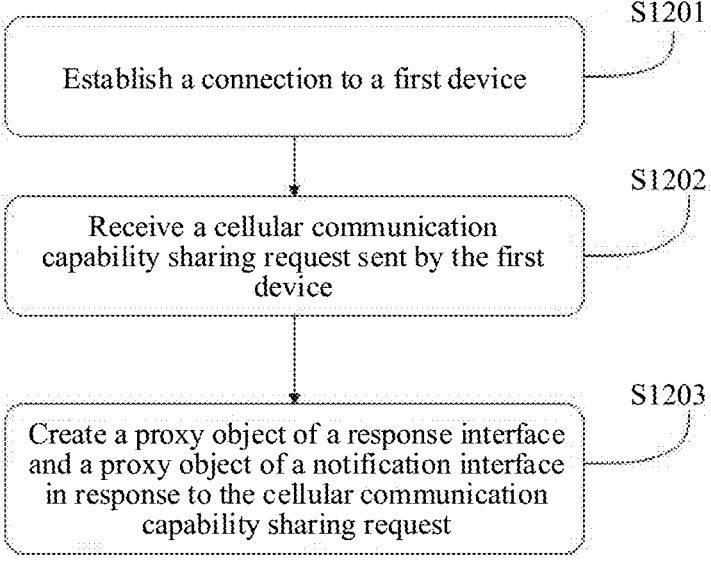
FIG. 12 is a schematic flowchart 2 of a cellular communication capability sharing configuration method according to an embodiment of this application.

Referring to FIG. 12, based on the foregoing content, an embodiment of this application further discloses another cellular communication capability sharing configuration method, applied to a second device, and specifically including the following steps:

S1201. Establish a connection to a first device.

For an execution process and a principle of step S1201, reference may be made to related content of such parts as step S401 to step S405 in FIG. 4A and FIG. 4B.

S1202. Receive a cellular communication capability sharing request sent by the first device.

For an execution process and a principle of step S1202, reference may be made to related content of step S406, and details are not described herein again.

S1203. Create a proxy object of a response interface and a proxy object of a notification interface in response to the cellular communication capability sharing request.

The proxy object of the response interface is used for forwarding the response data corresponding to the cellular communication service request to the distributed cellular communication module of the first device, and the proxy object of the notification interface is used for forwarding a cellular communication service reported by the local Modem to the distributed cellular communication module of the first device. The proxy object of the response interface and the proxy object of the notification interface are both run in a system service.

For an execution process and a principle of step S1203, reference may be made to related content of step S408, and details are not described herein again.

Figure 13:
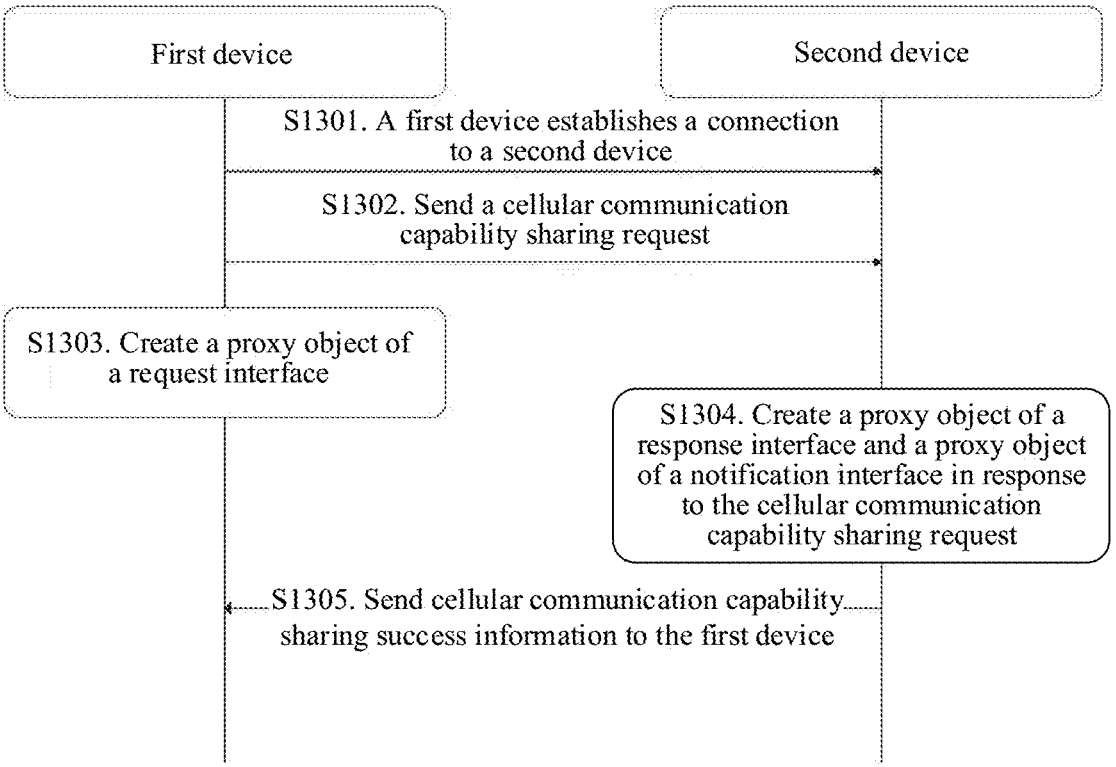
FIG. 13 is a schematic flowchart 3 of a cellular communication capability sharing configuration method according to an embodiment of this application.

Referring to FIG. 13, based on the foregoing content, an embodiment of this application discloses a cellular communication capability sharing configuration method, specifically including the following steps:

S1301. A first device establishes a connection to a second device.

For an execution process and a principle of step S1301, reference may be made to related content of such parts as step S401 to step S405 in FIG. 4A and FIG. 4B.

S1302. The first device sends a cellular communication capability sharing request to the second device.

For an execution process and a principle of step S1302, reference may be made to related content of step S406 in FIG. 4A and FIG. 4B, and details are not described herein again.

S1303. The first device creates a proxy object of a request interface.

For an execution process and a principle of step S1303, reference may be made to related content of step S407 shown in FIG. 4A and FIG. 4B, and details are not described herein again.

S1304. The second device creates a proxy object of a response interface and a proxy object of a notification interface in response to the cellular communication capability sharing request.

The proxy object of the response interface is used for forwarding the response data corresponding to the cellular communication service request to the distributed cellular communication module of the first device, and the proxy object of the notification interface is used for forwarding a cellular communication service reported by the local Modem to the distributed cellular communication module of the first device.

For an execution process and a principle of step S1304, reference may be made to related content of step S408, and details are not described herein again.

S1305. The second device sends cellular communication capability sharing success information to the first device.

For an execution process and a principle of step S1305, reference may be made to related content of step S409, and details are not described herein again.

Figure 14:
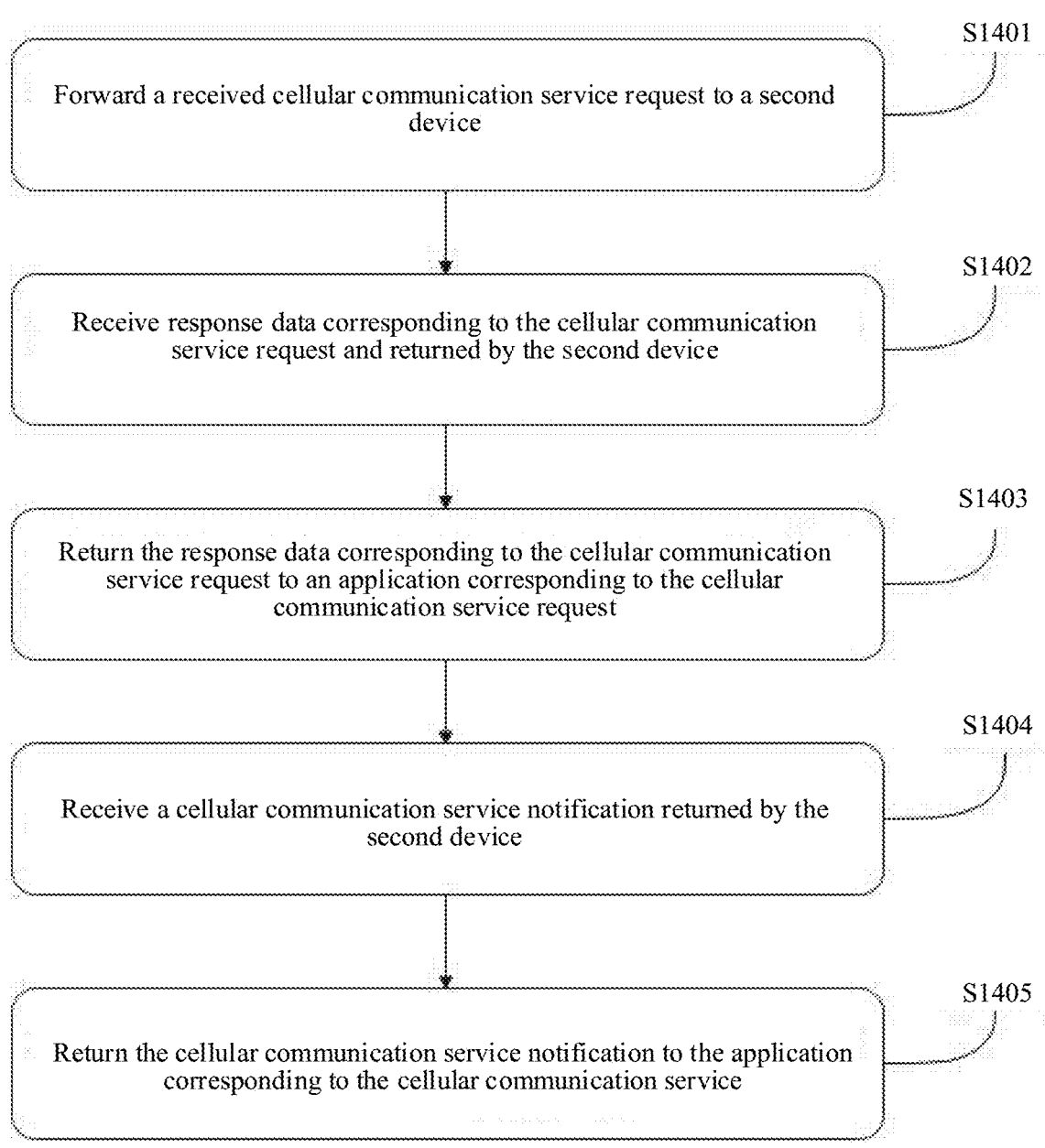
FIG. 14 is a flowchart 2 of a method for using a cellular communication capability according to an embodiment of this application.

Referring to FIG. 14, based on the foregoing content, an embodiment of this application further discloses a method for using a cellular communication function, applied to a first device, and specifically including the following steps:

S1401. Forward a received cellular communication service request to a second device.

For an execution process and a principle of step S1401, reference may be made to related content of step S410, and details are not described herein again.

S1402. Receive response data corresponding to the cellular communication service request and returned by the second device.

For an execution process and a principle of step S1402, reference may be made to related content of step S413 to step S414, and details are not described herein again.

S1403. Return the response data corresponding to the cellular communication service request to an application corresponding to the cellular communication service request.

For an execution process and a principle of step S1403, reference may be made to related content of step S413 to step S414, and details are not described herein again.

S1404. Receive a cellular communication service notification returned by the second device.

For an execution process and a principle of step S1404, reference may be made to related content of step S416, and details are not described herein again.

S1405. Return the cellular communication service notification to the application corresponding to the cellular communication service.

For an execution process and a principle of step S1405, reference may be made to related content of step S417, and details are not described herein again.

Referring to FIG. 15, based on the foregoing content, an embodiment of this application further discloses another method for using a cellular communication function, applied to a second device, and specifically including the following steps:

S1501. Receive a cellular communication service request sent by a first device.

For an execution process and a principle of step S1501, reference may be made to a related part of step S410, and details are not described herein again.

S1502. Process the cellular communication service request through a Modem of the second device.

For an execution process and a principle of step S1502, reference may be made to related content of step S411, and details are not described herein again.

S1503. Receive, through a distributed cellular communication module of the second device, response data corresponding to the cellular communication service request sent by the local Modem.

the response data corresponding to the cellular communication service request is obtained by processing the cellular communication service request by the local Modem.

For an execution process and a principle of step S1503, reference may be made to related content of step S412, and details are not described herein again.

S1504. Send the response data corresponding to the cellular communication service request to the first device.

For an execution process and a principle of step S1504, reference may be made to related content of step S413, and details are not described herein again.

S1505. Receive, through the distributed cellular communication module of the second device, a cellular communication service sent by the local Modem.

For an execution process and a principle of step S1505, reference may be made to related content of step S415, and details are not described herein again.

S1506. Send the cellular communication service notification to the first device.

For an execution process and a principle of step S1506, reference may be made to related content of step S416, and details are not described herein again.

Figure 16:
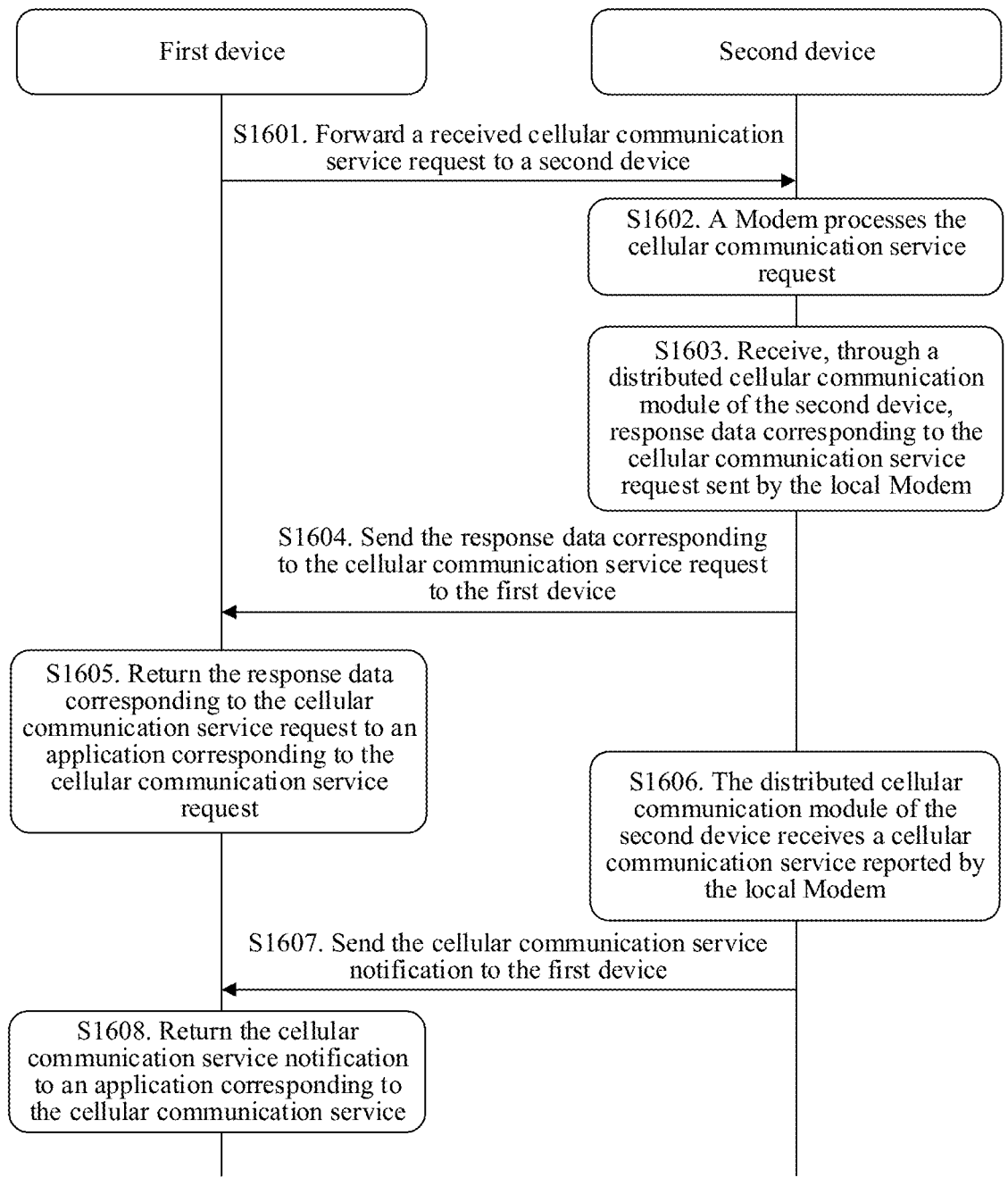
FIG. 16 is a flowchart 4 of a method for using a cellular communication capability according to an embodiment of this application.

Referring to FIG. 16, based on the foregoing content, an embodiment of this application further discloses a method for using a cellular communication function, specifically including the following steps:

S1601. A first device forwards a received cellular communication service request to a second device.

For an execution process and a principle of step S1601, reference may be made to related content of step S410, and details are not described herein again.

S1602. A Modem of the second device processes the cellular communication service request.

For an execution process and a principle of step S1602, reference may be made to related content of step S411, and details are not described herein again.

S1603. Receive, through a distributed cellular communication module of the second device, response data corresponding to the cellular communication service request sent by the local Modem.

The response data corresponding to the cellular communication service request is obtained by processing the cellular communication service request by the local Modem.

For an execution process and a principle of step S1603, reference may be made to related content of step S412, and details are not described herein again.

S1604. The second device sends the response data corresponding to the cellular communication service request to the first device.

For an execution process and a principle of step S1604, reference may be made to related content of step S413, and details are not described herein again.

S1605. The first device returns the response data corresponding to the cellular communication service request to an application corresponding to the cellular communication service request.

For an execution process and a principle of step S1605, reference may be made to a related part of step S413 to step S414, and details are not described herein again.

S1606. The distributed cellular communication module of the second device receives a cellular communication service reported by the local Modem.

For an execution process and a principle of step S1606, reference may be made to related content of step S415, and details are not described herein again.

S1607. The second device sends the cellular communication service notification to the first device.

For an execution process and a principle of step S1607, reference may be made to related content of step S416, and details are not described herein again.

S1608. The first device sends the cellular communication service notification to an application corresponding to the cellular communication service notification.

For an execution process and a principle of step S1608, reference may be made to a related part of step S417, and details are not described herein again.

Figure 17A:
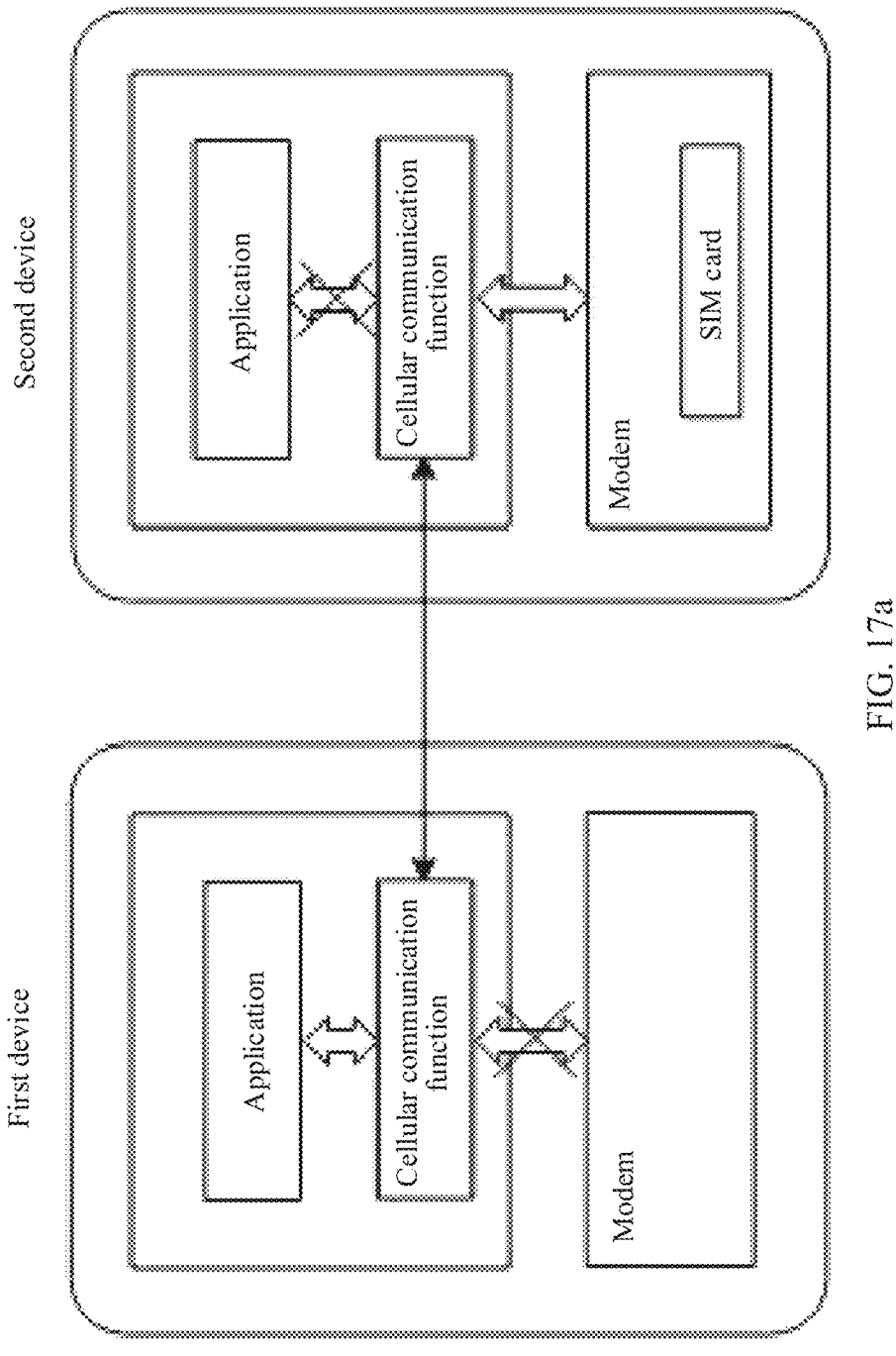
FIG. 17a is a schematic diagram 1 of a cellular communication function sharing manner according to an embodiment of this application.

In some embodiments, as shown in FIG. 17a, to improve experience of using a cellular communication capability by a first device, a second device may share its own cellular communication capability completely with the first device, that is, the second device does not process a locally generated cellular communication service request, and the second device performs only the process shown in FIG. 4A and FIG. 4B. For example, as shown in FIG. 7b, when the first device is a notebook computer and the second device is a mobile phone, the mobile phone does not generate a call making request locally, and the mobile phone may process only a call making request initiated by the notebook computer. In another example, as shown in FIG. 7c, when the first device is a notebook computer and the second device is a mobile phone, the mobile phone may not locally process a one-click login request triggered by a video APP, but process only a one-click login request triggered by the notebook computer.

Figure 17B:
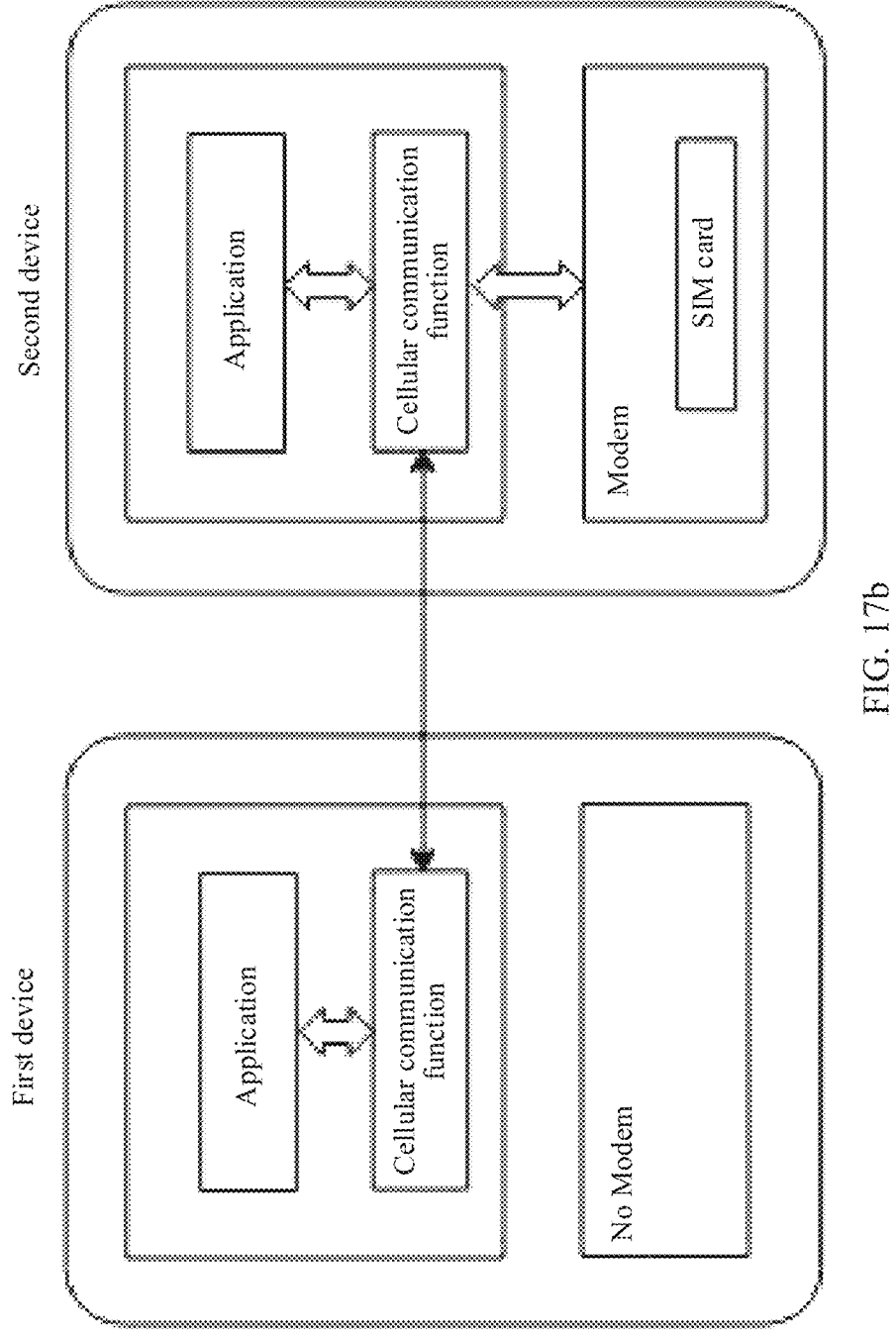
FIG. 17b is a schematic diagram 2 of a cellular communication function sharing manner according to an embodiment of this application.

In some other embodiments, as shown in FIG. 17b, a second device provides its own cellular communication capability to a first device for use, and also uses its own cellular communication capability. That is, in addition to a cellular communication service request of the first device, a Modem of the second device further processes a cellular communication service request generated by a local application, and the second device presents its own. For example, as shown in FIG. 9a, when the first device is a notebook computer and the second device is a mobile phone, the mobile phone can edit and send an SMS message through a text box 90, and the notebook computer may also edit and send an SMS message through a text box 91 by using a Modem of the mobile phone.

Specifically, an implementation of FIG. 17*b* may be: after the second device performs the process shown in FIG. 4A and FIG. 4B, when a telephony manager of the second device receives a local cellular communication service request, the telephony manager of the second device sends, by invoking an HIDL interface on an RIL module, the received local cellular communication service request to the Modem for processing. After performing processing, the Modem obtains response data corresponding to the cellular communication service request, and then the Modem sends the response data corresponding to the cellular communication service request to a distributed cellular communication module of the second device In this case, in addition to possibly having response data corresponding to a cellular communication service request initiated by the first device, the distributed cellular communication module of the second device further possibly has the response data corresponding to the local cellular communication service request. Therefore, a proxy object of a response interface created by the distributed cellular communication module of the second device further extends an operation function of recognizing whether the response data corresponding to the cellular communication service request needs to be forwarded to the first device. Before the distributed cellular communication module of the second device performs step S413, it is further necessary to recognize whether the response data corresponding to the cellular communication service request needs to be forwarded to the first device. If it is recognized that the response data corresponding to the cellular communication service request does not need to be forwarded to the first device, the response data corresponding to the cellular communication service request is sent to the local telephony manager, and the local telephony manager sends the response data corresponding to the cellular communication service request to the application corresponding to the cellular communication service request. If it is recognized that the response data corresponding to the cellular communication service request needs to be forwarded to the first device, the response data corresponding to the cellular communication service request is sent to the distributed cellular communication module of the first device, that is, step S413 is performed.

The second device simultaneously has capabilities of processing the cellular communication service request of the first device and the local cellular communication service request. Therefore, when step S412 is performed, response data received by the distributed cellular communication module of the second device may be generated by the local request or may be generated by the request of the first device. Therefore, it is necessary to recognize whether the response data corresponding to the cellular communication service request needs to be forwarded to the first device. If the response data is local response data, the response data does not need to be forwarded to the first device. If the response data is not local response data, that is, the response data is response data generated after the request of the first device is processed, the response data needs to be forwarded to the first device.

Figure 17C:
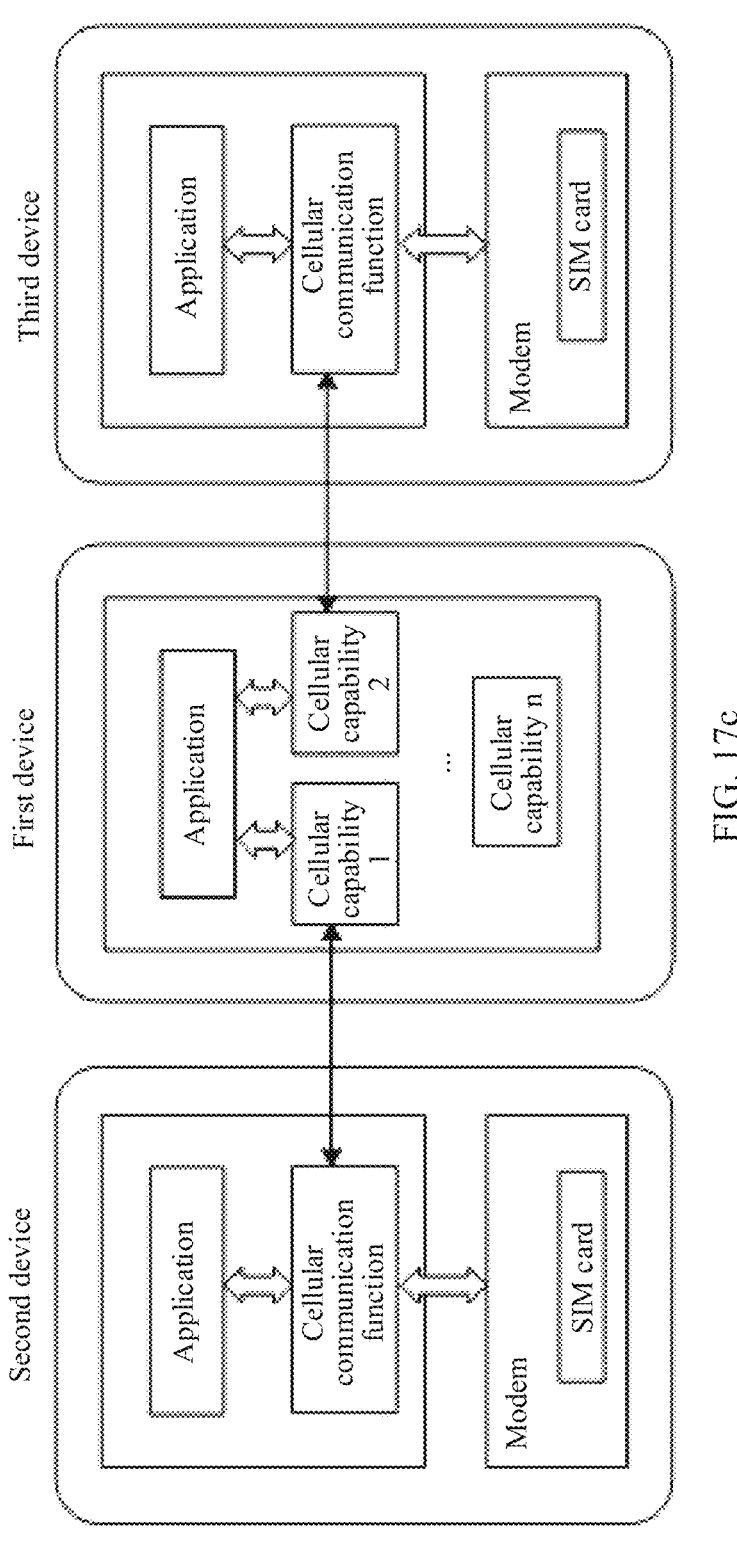
FIG. 17c is a schematic diagram 3 of a cellular communication function sharing manner according to an embodiment of this application.
Figure 18:
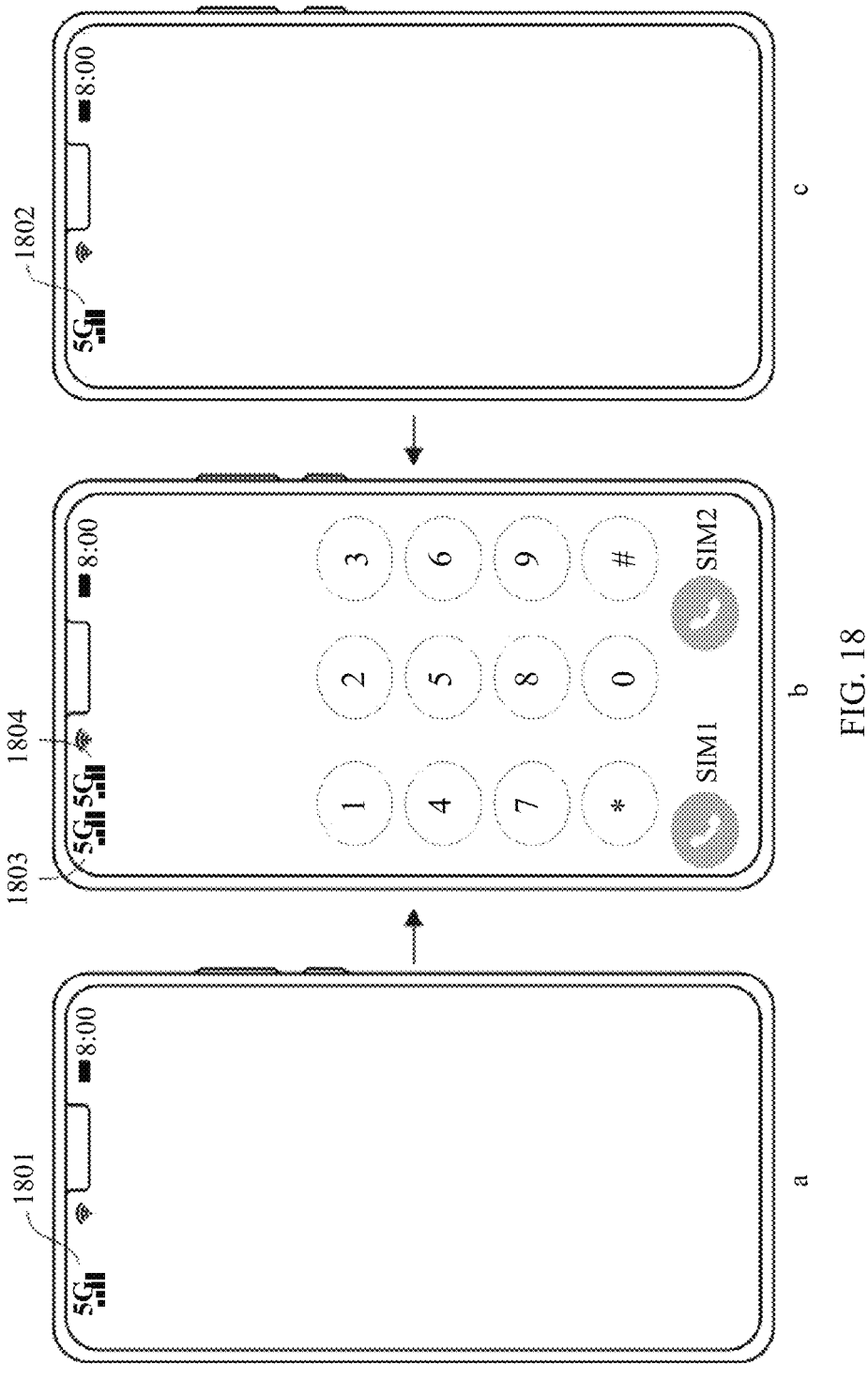
FIG. 18 is a schematic diagram of a scenario in which a mobile phone b uses cellular communication capabilities of a mobile phone a and a mobile phone c to make a call according to this application.

In some other embodiments, as shown in FIG. 17*c*, a first device may use a cellular communication capability of a second device, may also use a cellular communication capability of another device (an implementation principle of using the cellular communication capability of the another device is consistent with that in the process of using the cellular communication capability of the second device shown in FIG. 4A and FIG. 4B, and details are not described herein again), and may further use its own cellular communication capability, that is, the first device itself also has a Modem. For example, the first device may make a call using a local SIM card 1, or may make a call using a SIM card 2 of the second device, or may even make a call using a SIM card 3 of a third device. For example, as shown in FIG. 18, there is a SIM1 card in a mobile phone a in FIG. 18, a 5G signal icon 1801 of the SIM1 card is presented on the mobile phone a, there is a SIM2 card in a mobile phone c in FIG. 18, a 5G signal icon 1802 of the SIM2 card is presented on the mobile phone c, a mobile phone c uses Modems of the mobile phone a and the mobile phone c, and the mobile phone b can alternatively 5G signals of the mobile phone a and the mobile phone c. Therefore, a 5G signal icon 1803 of the SIM1 and a 5G signal icon 1804 of the SIM2 are also presented on the mobile phone b, and the mobile phone b can make a call using the SIM1 and the SIM2.

Specifically, an implementation in which the first device uses its own cellular communication capability may be: in the created proxy object of the request interface, an operation function of recognizing whether the cellular communication service request needs to be forwarded to the second device is additional extended; and then before step S410 is performed, the distributed cellular communication module of the first device further recognizes whether the cellular communication service request received by the telephony manager of the first device needs to be forwarded to the second device, sends, if the cellular communication service request received by the telephony manager of the first device does not need to be forwarded to the second device, the cellular communication service request to the local Modem for processing, then receives the response data corresponding to the cellular communication service request and sent by the local Modem, and sends the response data corresponding to the cellular communication service request to the telephony manager, and the telephony manager sends the response data corresponding to the cellular communication service request to the application corresponding to the cellular communication service request. If it is recognized that the cellular communication service request received by the telephony manager of the first device needs to be forwarded to the second device, step S410 is performed. Specifically, a function of the distributed cellular communication module of the first device to recognize whether the cellular communication service request received by the telephony manager of the first device needs to be forwarded to the second device may be implemented by extending an additional function of the proxy object of the request interface.

The first device may further use its own cellular communication capability, that is, may use the local Modem to process the locally generated cellular communication service request. Therefore, when receiving the cellular communication service request of the telephony manager, the distributed cellular communication module of the first device needs to consider whether the cellular communication service request needs to be forwarded to the second device. If the cellular communication service request is a cellular communication service request that the local Modem can process, it is not necessary to forward the cellular communication service request to the second device. If the cellular communication service request is a cellular communication service request that only the Modem of the second device can process, the cellular communication service request is forwarded to the second device for processing, that is, step S410 is performed.

In some embodiments, the distributed cellular communication module of the first device may have functions of the distributed cellular communication module of the second device in the embodiment shown in FIG. 4A and FIG. 4B, and if the first device has a Modem, the distributed cellular communication module of the first device may perform steps performed by the distributed cellular communication module of the second device in the embodiment shown in FIG. 4A and FIG. 4B. Similarly, the distributed cellular communication module of the second device may also have functions of the distributed cellular communication module of the first device in the embodiment shown in FIG. 4A and FIG. 4B, that is, the distributed cellular communication module of the second device may perform steps performed by the distributed cellular communication module of the first device in the embodiment shown in FIG. 3a-1 and FIG. 3a-2. The distributed cellular communication module of the first device and the distributed cellular communication module of the second device may have the same functions.

In this embodiment of this application, the distributed cellular communication module of the first device is arranged in the application framework layer and forwards the cellular communication service request received by the telephony manager of the first device to the distributed cellular communication module of the second device, then the distributed cellular communication module of the second device further sends the cellular communication service request to the local Modem of the second device for processing, to obtain the response data corresponding to the cellular communication service request, and then sends the response data corresponding to the cellular communication service request to the distributed cellular communication module of the first device, then the distributed cellular communication module of the first device can send the response data corresponding to the cellular communication service request to the telephony manager, and then the telephony manager sends the response data corresponding to the cellular communication service request to the application corresponding to the cellular communication service request. All cellular communication service requests of the first device can be forwarded through the distributed cellular communication module of the first device to the Modem of the second device for processing, and then the distributed cellular communication module of the second device sends the response data corresponding to the cellular communication service request to the first device by sending the response data corresponding to the cellular communication service request to the distributed cellular communication module of the first device. Therefore, the first device can use all cellular communication capabilities of the second device, that is, can use all cellular communication functions, which is not like a case in the existing technology that the first device can use only a cellular communication function supported by the same installed application. In addition, because of being located in the application framework layer, the distributed cellular communication module of the first device can undertake and process all cellular communication service requests in an application layer. Even if the second device does not have the same application as that of the first device, the cellular communication service request of the first device can still be forwarded to the distributed cellular communication module of the second device for processing. Moreover, it is not necessary to be like the existing technology in that there is a limitation that the same application needs to be installed in the devices.

It should be noted that, any method for using a cellular communication function mentioned in the foregoing embodiments is described using an HIDL interface as an example. In addition to the HIDL interface, the embodiments are similarly applicable to other types of interfaces such as the AIDL interface. For the execution process and principle of the other types of interfaces, reference may be made to the related descriptions of the HIDL interface in the foregoing embodiments, and details are not described again in this embodiment of this application.

It should be further noted that each manner of establishing a connection between the first device and the second device mentioned in the foregoing embodiments is described using a manner of establishing a socket connection in a near field communication scenario as an example. Moreover, a connection between the first device and the second device in the foregoing embodiments is similarly further applicable to a far field communication scenario. Exemplarily, in the far field communication scenario, a persistent connection channel (for example, a Relay channel) of a stationary point may be established through a communication service cloud (which may also be referred to as a Relay cloud).

The Communication Service Cloud Mainly has the Following Functions:

1. Capability discovery: a capability provider (for example, the second device in this embodiment of this application) needs to inform, through a secure channel, another trustworthy device (for example, the first device in this embodiment of this application) of a distributed communication capability of the capability provider, and moreover a capability user (for example, the first device in this embodiment of this application) may query, through a cloud service, devices which may remotely use cellular capabilities currently.

2. Device authentication: before a distributed service is triggered, it is necessary to authenticate the capability user device. That is, the capability provider device needs to confirm that a device about to remotely use a cellular capability of the capability provider device is an authenticated and trustworthy device.

3. Data forwarding: the cloud service establishes a Relay channel between the cellular capability provider and the cellular capability user, to ensure that the both parties can transfer control signaling and service data efficiently, securely, and reliably.

Figure 19:
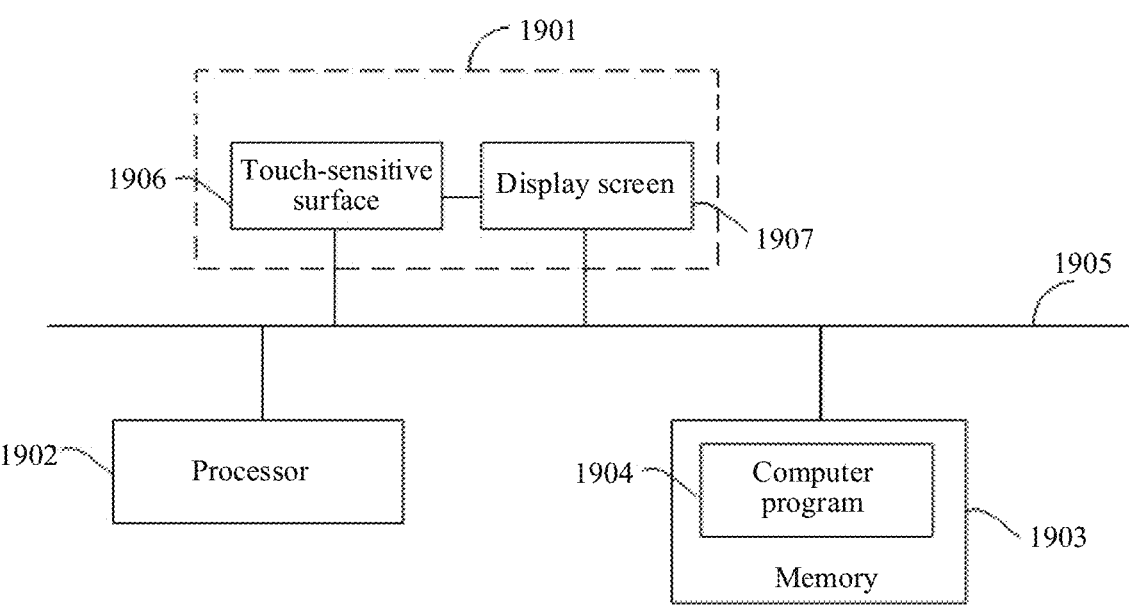
FIG. 19 is an exemplary compositional diagram 2 of an electronic device according to an embodiment of this application.

Some embodiments of this application further provide an electronic device. As shown in FIG. 19, the electronic device may include: a touchscreen 1901, where the touchscreen 1901 includes a touch-sensitive surface 1906 and a display screen 1907; one or more processors 1902; a memory 1903; and one or more computer programs 1904. The components may be connected by using one or more communication buses 1905. The one or more computer programs 1904 are stored in the memory 1903 and are configured to be executed by the one or more processors 1902. The one or more computer programs 1904 include instructions. The instructions may be configured to perform each step performed by the first device in the corresponding embodiment in FIG. 4A and FIG. 4B, each step performed by the second device in the corresponding embodiment in FIG. 4A and FIG. 4B, each step in the corresponding embodiment in FIG. 11, each step in the corresponding embodiment in FIG. 12, each step performed by the first device in the corresponding embodiment in FIG. 13, each step performed by the second device in the corresponding embodiment in FIG. 13, each step in the corresponding embodiment in FIG. 14, each step in the corresponding embodiment in FIG. 15, each step performed by the first device in the corresponding embodiment in FIG. 16, or each step performed by the second device in the corresponding embodiment in FIG. 16. Certainly, the electronic device shown in FIG. 19 may further include other devices such as a sensor module, an audio module and a SIM card interface. This is not limited in this embodiment of this application. When the electronic device shown in FIG. 19 further includes other devices such as a sensor module, an audio module and a SIM card interface, the electronic device may be the electronic device shown in FIG. 2.

In the embodiments of this application, function modules of the electronic device may be divided based on the foregoing method example. For example, each function module may be divided according to each function, or two or more functions may be integrated into one processing unit. The integrated module is implemented in the form of hardware, or is implemented in the form of a software functional module. It should be noted that, in the embodiments of this application, the module division is an example, and is merely logical function division, and there may be other division manners during actual implementation.

Figure 20:
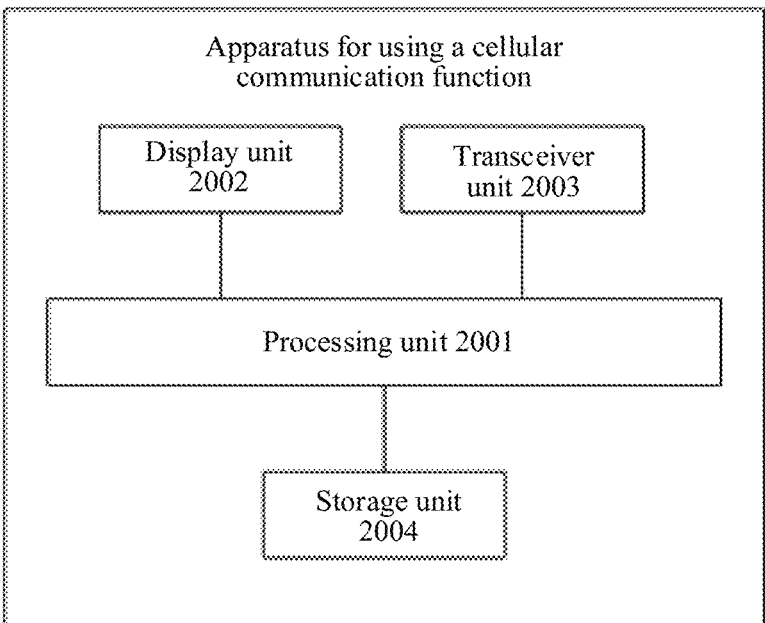
FIG. 20 is a schematic compositional diagram of an apparatus for using a cellular communication function according to an embodiment of this application.

In a case that the functional modules are divided corresponding to the functions, FIG. 20 shows a possible schematic compositional diagram of an apparatus for using a cellular communication function, and the apparatus for using a cellular communication function can perform steps performed by an electronic device in any one of the method embodiments of this application. As shown in FIG. 20, the apparatus for using a cellular communication function is an electronic device or a communication apparatus supporting an electronic device in implementing a method provided in the embodiments. For example, the communication apparatus may be a chip system. The apparatus for using a cellular communication function may include: a processing unit 2001, a display unit 2002, and a transceiver unit 2003.

The processing unit 2001 is configured to support the apparatus for using a cellular communication function in performing a method described in the embodiments of this application. For example, the processing unit 2001 is configured to perform or is configured to support the apparatus for using a cellular communication function in performing each step performed by the first device in the corresponding embodiment in FIG. 4A and FIG. 4B, each step performed by the second device in the corresponding embodiment in FIG. 4A and FIG. 4B, each step in the corresponding embodiment in FIG. 11, each step in the corresponding embodiment in FIG. 12, each step performed by the first device in the corresponding embodiment in FIG. 13, each step performed by the second device in the corresponding embodiment in FIG. 13, each step in the corresponding embodiment in FIG. 14, each step in the corresponding embodiment in FIG. 15, each step performed by the first device in the corresponding embodiment in FIG. 16, or each step performed by the second device in the corresponding embodiment in FIG. 16.

It should be noted that, all related content of the steps in the foregoing method embodiment may be quoted to functional descriptions of corresponding functional modules, and details are not described herein again.

The apparatus for using a cellular communication function provided in this embodiment of this application is configured to perform a method of any one of the foregoing embodiments, and therefore can achieve the same effect as that of the method of the foregoing embodiments.

An embodiment of this application further provides a computer-readable storage medium. The computer-readable storage medium includes instructions, and the instructions, when running on an electronic device, cause the electronic device to perform related method steps of the first device in FIG. 4A and FIG. 4B, to implement a method in the foregoing embodiments, or perform related method steps of the second device in FIG. 4A and FIG. 4B, to implement a method in the foregoing embodiments.

An embodiment of this application further provides a computer program product including instructions. The computer program product, when run on an electronic device, causes the electronic device to perform each step performed by the first device in the corresponding embodiment in FIG. 4A and FIG. 4B, each step performed by the second device in the corresponding embodiment in FIG. 4A and FIG. 4B, each step in the corresponding embodiment in FIG. 11, each step in the corresponding embodiment in FIG. 12, each step performed by the first device in the corresponding embodiment in FIG. 13, each step performed by the second device in the corresponding embodiment in FIG. 13, each step in the corresponding embodiment in FIG. 14, each step in the corresponding embodiment in FIG. 15, each step performed by the first device in the corresponding embodiment in FIG. 16, or each step performed by the second device in the corresponding embodiment in FIG. 16, to implement a method in the foregoing embodiments, or perform related method steps of the second device in FIG. 4A and FIG. 4B, to implement a method in the foregoing embodiments.

An embodiment of this application further provides a control device. The control device includes a processor and a memory, the memory is configured to store computer program code, the computer program code includes computer instructions, and when the processor executes the computer instructions, the control device performs related method steps of the first device in FIG. 4A and FIG. 4B, to implement a method in the foregoing embodiments, or performs related method steps of the second device in FIG. 4A and FIG. 4B, to implement a method in the foregoing embodiments. The control device may be an integrated circuit IC, or may be a system-on-chip SOC. The integrated circuit may be a general-purpose integrated circuit, or may be a field programmable gate array FPGA, or may be an application-specific integrated circuit ASIC.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work process of the system, apparatus and unit described above, corresponding process in the foregoing method embodiments may be referred to, and the details are not described herein again.

In the several embodiments provided in the embodiments of this application, it should be understood that, the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or a part of the technical solutions may be implemented in the form of a software product. The computer software product is stored in a storage medium and includes several instructions for instructing a computer device (which may be a PC, a server or a network device) or a processor to perform all or some of the steps of the method described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, performed by a first device, comprising:
preconfiguring an operation function of a distributed cellular communication module of a first device, wherein the operation function comprises forwarding a received cellular communication service request to a function configuration of a distributed cellular communication module of a second device;
establishing a connection to the distributed cellular communication module of the second device;
sending a cellular communication capability sharing request to the distributed cellular communication module of the second device;
creating a proxy object of a request interface, and sending the cellular communication capability sharing request to the distributed cellular communication module of the second device, wherein the proxy object of the request interface is used for forwarding the received cellular communication service request to the distributed cellular communication module of the second device;
triggering a local telephony manager to send a subscriber identity module state query request;
sending the subscriber identity module state query request sent by the local telephony manager to the distributed cellular communication module of the second device;
receiving a subscriber identity module state query result returned by the distributed cellular communication module of the second device, wherein the subscriber identity module state query result is obtained by sending the subscriber identity module state query request to a modem of the second device by the distributed cellular communication module of the second device and processing the subscriber identity module state query request by the modem of the second device;
sending the subscriber identity module state query result to an application corresponding to the subscriber identity module state query result;
receiving, by the distributed cellular communication module of the first device, a cellular communication service request that corresponds to an application of the first device, wherein the distributed cellular communication module is run in a system service or arranged in an application framework layer or a system library of the first device;
forwarding the received cellular communication service request to the distributed cellular communication module of the second device, wherein the distributed cellular communication module of the second device is run in a system service or arranged in an application framework layer or a system library of the second device;
receiving, by the distributed cellular communication module of the first device, response data corresponding to the cellular communication service request and returned by the distributed cellular communication module of the second device, wherein the response data corresponding to the cellular communication service request is obtained by sending the cellular communication service request to a modem of the second device by the distributed cellular communication module of the second device and processing the cellular communication service request by the modem of the second device; and
sending the response data corresponding to the cellular communication service request to the application corresponding to the cellular communication service request.

2. The method according to claim 1, wherein before establishing the connection to the second device, the method further comprises:
querying a device enabling a cellular communication capability sharing function in a network; and
selecting the second device from all queried devices enabling the cellular communication capability sharing function.

3. The method according to claim 1, wherein establishing the connection to the second device comprises:
sending a socket connection request to the distributed cellular communication module of the second device; and
establishing the connection to the distributed cellular communication module of the second device through a distributed bus in a case that the distributed cellular communication module of the second device successfully responds to the socket connection request; or
establishing the connection as a persistent connection channel through a communication service cloud, wherein the persistent connection channel is used for connecting the distributed cellular communication module of the first device and the distributed cellular communication module of the second device.

4. The method according to claim 1, wherein after creating the proxy object of the request interface, the method further comprises:
disabling the proxy object of the request interface in response to the second device disabling a cellular communication capability sharing function; or sending a sharing ending request to the distributed cellular communication module of the second device and disabling the proxy object of the request interface.

5. The method according to claim 1, wherein before forwarding the received cellular communication service request to the distributed cellular communication module of the second device, the method further comprises:

recognizing whether the received cellular communication service request needs to be forwarded to the second device;

sending, in a case that the received cellular communication service request does not need to be forwarded to the second device, the cellular communication service request to a local modem for processing;

receiving the response data corresponding to the cellular communication service request and sent by the local modem; and sending the response data corresponding to the cellular communication service request to the application corresponding to the cellular communication service request, wherein forwarding the received cellular communication service request to the distributed cellular communication module of the second device comprises:

forwarding the cellular communication service request to the distributed cellular communication module of the second device in a case of recognizing that the cellular communication service request needs to be forwarded to the second device.

6. The method according to claim 1, further comprising:

receiving a cellular communication service notification returned by the distributed cellular communication module of the second device; and sending the cellular communication service notification to an application corresponding to the cellular communication service request.

7. The method according to claim 1, wherein forwarding the received cellular communication service request to the distributed cellular communication module of the second device comprises:

performing packet assembly and serialization processing on the received cellular communication service request; and forwarding the processed cellular communication service request to the distributed cellular communication module of the second device, wherein before sending the response data corresponding to the cellular communication service request to the application corresponding to the cellular communication service request, the method further comprises:

performing packet disassembly and deserialization processing on the response data corresponding to the cellular communication service request; and wherein sending the response data corresponding to the cellular communication service request to the application corresponding to the cellular communication service request comprises:

sending the processed response data corresponding to the cellular communication service request to an application corresponding to the cellular communication service request.

8. A first device, comprising memory and one or more processors, the one or more processors configured to execute instructions stored on the memory to cause the first device to:

preconfigure an operation function of a distributed cellular communication module of the first device, wherein the operation function comprises forwarding a received cellular communication service request to a function configuration of a distributed cellular communication module of a second device;

establish a connection to the distributed cellular communication module of the second device;

send a cellular communication capability sharing request to the distributed cellular communication module of the second device;

create a proxy object of a request interface, and sending the cellular communication capability sharing request to the distributed cellular communication module of the second device, wherein the proxy object of the request interface is used for forwarding the received cellular communication service request to the distributed cellular communication module of the second device;

disable the proxy object of the request interface in response to that the second device disables a cellular communication capability sharing function; or send a sharing ending request to the distributed cellular communication module of the second device and disable the proxy object of the request interface;

receive, by the distributed cellular communication module of the first device, a cellular communication service request that corresponds to an application of the first device, wherein the distributed cellular communication module is run in a system service or arranged in an application framework layer or a system library of the first device;

forward the received cellular communication service request to the distributed cellular communication module of a second device, wherein the distributed cellular communication module of the second device is run in a system service or arranged in an application framework layer or a system library of the second device;

receive, by the distributed cellular communication module of the first device, response data corresponding to the cellular communication service request and returned by the distributed cellular communication module of the second device, wherein the response data corresponding to the cellular communication service request is obtained by sending the cellular communication service request to a modem of the second device by the distributed cellular communication module of the second device and processing the cellular communication service request by the modem of the second device; and send the response data corresponding to the cellular communication service request to the application corresponding to the cellular communication service request.

9. The first electronic device according to claim 8, wherein the first device is further to perform a configuration of using the modem of the second device in advance, the configuration comprising to:

preconfigure an operation function of the distributed cellular communication module of the first device, wherein the operation function of the distributed cellular communication module of the first device is a function of forwarding the received cellular communication service request to a function configuration of the distributed cellular communication module of the second device;

establish a connection to the distributed cellular communication module of the second device; and send a cellular communication capability sharing request to the distributed cellular communication module of the second device.

10. The first device according to claim 8, wherein after creating the proxy object of the request interface, the first device is further to:

trigger a local telephony manager to send a subscriber identity module state query request;

send the subscriber identity module state query request sent by the local telephony manager to the distributed cellular communication module of the second device;

receive a subscriber identity module state query result returned by the distributed cellular communication module of the second device, wherein the subscriber identity module state query result is obtained by sending the subscriber identity module state query request to the modem of the second device by the distributed cellular communication module of the second device and processing the subscriber identity module state query request by the modem of the second device; and send the subscriber identity module state query result to an application corresponding to the subscriber identity module state query result.

11. The first device according to claim 8, wherein the first device is further to, before establishing the connection to the second device;

query a device enabling a cellular communication capability sharing function in a network; and select the second device from all queried devices enabling the cellular communication capability sharing function.

12. The first device according to claim 8, wherein to establish the connection to the second device comprises to:

send a socket connection request to the distributed cellular communication module of the second device; and establish the connection to the distributed cellular communication module of the second device through a distributed bus in a case that the distributed cellular communication module of the second device successfully responds to the socket connection request; or establish the connection with a persistent connection channel through a communication service cloud, wherein the persistent connection channel is used for connecting the distributed cellular communication module of the first device and the distributed cellular communication module of the second device.

13. The first device according to claim 8, wherein the first device is further to, before the forwarding the received cellular communication service request to the distributed cellular communication module of the second device;

recognize whether the received cellular communication service request needs to be forwarded to the second device;

send, in a case that the received cellular communication service request does not need to be forwarded to the second device, the cellular communication service request to a local modem for processing;

receive the response data corresponding to the cellular communication service request and sent by the local modem; and send the response data corresponding to the cellular communication service request to the application corresponding to the cellular communication service request, wherein to forward the received cellular communication service request to the distributed cellular communication module of the second device comprises to:

forward the cellular communication service request to the distributed cellular communication module of the second device in a case of recognizing that the cellular communication service request needs to be forwarded to the second device.

14. The first device according to claim 8, wherein the first device is further to:

receive a cellular communication service notification returned by the distributed cellular communication module of the second device; and send the cellular communication service notification to an application corresponding to the cellular communication service request.

15. The first device according to claim 8, wherein to forward the received cellular communication service request to the distributed cellular communication module of the second device comprises to:

perform packet assembly and serialization processing on the received cellular communication service request; and forward the processed cellular communication service request to the distributed cellular communication module of the second device, wherein before sending the response data corresponding to the cellular communication service request to the application corresponding to the cellular communication service request, the first device is further to:

perform packet disassembly and deserialization processing on the response data corresponding to the cellular communication service request; and wherein sending the response data corresponding to the cellular communication service request to the application corresponding to the cellular communication service request comprises to:

send the processed response data corresponding to the cellular communication service request to an application corresponding to the cellular communication service request.

16. A non-transitory computer readable medium storing instructions that, when executed by one or more processors of a first device, causes the first device to:

receive, by a distributed cellular communication module of the first device, a cellular communication service request that corresponds to an application of the first device, wherein the distributed cellular communication module is run in a system service or arranged in an application framework layer or a system library of the first device;

recognize whether the received cellular communication service request needs to be forwarded to a second device;

in a case that the received cellular communication service request does not need to be forwarded to the second device, send the cellular communication service request to a local modem for processing, receive response data corresponding to the cellular communication service request and sent by the local modem, and send the response data corresponding to the cellular communication service request to the application corresponding to the cellular communication service request; and in a case of recognizing that the cellular communication service request needs to be forwarded to the second device, forward the received cellular communication service request to a distributed cellular communication module of the second device, wherein the distributed cellular communication module of the second device is run in a system service or arranged in an application framework layer or a system library of the second device, receive, by the distributed cellular communication module of the first device, the response data corresponding to the cellular communication service request and returned by the distributed cellular communication module of the second device, wherein the response data corresponding to the cellular communication service request is obtained by sending the cellular communication service request to a modem of the second device by the distributed cellular communication module of the second device and processing the cellular communication service request by the modem of the second device, and send the response data corresponding to the cellular communication service request to the application corresponding to the cellular communication service request.

17. A method, performed by a first device, comprising:

receiving, by a distributed cellular communication module of the first device, a cellular communication service request that corresponds to an application of the first device, wherein the distributed cellular communication module is run in a system service or arranged in an application framework layer or a system library of the first device;

forwarding the received cellular communication service request to a distributed cellular communication module of a second device, wherein the distributed cellular communication module of the second device is run in a system service or arranged in an application framework layer or a system library of the second device, and wherein forwarding the received cellular communication service request to the distributed cellular communication module of the second device comprises performing packet assembly and serialization processing on the received cellular communication service request and forwarding the processed cellular communication service request to the distributed cellular communication module of the second device, receiving, by the distributed cellular communication module of the first device, response data corresponding to the cellular communication service request and returned by the distributed cellular communication module of the second device, wherein the response data corresponding to the cellular communication service request is obtained by sending the cellular communication service request to a modem of the second device by the distributed cellular communication module of the second device and processing the cellular communication service request by the modem of the second device;

performing packet disassembly and deserialization processing on the response data corresponding to the cellular communication service request; and sending the processed response data corresponding to the cellular communication service request to the application corresponding to the cellular communication service request.

* * * * *